United States Patent
Fertig et al.

(10) Patent No.: US 10,339,458 B2
(45) Date of Patent: *Jul. 2, 2019

(54) SYSTEM AND METHOD FOR RAPID AND ROBUST UNCERTAINTY MANAGEMENT DURING MULTIDISCIPLINARY ANALYSIS

(71) Applicant: The Boeing Company, Chicago, IL (US)

(72) Inventors: Kenneth W. Fertig, Palo Alto, CA (US); Sudhakar Y. Reddy, Santa Clara, CA (US)

(73) Assignee: The Boeing Company, Chicago, IL (US)

( * ) Notice: Subject to any disclaimer, the term of this patent is extended or adjusted under 35 U.S.C. 154(b) by 85 days.

This patent is subject to a terminal disclaimer.

(21) Appl. No.: 15/461,794

(22) Filed: Mar. 17, 2017

(65) Prior Publication Data
US 2017/0193377 A1  Jul. 6, 2017

Related U.S. Application Data

(63) Continuation-in-part of application No. 15/250,294, filed on Aug. 29, 2016, now abandoned, which is a
(Continued)

(51) Int. Cl.
*G06F 7/60* (2006.01)
*G06F 17/10* (2006.01)
(Continued)

(52) U.S. Cl.
CPC ............... *G06N 5/047* (2013.01); *G06F 7/20* (2013.01); *G06F 16/9024* (2019.01);
(Continued)

(58) Field of Classification Search
CPC ..... G06N 5/047; G06F 7/20; G06F 17/30958; G06F 17/5086; G06F 17/509; G06F 17/5095; G06F 2217/06; G06Q 10/00
(Continued)

(56) References Cited

U.S. PATENT DOCUMENTS

2007/0169006 A1  7/2007  Arai
2007/0239497 A1  10/2007  Fertig

FOREIGN PATENT DOCUMENTS

WO    WO 2005/043271 A2    12/2005

OTHER PUBLICATIONS

Buckley, M.J. et al., "Design Sheet: An Environment for Facilitating Flexible Trade Studies During Conceptual Design", Feb. 3-6, 1992, AIAA. (Year: 1992).*
(Continued)

*Primary Examiner* — Cedric Johnson
(74) *Attorney, Agent, or Firm* — MH2 Technology Law Group LLP

(57) ABSTRACT

Presented are rapid and robust techniques for estimating the uncertainty in product attributes (performance, cost, etc.) during the multi-disciplinary design and analysis phase of the product life-cycle. The techniques leverage the capabilities of a preexisting constraint management system that may be used to calculate performance and cost metrics of an engineering system as a function of the design structure and operational scenarios. The techniques are particularly useful when the constraint management system is used to automate the reverse computation required when the analyst specifies cost, schedule, or performance targets using approaches such as cost as independent variable. Disclosed techniques may also be applied to constraint management systems that include compound-valued variables.

18 Claims, 45 Drawing Sheets

Related U.S. Application Data continuation of application No. 13/651,170, filed on Oct. 12, 2012, now Pat. No. 9,507,909.

(51) Int. Cl.
| | |
|---|---|
| *G06N 5/04* | (2006.01) |
| *G06N 7/00* | (2006.01) |
| *G06F 16/901* | (2019.01) |
| *G06F 7/20* | (2006.01) |
| *G06F 17/50* | (2006.01) |
| *G06Q 10/04* | (2012.01) |
| *G06Q 10/06* | (2012.01) |

(52) U.S. Cl.
CPC ........ *G06F 17/509* (2013.01); *G06F 17/5086* (2013.01); *G06F 17/5095* (2013.01); *G06N 7/005* (2013.01); *G06Q 10/04* (2013.01); *G06Q 10/067* (2013.01); *G06Q 10/0631* (2013.01); *G06F 2217/06* (2013.01)

(58) Field of Classification Search
USPC .......................................................... 703/2
See application file for complete search history.

(56) References Cited

OTHER PUBLICATIONS

Scheines, Richard et al. "The TETRAD Project: Constraint Based Aids to Causal Model Specification", Jan. 1998, Multivariate Behavioral Research, 33(1). (Year: 1998).*

Cormode, Graham et al. "Anonymizing Bipartite Graph Data using Safe Groupings", Aug. 23-28, 2008, PVLDB, ACM. (Year: 2008).*

Reddy, Sudhakar Y. et al., "Constrained Exploration of Trade Spaces", 2006, 2nd IEEE International Conference on Space Mission Challenges for Information Technology, IEEE. (Year: 2006).*

Reddy, Sudhakar Y. et al., "Design Sheet: A System for Exploring Design Space", 1996, Artificial Intelligence in Design '96, Kluwer Academic Publishers. (Year: 1996).*

Kim, Eun Gi, "A Constraint Management Model for Decision Support Systems", Dec. 1993, Department of Applied Computer Science, Illinois State University.

Buckley, M.J. et al., "Design Sheet: An Environment for Facilitating Flexible Trade Studies during Conceptual Design", 1992, American Institute of Aeronautics and Astronautics, Inc.

Thiebaux, Sylvie, "Anytime Reaction Planning in Probabilistic Logic", Jun. 1992, Department of Computer Science, Florida Institute of Technology.

Reddy, Sudhakar Y. et al. "Constraint Management Methodology for Conceptual Design Tradeoff Studies", Aug. 18-22, 1996, Proceedings of the 1996 ASME Design Engineering Technology Conferences and Computers in Engineering Conference, ASME.

Weld, Daniel S., "Recent Advances in AI Planning", 1999, AI Magazine vol. 20, No. 2, American Association for Artificial Intelligence.

Sriram, R. D., "Intelligent Systems for Engineering—Chapter 4: Knowledge-Centered Problem Solving Strategies", 1997, Springer-Verlag.

Reddy, Sundhaker Y. et al., "Constrained Exploration of Trade Spaces", 2006, 2nd IEEE International Conference on Space Mission Challenges for Information Techology, IEEE.

Tapankov, Martin, "Managing Dependencies in Knowledge-Based Systems: A Graph-Based Approach", 2009, Thesis Work, Tekniska Hogskolan.

Reddy, Sunhakar Y. et al., "Design Sheet: A System for Exploring Design Space", 1996, Artificial Intelligence in Design, Kluwer Academic Publishers.

Serrano, David, "Automatic Dimensioning in Design for Manufacturing", ACM, 2 Penn Plaza, Suite 701—New York USA, Dec. 31, 1991 (Dec. 31, 1991).

Sudhakar Y. Reddy et al.; Constraint Management Methodology for Conceptual Design Tradeoff Studies, Proceedings of the 1996 ASME Design Engineering Technical Conferences and Computers in Engineering Conference, Aug. 22, 1996 (Aug. 22, 1996), Available at URL: http://teledyne-sc.com/designsheet/dtm-96.pdf.

Reddy, S. Y. et al: "Design Sheet: a system 1-15 for exploring design space", Proceedings of the International Conference on Artificial Intelligence in Design, XX.XX. Jan. 1, 1996 (Jan. 1, 1996), pp. 347-366.

S. J. Carden, "A Mathematical Framework for a general purpose Constraint Management System", Jan. 1, 1998 (Jan. 1, 1998).

Page, M. et al., "An Algorithm for 1-15 Goal-Driven Simulation", Winter Simulation Conference Proceedings, 1999 Phoenix, AZ, USA, Dec. 5-8, 1999, Piscataway, NJ, USA, IEEE, US. vol. 15 Dec. 1999 (Dec. 5, 1992), pp. 578-585, ISBN: 978-0-7803-5780-8.

Application Serial No. 13422335. System and Method for Rapid Management of Logic Formulas, Filed Mar. 16, 2012.

Japanese Office Action dated Nov. 21, 2017 for JP Application No. 2013-213580, 2 pages.

* cited by examiner

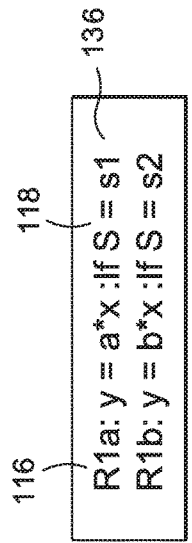
Fig. 1B
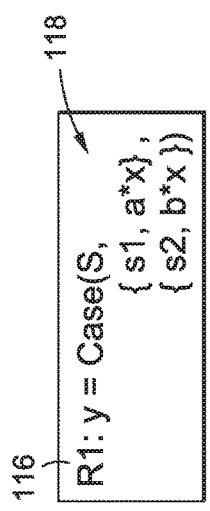
Fig. 2B
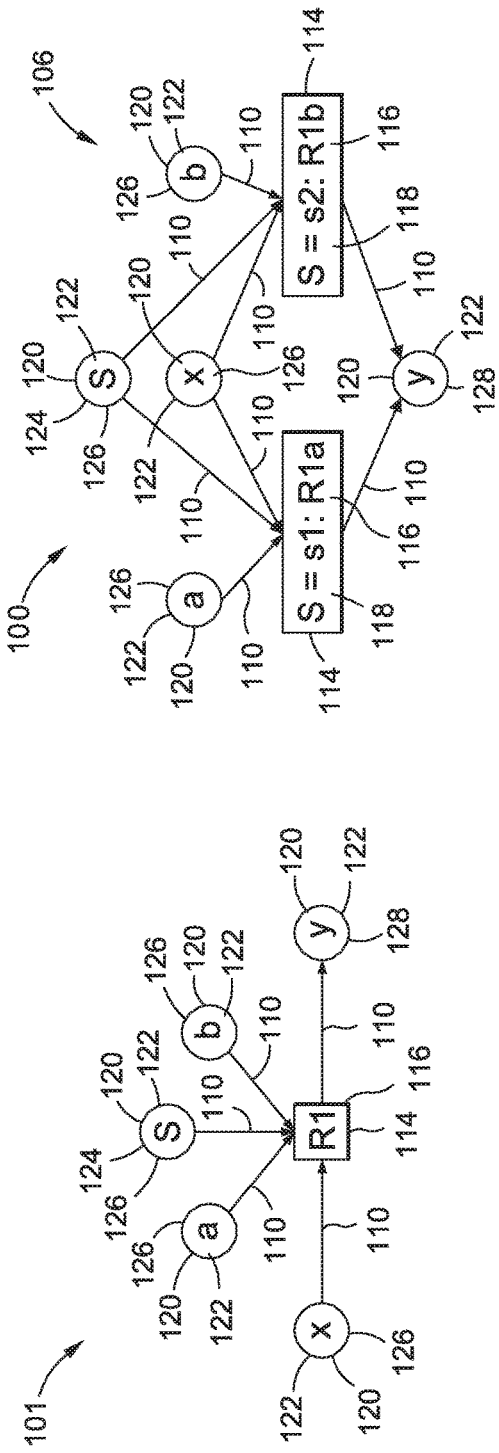
Fig. 2A
Fig. 1A

| World Set: WFF (Well-Formed Formula defining a set of worlds) | Worlds | Venn Diagram |
|---|---|---|
| True | All Worlds | | | S=s1 | S=s2 | S=s3 |<br>| Q | ▨ | ▨ | ▨ |<br>| Not(Q) | ▨ | ▨ | ▨ | |
| Q | {Q and S=s1, Q And s=s2, Q And S=s3} | | | S=s1 | S=s2 | S=s3 |<br>| Q | ▨ | ▨ | ▨ |<br>| Not(Q) | | | | |
| Not(Q) | {Not(Q) and S=s1, Not(Q) And s=s2, Not(Q) And S=s3} | | | S=s1 | S=s2 | S=s3 |<br>| Q | | | | |<br>| Not(Q) | ▨ | ▨ | ▨ | |
| S=s1 | {Q And S=s1, Not(Q) and S=s2} | | | S=s1 | S=s2 | S=s3 |<br>| Q | ▨ | | | |<br>| Not(Q) | ▨ | | | |
| Q And S=s1 | {Q And S=s1} | | | S=s1 | S=s2 | S=s3 |<br>| Q | ▨ | | | |<br>| Not(Q) | | | | |
| Q And (S=s1 Or S=s3) | {Q And S=s1, Q And S=s3} | | | S=s1 | S=s2 | S=s3 |<br>| Q | ▨ | | ▨ |<br>| Not(Q) | | | | |
| False | No Worlds | | | S=s1 | S=s2 | S=s3 |<br>| Q | | | | |<br>| Not(Q) | | | | |

Fig. 7

Method: FindPlan ( graph, inputs, outputs, worldSet)
1. Plan <- Initialize plan structure to the empty plan
2. If the argument inputs is not empty, then set specifiedInputs? = True. Otherwise, set specifiedInputs? = False
3. For each input in inputs
   3.1. vnode <- input
   3.2. AddPlanInput(vnode, False, False, plan)
   3.3. Select next input. If done, go to 4, else go to 3.1
4. For each output in outputs
   4.1. vnode <- output
   4.2. vnodeWs <- VnodeDeterminedWorldSet (worldSet, vnode)
   4.3. If vnodeWs = False, then Go to 4.3.1, Else Go To 4.4
      4.3.1. Result <- FAIL
      4.3.2. Go to 5
   4.4. AddPlanOutput (vnode, vnodeWs, plan)
   4.5. planFound <- FindPlanForVnode ( vnode, specifiedInputs?, vnodeWs, plan)
   4.6. If planFound =False, then AddPlanStub (vnode, vnodeWs, plan)
   4.7. Select next output. If done, go to 5, else go to 4.1
5. Result <- FinalizePlan (plan)
6. Return Result

Fig. 9B

Method: VnodeDeterminedWorldSet (worldSet, vnode)
1. newMap <- RepartitionMap(StatusMap(vnode), worldSet)
2. determinedWorldSet <- Union{ws[j] | ws[j] -> status[j] is an element of newMap and status[j] = 'determined'}
3. Return determinedWorldSet

Method: AddPlanOutput (vnode, worldSet, plan)
1. If <vnode,ws> is in the outputQueue(plan) then go to 2, else go to 4
2. ws <- Union(ws, worldSet) and replace this in outputQueue(plan)
3. go to 5
4. add <vnode,worldSet> to outputQueue(plan)
5. return

Fig. 11B

Method: AddPlanInput (vnode, specifiedInputs?, worldSet, plan)
1. If <ws, vnode> is in inputQueue(plan) then go to 1.1, else go to 1.3
   1.1. vnode has already been added to the input queue. Replace <ws, vnode> with <Union(ws, worldSet), vnode>
   1.2. result <- True, go to 1.7
   1.3. If specifiedInputs?= True, then go to 1.6
   1.4. Any independent vnode is allowed as an input.
        Push <worldSet, vnode> onto inputQueue(plan)
   1.5. result <- True, go to 1.7
   1.6. result <- False
   1.7. Return result

Fig. 12B

Method: FindPlanForVnode (vnode, specifiedInputs?, worldSet, plan)
1. Initialize data
   1.1. stubWorlds <- empty
   1.2. successCode <- False
   1.3. vnodeWs <- worldSet
2. for each <inflowWs, inflow> in InflowMap(vnode)
   2.1. If inflow = :Independent, then got to 2.1.1, else go to 2.2
      2.1.1. If AddPlanInput(vnode, inflowWs, plan) is True then got to 2.1.2, else got to 2.1.4
      2.1.2. successCode <- True
      2.1.3. Go to 2.3
      2.1.4. stubWorlds <- Push (inflowWs onto stubWorlds)
      2.1.5. Go to 2.3
   2.2. For each <graphWs, arcGraph> in RepartitionMap(ArcGraphs(inflow), inflowWs)
      2.2.1. if arcGraph = top level constraint graph, go to 2.2.4, else go to 2.2.2
      2.2.2. Test <- FindPlanForComponent(arcGraph, specifiedInputs?, graphWs, plan)
      2.2.3. Go to 2.2.5
      2.2.4. Test <- FindPlanForRnode(ArcRnode(inflow), specifiedInputs?, graphWs, plan)
      2.2.5. If test = True go to 2.2.6, else go to 2.2.8
      2.2.6. successCode <- True
      2.2.7. Go to 2.2.9
      2.2.8. stubWorlds <- Push(graphWs onto stubWorlds)
      2.2.9. Select next <graphWs, arcGraph>. If done go to 2.3, else go to 2.2.1.
   2.3. Select next <inflows, inflow>. If done go to 3, else go to 2.1
3. If success = True And Not(stubWorlds = empty), go to 3.1, else go to 4
   3.1. allStubWorlds <- Union(ws in stubWorlds)
   3.2. AddPlanStub(vnode, allStubWorlds, plan)
4. Return successCode

Fig. 13B

Method: FindPlanForComponent (component, specifiedInputs?, worldSet, plan)
1. Initialize variables
   1.1. vnodes <- ComponentVnodes(component)
   1.2. ws <- Intersect( worldSet, EnablingWorldSet(component))
2. For each vnode in WorldsetStateVariables(worldSet)
   2.1. If vnode in vnodes, then go to 2.1.1, else go to 2.2
      2.1.1. ws <- RemoveStateDependence(vnode, ws)
      2.1.2. go to 2.2
   2.2. Select next vnode. If done go to 3, else go to 2.1
3. result <- FindPlanForArcs(component, specifiedInputs?,
            ComponentPredecessorArcs(component), ws, plan)
4. Return result

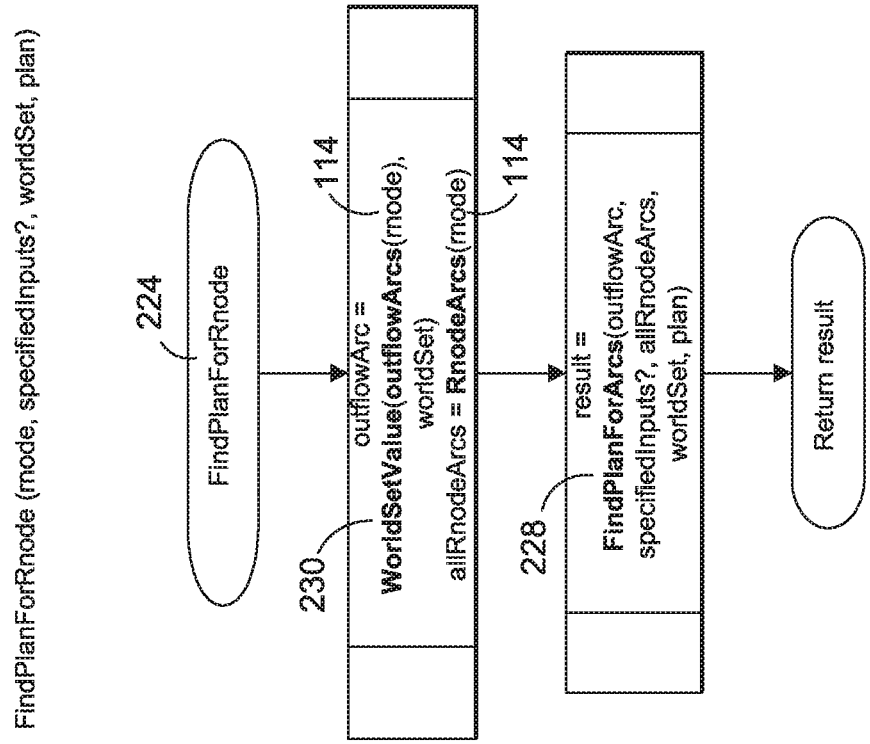

Method: FindPlanForRnode (rnode, specifiedInputs?, worldSet, plan)

1. Initialize data
   1.1. outflowArc <- WorldSetValue( outflowArcs(rnode), worldSet)
   1.2. allRnodeArcs <- RnodeArcs(rnode)
2. result <- FindPlanForArcs(outflowArc, specifiedInputs?, allRnodeArcs, worldSet, plan)
3. Return result

Fig. 15B

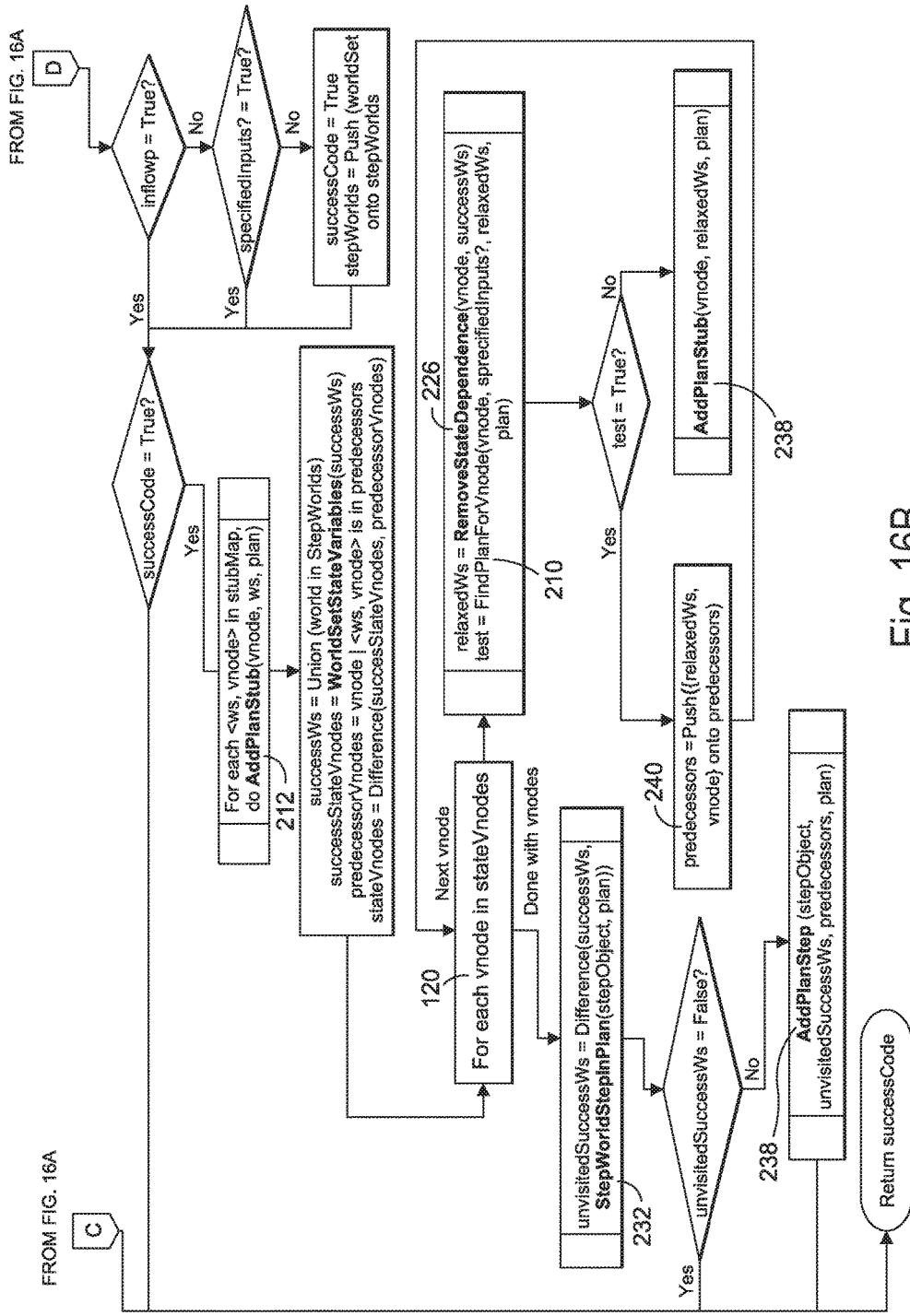

Method: FindPlanForArcs (stepObject, specifiedInputs?, arcs, worldSet, plan)
1. Initialize data
    1.1. visitedWs <- StepWorldSetInPlan( stepObject, arcs, worldSet, plan)
    1.2. unvisitedWs <- Difference(worldSet, visitedWs)
2. If unvisitedWs = False, then go to 2.1, else go to 2.3
    2.1. successCode <- True
    2.2. Go to 7
    2.3. WorldSet <- unvisitedWs
    2.4. Go to 3
3. Initialize more data
    3.1. successCode <- False
    3.2. inflowp <- False
    3.3. stepWorlds <- nil
    3.4. stubMap <- nil
    3.5. predecessors <- nil
4. For each arc in arcs
    4.1. For each <arcWs, direction> in RepartitionMap(ArcDirectionMap(arc), worldSet)
        4.1.1. If direction = 'rnode', go to 4.1.1.1, else go to 4.1.2
            4.1.1.1. vnode <- ArcVnode(arc)
            4.1.1.2. inflowp <- True
            4.1.1.3. test <- FindPlanForVnode(vnode, specifiedInputs?, arcWs, plan)
            4.1.1.4. If test = True, go to 4.1.1.4.1, else go to 4.1.1.4.5
                4.1.1.4.1. successCode <- True
                4.1.1.4.2. stubWorlds <- Push (arcWs onto stubWorlds)
                4.1.1.4.3. predecessors <- Push( <arcWs, vnode> onto predecessors)
                4.1.1.4.4. go to 4.1.2
                4.1.1.4.5. stubMap <- Push (<arcWs, vnode> onto stubMap)
                4.1.1.4.6. go to 4.1.2
        4.1.2. Select next <arcWs, direction>. If done go to 4.2, else go to 4.1.1
    4.2. Select next arc. If done, go to 5., else go to 4.1
5. If inflowp, go to 6, else go to 5.1
    5.1. If specifiedInputs? Is True, go to 6, else go to 5.2
    5.2. successCode <- True  ;; relation has no inflow, do not check for inputs here.
    5.3. stepWorlds <- Push (worldSet onto stepWorlds)
    5.4. go to 6
6. If successCode = True, go to 6.1.1, else go to 7
    6.1.1. For each <ws, vnode> in stubMap, do AddPlanStub (vnode, ws, plan).
    6.1.2. successWs <- Union (world in stepWorlds)
    6.1.3. successStateVnodes <- WorldSetStateVariables( successWs)
    6.1.4. predecessorVnodes <- vnode | <ws, vnode> is in predecessors
    6.1.5. stateVnodes <- Difference(successStateVnodes, predecessorVnodes)

Fig. 16C 6.1.6. for each vnode in stateVnodes
　6.1.6.1. relaxedWs <- RemoveStateDependence(vnode, successWs)
　6.1.6.2. test <- FindPlanForVnode(vnode, specifiedInputs?, relaxedWs, plan)
　6.1.6.3. If test = True, then go to 6.1.6.3.1, else go to 6.1.6.3.3
　　6.1.6.3.1. Predecessors <- Push (relaxedWs, vnode onto predecessors)
　　6.1.6.3.2. Go to 6.1.6.4
　　6.1.6.3.3. AddPlanStub(vnode, relaxedWs, plan)
　　6.1.6.3.4. Go to 6.1.6.4
　6.1.6.4. Next vnode. If done, go to 6.1.7, else go to 6.1.6.1
6.1.7. unvisitedSuccessWs <- Difference(successWs, StepWorldStepInPlan(stepObject, plan))
6.1.8. If unvisitedSuccessWs = False, go to 7, else go to 6.1.8.1
　6.1.8.1. AddPlanStep(stepObject, unvisitedSuccessWs, predecessors, plan)
　6.1.8.2. Go to 7
7. Return successCode

Method: AddPlanStub (vnode, worldSet, plan)
1. Does entry <- Find vnode in stubQueue(plan) exist? If so, go to 2, else go to 4
2. Modify entry's associated world set: entry(world) <- Union(worldSet, entry(world))
3. Go to 5
4. Push new entry <- <vnode, worldSet> onto stubQueue(plan)
5. Return entry.

Fig. 17B

Method: AddPlanStep (stepObject, worldSet, predecessors, plan)
1. Initialize data
   1.1. stack <- stepStack(plan) ;; extract the stack structure from the plan
   1.2. stepMap <- nil
2. If stack is empty go to 2.4, else go to 2.1
   First we check to see if the stack is empty or if its first step is in the predecessors list of step object we want to insert. If either of these cases is true, we will insert the step object and its associated step on the front of the stack. We note this means the step objet is ion the stack in front of its predecessors. We will reverse the stack to put it in the proper order at the end of the entire plan search.
   2.1. firstStep <- First(stack) ;; get the first step from the stack
   2.2. plancomputes <- PlanComputesVnodeP(firstStep, predecessors)
      determine if the variable (or variables in the case of a component) associated with the first step is (are) in the stepObject's predecessor list with an world set that overlaps the first step's world set.
   2.3. If plancomputes is True, go to 2.4, else go to 3
   2.4. stepMap <- {worldSet -> stepObject}
      form the entry for stepObject that will be added to the plan's stack
   2.5. Push stepMap onto stack
   2.6. Go to 4
3. stackRemaining <- stack, begin loop at 3.1
   This loops over the plan stack trying to find the first place to insert the stepObject. It keeps moving down the stack until ether we are at the last step and it is not a predecessor, or it finds a step in the stack which is in the predecessors list of the stepObject we want to insert.
   3.1. If stackRemaining is empty, go to 4
   3.2. stepMap1 <- First(stackRemaining)
   3.3. stepObject1 <- getObject(stepMap1)
   3.4. stepWs1 <- getWorldSet(stepMap)
   3.5. If stepObject1 = stepObject, then go to 3.5.1, else go to 3.6
      3.5.1. Destructively modify stepMap by replacing stepWs1 with Union(worldSet, stepWs1)
      3.5.2. Go to 4 (i.e. return from loop that was starting at 3)
   3.6. If stepMap2 <- Second(stackRemaining) is empty go to 3.6.3, else go to 3.6.1
      3.6.1. Plancomputes2 <- PlanComputesVnodeP(stepMap2, predecessors)
      3.6.2. If plancomputes2 is True, go to 3.6.3, else go to 3.7
      3.6.3. stepMap <- worldSet -> stepObject
      3.6.4. Push stepMap onto front of Rest(stackRemaining)
      3.6.5. Go to 4 (i.e. return from loop starting at 3)
   3.7. stackRemaining <- Rest(stackRemaining)
   3.8. Go to 3.1
4. Return stepMap.

Fig. 18B — 238

Method: StepWorldSetInPlan( stepObject, plan)
1. stepWorlds <- empty;initialize stepworlds to the empty list of worlds
2. Loop for <ws, step> in stepStack(plan)
   2.1. If step = stepObject then stepWorlds <- Push (ws onto stepWorlds).
   2.2. Get next <ws, step>. If done, got to 3, else go to 2.1.
3. result <- Union(world in stepworlds).
4. Return result.

Selected Variables: Values and StdDevs.

| Name | State | Value | StdDev | StdDevState | StdDevState |
|---|---|---|---|---|---|
| A | Independent | 6 | 0.600000 | Ind | {0.0, 5.406399} |
| CLmax | Independent | 1.2 | 0.12 | Ind | {0.0, +Infinity} |
| Cavionics | Independent | 100000 | 10000.0 | Ind | {0.0, +Infinity} |
| FTA | Independent | 4 | 0.4 | Ind | {0.0, +Infinity} |
| Q | Independent | 100 | 10.0 | Ind | {0.0, +Infinity} |
| R | Independent | 280 | 28.0 | Ind | {0.0, 140.932238} |
| SeatCost | Dependent | 1.890691 | 1.152834 | Dep | - |
| TechFactor | Independent | 1.369606 | 0.045544 | Dep | - |
| TotalCost | Dependent | 1.050081 | 0.139085 | Dep | - |
| Vmax | Independent | 130 | 13.0 | Ind | {0.0, 28.559321} |
| Wo | Dependent | 1466.270956 | 100.000000 | Ind | {55.475393, +Infinity} |
| Wpay | Independent | 100 | 10.0 | Ind | {0.0, 35.336128} |
| cost_per_crew_per_hr | Independent | 50 | 5.0 | Ind | {0.0, +Infinity} |
| cost_per_gal | Independent | 10 | 1.0 | Ind | 0.0, +Infinity} |
| eoswald | Independent | 0.8 | 0.080000 | Ind | {0.0, 2.069186} |
| etap | Independent | 0.8 | 0.080000 | Ind | {0.0, 0.402664} |

Fig. 33

SYSTEM AND METHOD FOR RAPID AND ROBUST UNCERTAINTY MANAGEMENT DURING MULTIDISCIPLINARY ANALYSIS

CROSS-REFERENCE TO RELATED APPLICATIONS

The present application is a continuation-in-part, and claims the benefit, of U.S. application Ser. No. 15/250,294 filed on Aug. 29, 2016 and entitled "SYSTEM AND METHOD FOR COMPUTATIONAL PLANNING IN A DATA-DEPENDENT CONSTRAINT MANAGEMENT SYSTEM", which is a continuation, and claims the benefit, of U.S. Pat. No. 9,507,909 filed Oct. 12, 2012 and entitled "SYSTEM AND METHOD FOR COMPUTATIONAL PLANNING IN A DATA-DEPENDENT CONSTRAINT MANAGEMENT SYSTEM", which is related to U.S. Pat. No. 9,026,410 filed Mar. 16, 2012 and entitled "SYSTEM AND METHOD FOR RAPID MANAGEMENT OF LOGIC FORMULAS", the entireties of which are hereby incorporated by reference.

FIELD

The present disclosure relates generally to constraint management systems and, more particularly, to uncertainty management in a data-dependent constraint network.

BACKGROUND

I. Background: Introduction

The conceptual design of a vehicle such as an aircraft or a space launch vehicle typically involves a set of design tradeoff studies or trade studies wherein numerous system configurations and criteria may be considered. In order to arrive at an optimal design, it is desirable to evaluate a wide variety of candidate design concepts from the standpoint of vehicle performance, cost, reliability, and a variety of other factors across multiple disciplines. The evaluation of candidate design concepts may be implemented in a computational procedure such as in a constraint management system or a constraint network.

A constraint network may be represented as a bipartite graph containing variable nodes and relation nodes interconnected by arcs. Each variable node represents a variable in the constraint network. Each relation node represents an equality constraint (e.g., an equation). An arc may connect a variable node to a relation node if and only if the variable is included in the equality constraint of the relation node. The arcs in the bipartite graph may be directed, with one outgoing arc from each equality constraint pointing to the variable that the equality constraint is meant to compute given the values of other variables that are connected to the equality constraint.

II. Background: Computational Planning in a Data-Dependent Constraint Management System In the classical implementation of a constraint network for trade study applications, the set of equations is static such that every equation is satisfied all the time. In addition, alternative computational methods may be embedded in selected equations such as in the following representation for determining the aerodynamic drag of an aircraft:

dragPlane=If(CanardIsPresent,dragBody_CanardAttached(FuselageSize)+dragCanard(CanardSize), dragBody_NoCanard(FuselageSize))

Unfortunately, embedding computational methods in equations such as in the above-noted representation can be cumbersome for a modeler of complex systems involving many different configurations. Furthermore, embedding computational methods in equations may prevent the performance of certain types of trade studies that require the reversal of the computational flow.

An alternative to embedding computational methods in equations is to make the applicability of any given equation dependent upon the computational state determined by the constraint network. An important property of constraint network modeling is the separation of computational planning from the numerical solution of the constraint sets in the computational path. Computational planning may be defined as determining the ordered sequence of computational steps (i.e., the computational path through the constraint network from a specified input variable to a specified output variable, during the performance of a given trade study). The separation of computational planning from the numerical solution of the constraint sets is essential for providing a system designer with relatively rapid feedback during a trade study. This, in turn, allows the system designer to explore a wide variety of designs during a trade study.

In the case where the applicability of each equation is not static and is instead data-dependent, an effective technique for modeling such data dependence is to attach to each equation a propositional form, or a well-formed formula (WFF), which depends upon the data in the network, and which, if such WFF evaluates to true, means that the equation is applicable in the given situation. In this regard, each WFF has a truth value defining a set of worlds where the WFF is true.

In the computational plan for a data-dependent constraint network, each computational step is associated with a propositional form or a WFF which depends upon the data in the network and upon the results computed in the previous computational steps, and which, if the WFF evaluates to true, means that the computational step is evaluated in the given situation. The WFFs associated with each computational step may be obtained by applying different combinations of union, intersection, and difference operators to the WFFs associated with the equations that need to be solved. When a WFF simplifies to a universally false WFF, the computational plan generation procedure can prune unneeded branches of a constraint network and thereby produce compact and efficient computational plans.

Traditional methods for finding a computational plan in a constraint network rely on a topological sort of the bipartite graph. The computational complexity of such traditional methods may be linear with the size of the graph. However, such traditional methods may not be applicable when the topology of the graph varies dynamically with the values of the variables in the graph as in a data-dependent constraint network. Furthermore, computational planning using traditional methods may involve the intermixing of planning and computation of the constraint sets in the computational path. The intermixing of planning and computation reduces the flexibility and speed with which a designer may explore design spaces which limits the variety of designs that a designer may explore.

As can be seen, there exists a need in the art for a system and method for computational planning in a data-dependent constraint network that avoids the intermixing of planning and computation.

III. Background: Rapid and Robust Uncertainty Management During Multidisciplinary Analysis During multidisciplinary analysis and optimization of complex systems, analysts use integrated performance and affordability models not only to assess the impact of parametric variation in design variables, but also to estimate the uncertainties in these assessments. If the analyst has knowledge of the full distribution of each of the model's input variables, then propagation of full probability distributions (or their moments) using Monte Carlo methods or more efficient numerical quadrature algorithms based on stochastic collocation are appropriate. Often, however, such distributions are unavailable. Additionally, these techniques can add a substantial amount of computing time to the trade space exploration problem.

As can be seen, there exists a need in the art for a system and method for managing uncertainty in a multidisciplinary analysis.

SUMMARY

According to various embodiments, a method of estimating uncertainty for a data dependent constraint network is presented. The method includes accessing an electronically stored bipartite graph representing the data dependent constraint network, the bipartite graph including variable nodes representing a plurality of variables, relation nodes representing a plurality of relations, and arcs interconnecting at least some of the variable nodes and the relation nodes, the plurality of variables including a set S of variables that have uncorrelated errors, a set I of variables having user specifiable values, and a set V of variables having user specifiable uncertainties, where at least one of the following occurs: the set S is not equal to the set V, the set V is not equal to the set I, or the set S is not equal to the set I; obtaining a user selection electronically, the user selection including at least one of: values for the variables in the set I or uncertainties for the variables in the set V; propagating electronically at least one gradient related to the user selection through the data dependent constraint network configured with a flow state in which nodes for the variables in the set S have only outgoing arcs; recording electronically variables that are touched by the propagating electronically at least one gradient related to the user selection; propagating electronically, through the data dependent constraint network configured in a flow state in which the nodes for the variables in the set S have only outgoing arcs, at least one uncertainty for the variables that are touched by the propagating electronically at least one gradient related to the user selection; and outputting electronically at least one outputted uncertainty for at least one variable not in the set V, such that setting an uncertainty for the at least one variable not in the set V to the at least one outputted uncertainty for the at least one variable not in the set V causes the user selection to be consistent for the data dependent constraint network.

Various optional features of the above embodiments include the following. The user selection may include values for the variables in the set I, and the method may further include: propagating electronically the user selection including the values for the variables in the set I through the data dependent constraint network configured with a flow state in which the nodes for the variables in the set I have only outgoing arcs; and recording electronically variables that are touched by the propagating electronically the user selection; where the propagating electronically at least one gradient related to the user selection includes propagating electronically at least one gradient for the variables that are touched by the propagating electronically the user selection. The bipartite graph may further include arcs between relation nodes and their included variable nodes, and dependent variable nodes of the bipartite graph may have at most one incoming arc per world. At least one of the plurality of variables may be in a strong component. The bipartite graph may lack strong components. The method may further include conducting a trade study based at least in part on the user selection and on the uncertainty for the at least one variable not in the set V. The method may further include conducting a reverse computation in which cost is treated as an independent variable. The method may further include outputting electronically at least one outputted uncertainty range for at least one variable in the set V, such that any uncertainty value for the at least one variable in the set V selected from within the outputted uncertainty range for the at least one variable in V is propagatable consistently for the data dependent constraint network. The user selection may include both values for the variables in the set I and uncertainties for the variables in the set V. Each arc from a variable $w_i$ to a relation R may cache a partial derivative of the relation R with respect to $w_i$.

According to various embodiments, a computer-implemented system for estimating uncertainty for a data dependent constraint network is presented. The system includes an electronically stored bipartite graph representing the data dependent constraint network, the bipartite graph including variable nodes representing a plurality of variables, relation nodes representing a plurality of relations, and arcs interconnecting at least some of the variable nodes and the relation nodes, the plurality of variables including a set S of variables that have uncorrelated errors, a set I of variables for which a user may specify values, and a set V of variables for which a user may specify uncertainties, where at least one of the following occurs: the set S is not equal to the set V, the set V is not equal to the set I, or the set S is not equal to the set I; an electronic user interface configured to obtain a user selection, the user selection including at least one of: values for the variables in the set I or the uncertainties for the variables in the set V; a gradient propagator configured to propagate electronically at least one gradient related to the user selection through the data dependent constraint network configured with a flow state in which nodes for the variables in the set S have only outgoing arcs; an electronic memory configured to store variables that are touched by the propagating electronically at least one gradient related to the user selection; a variance propagator configured to propagate electronically, through the data dependent constraint network configured in a flow state in which nodes for the variables in the set S have only outgoing arcs, at least one uncertainty for the variables that are touched by the propagating electronically at least one gradient related to the user selection; and an electronic display configured to output at least one outputted uncertainty for at least one variable not in the set V, such that setting an uncertainty for the at least one variable not in the set V to the at least one outputted uncertainty for the at least one variable not in the set V causes the user selection to be consistent for the data dependent constraint network.

Various optional features of the above embodiments include the following. The user selection may include values for the variables in the set I, and the system may further include: a value propagator configured to propagate electronically the user selection including the values for variables in the set I through the data dependent constraint network configured with a flow state in which nodes for the variables in the set I have only outgoing arcs; and an electronic memory configured to store electronically variables that are touched by the propagating electronically the user selection; where the gradient propagator is further configured to propagate electronically at least one gradient for the variables that are touched by the propagating electronically the user selection. The bipartite graph may include arcs between relation nodes and their included variable nodes, and dependent variable nodes of the bipartite graph may have at most one incoming arc per world. At least one of the plurality of variables may be in a strong component. The bipartite graph may lack strong components. The system may be configured to generate a trade study based at least in part on the user selection and on the uncertainty for the at least one variable not in the set V. The system may be configured to conduct a reverse computation in which cost is treated as an independent variable. The system may be further configured to output electronically at least one outputted uncertainty range for at least one variable in the set V, such that any uncertainty value for the at least one variable in the set V is selected from within the outputted uncertainty range for the at least one variable in the set V is propagatable consistently for the data dependent constraint network. The user selection may include both values for the variables in the set I and uncertainties for the variables in the set V. Each arc from a variable $w_i$ to a relation R may cache in electronic memory a partial derivative of the relation R with respect to $w_i$. The features, functions and advantages that have been discussed can be achieved independently in various embodiments of the present disclosure or may be combined in yet other embodiments, further details of which can be seen with reference to the following description and drawings.

BRIEF DESCRIPTION OF THE DRAWINGS

These and other features of the present disclosure will become more apparent upon reference to the drawings wherein like numbers refer to like parts throughout and wherein:

FIG. 1A is a diagrammatic illustration of a data-independent constraint network having one relation node representing an equality constraint interconnected by a plurality of arcs to five variable nodes each representing a variable;

FIG. 1B is a representation of the equality constraint represented by the relation node of FIG. 1A;

FIG. 2A is a diagrammatic illustration of a data-dependent constraint network having two equality constraints interconnected to the five variables;

FIG. 2B is a representation of the equality constraints represented by the relation nodes of FIG. 2A;

FIG. 7 is a table listing the various world sets involving the boolean state variable Q and the categorical state variable S with values in {s1, s2, s3};

FIG. 9B is a pseudo code listing of a routine for implementing the method of determining the computational plan illustrated in the flow diagram of FIG. 9A;

FIG. 10B is a pseudo code listing of a routine for implementing the method of determining the computational plan illustrated in the flow of FIG. 10A;

FIG. 11B is a pseudo code listing of a routine for implementing the method of updating the output queue as illustrated in the flow diagram of FIG. 11A;

FIG. 12B is a pseudo code listing of a routine for implementing the method of adding variable nodes to the input queue illustrated in the flow diagram of FIG. 12A;

FIG. 13B is a pseudo code listing of a routine for implementing the method of finding a plan for a variable node as illustrated in the flow diagram of FIG. 13A;

FIG. 14B is a pseudo code listing of a routine for implementing the method of determining a plan for a strong component as illustrated in the flow diagram of FIG. 14A;

FIG. 15A is a flow diagram illustrating one or more operations that may be included in a method of determining a plan for a relation node in a world set;

FIG. 15B is a pseudo code listing of a routine for implementing the method of determining a plan for a relation node as illustrated in the flow diagram of FIG. 15A;

FIGS. 16A-16B represent a flow diagram illustrating one or more operations that may be included in a method of determining the plan for an input argument when a plan step comprises either an arc or a strong component;

FIGS. 16C-16D represent a pseudo code listing of a routine for implementing the method of determining the plan for an input argument when a plan step comprises either an arc or a strong component as illustrated in the flow diagram of FIG. 16A;

FIG. 17B is a pseudo code listing of a routine for implementing the method of modifying the plan structure by adding a variable and associated world set to the stub queue as illustrated in the flow diagram of FIG. 17A;

FIG. 18B is a pseudo code listing of a routine for implementing the method of modifying the plan structure by adding a computational step and associated world set to the plan queue as illustrated in the flow diagram of FIG. 18A;

FIG. 19B is a pseudo code listing of a routine for implementing the method of determining a union of all of the world sets that are associated with an input step object of the plan as illustrated in the flow diagram of FIG. 19A;

FIG. 33 depicts a chart of selected values and standard deviations for variables in the model of the example of FIGS. 33, 34, and 35;

DETAILED DESCRIPTION

I. Detailed Description: Introduction

Figure 3:
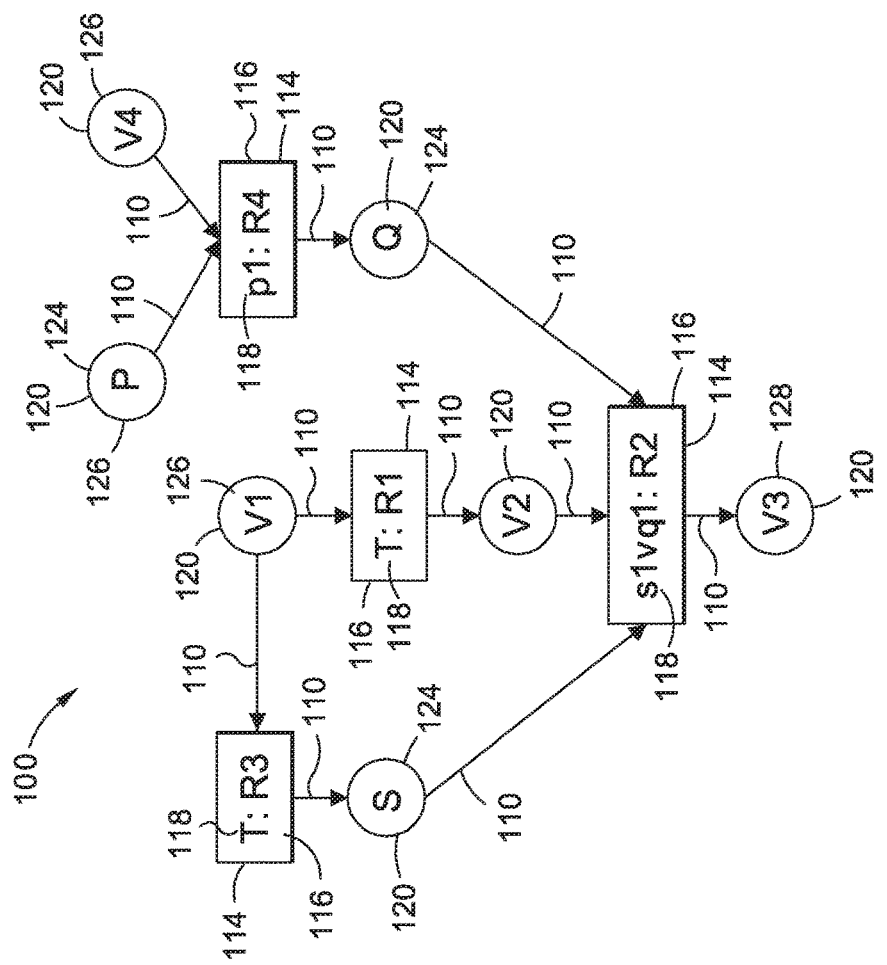
FIG. 3 is a diagrammatic illustration of a data-dependent constraint network having four equality constraints among seven variables including three state variables.

Referring now to the drawings wherein the showings are for purposes of illustrating various embodiments of the present disclosure, shown in FIG. 1A is a diagram of a data-independent constraint network 101 having one relation node 114 and five variable nodes 120 that are each connected to the relation node 114 by an arc 110. The relation node 114 represents an equality constraint, R1, or equation. Each one of the variable nodes, x, a, S, b, and y, represents a variable. FIG. 1B illustrates the equality constraint R1 of FIG. 1A wherein the conditional is embedded within the equality constraint 116. In data-independent constraint networks 101, the applicability of the constraint that is used to compute the value of any variable 122 is unconditional; that is, the applicability does not depend on the values of other variables 122 in the constraint network 101.

FIG. 2A is a diagram of a data-dependent constraint network 100 represented as a bipartite graph 106 having relation nodes 114 and variable nodes 120 interconnected by arcs 110. The relation nodes 114 represent equality constraints, R1a, R2a. The variable nodes 120 represent the five variables, x, a, S, b, and y. FIG. 2B illustrates the equality constraints 116 represented by the relation nodes 114 of FIG. 2A. In a data-dependent constraint network 100, an equality constraint 116 is active only when a boolean condition 118 is satisfied. For example, as shown in FIG. 2B, R1a is active if S=s1 and R2a is active if S=s2. The variable S is a state variable 124 which is defined as a special variable that is used in the enabling conditions of equality constraints 116. A state variable 124 comprises either a boolean variable (not shown), or a categorical variable 136 having discrete values over a finite domain (e.g., a set of states) known to the constraint network 100.

FIG. 3 is an example of a data-dependent constraint network 100 having four relation nodes 114 representing equality constraints, R1, R2, R3, and R4, and seven variable nodes 120 representing seven variables, V1, V2, V3, V4, P, Q, and S. Each relation node 114 includes the name of the constraint, e.g., R2, preceded by a logic expression (with implied state variables 124) which must be true for the constraint to be active. In an example, the equality constraints 116 may have the following conditions:

| | |
|---|---|
| Unconditionally: $V2=V1$ | R1: |
| When $S=s1$ Or $Q=q1$: $V3=V2+2$ | R2: |
| Unconditionally: $S=\text{If}(V1<10,s1,\text{If}(V1<20,s2,s3))$ | R3: |
| When $P=p1,Q=\text{If}(V4<5,q1,q2)$ | R4: |

In the constraint network 100 of FIG. 3, the variables P, Q, and S are state variables 124 having discrete values in a finite set as indicated above. In the example above, P ranges over the values, {p1, p2}, S ranges over the values, {s1, s2, s3}, and Q ranges over the values {q1, q2}.

Figure 4:
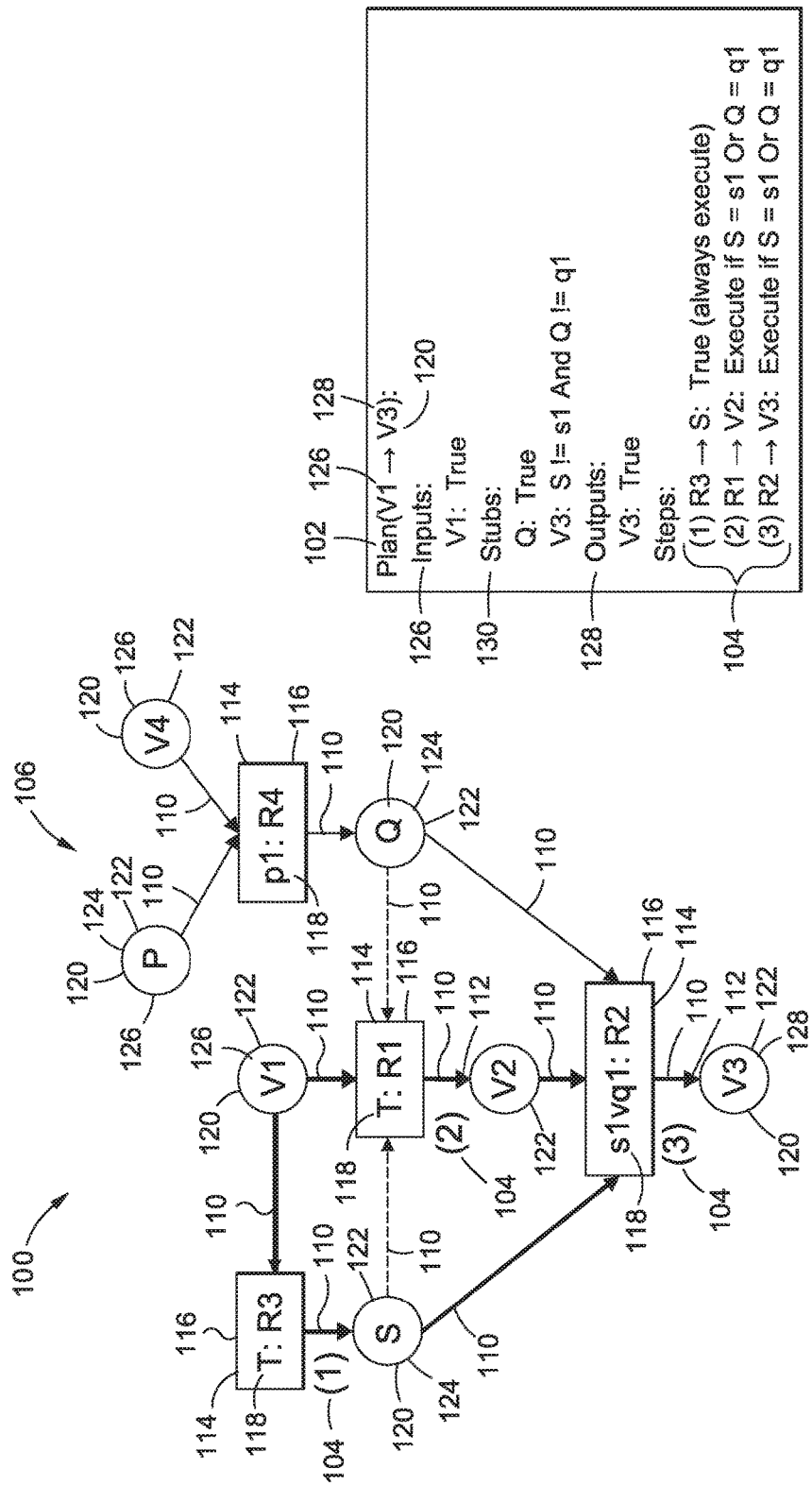
FIG. 4A is a diagrammatic illustration of the constraint network of FIG. 3 wherein the highlighted arcs graphically illustrate steps (1), (2), and (3) of a computational plan from input variable node V1 to output variable node V3.
FIG. 4B is a listing of the values for the inputs, the outputs, and the steps (1), (2), and (3) of the computational plan from input variable node V1 to output variable node V3 of the constraint network of FIG. 4A.

II. Detailed Description: Computational Planning in a Data-Dependent Constraint Management System FIG. 4A is a diagram of the constraint network 100 of FIG. 3 with the bolded arcs 110 illustrating steps (1), (2), and (3) that may be included in a computational plan 102 from input variable node V1 to output variable node V3. In the present disclosure, an input variable node is interchangeably referred to as an input variable, an input node, or an input. An output variable node is interchangeably referred to as an output variable, an output node, or an output. A data dependent constraint network is interchangeably referred to as a constraint network or a network. A conditional computational plan is interchangeably referred to as a conditional plan, a computational plan, or a plan.

Advantageously, in the present disclosure, a computational plan 102 from an input 126 (e.g., an input variable node) to an output 128 (e.g., an output variable node) may be determined for a data-dependent constraint network 100 represented by a bipartite graph 106 using a backward chaining search of the bipartite graph 106 for situations where a search branch 112 (e.g., an arc) is valid, as described in greater detail below. The computational planning process involves the use of mutually recursive routines as described below for tracking the situations in which a given search branch 112 is valid for a given world set. As described below, a world 138 (FIG. 7) comprises a complete specification of the value of all of the state variables 124 in the constraint network 100. A world set 140 (FIG. 7) is a set of worlds 138 and is defined by a defined by a well formed formula (WFF) 142 (FIG. 7) involving the state variables 124. In FIG. 4A, the dashed arcs 110 indicate the dependence of the search state on state variables 124. In the present disclosure, a variable is dependent, independent, or undetermined in a world set if it is respectively dependent, independent, or undetermined in all of the worlds of the world set. A maximal world set associated with a variable being dependent, independent, or undetermined is the set of all worlds in which that variable is respectively dependent, independent, or undetermined.

FIG. 4B illustrates a computational plan 102 from the input 126 variable node V1 to the output 128 variable node V3 for the constraint network 100 of FIG. 4A. As disclosed herein, a plan 102 for a constraint network 100 comprises a list of arcs 110 and a condition under which the relation (e.g., the equation represented by the relation node) attached to the arc 110 is to be used to compute the variable 122 attached to the arc 110. A plan 102 may also include a list of strong components 132 (FIG. 6B) representing fundamental cycles in the bipartite graph 106.

In a plan 102, each one of the arcs 110 and/or strong components 132 may be ordered in such a manner that one may check the applicability of a step of the plan 102 based on the values of variables 122 already computed by the plan 102 or based on variables 122 that are otherwise available outside the plan 102. Variables 122 that are available outside of the plan 102 are described as stubs 130 to the plan 102. Stubs 130 are located immediately upstream of the steps of the plan, but are not part of the plan 102. The values of the stubs 130 are required for performing the computations of the plan 102. In FIG. 4A, Q is a stub 130 to the plan from variable V1 to variable V3. Variable V3 is a special case of a stub 130 when the plan 102 does not have a computational path from V1 to V3 as would be the case in the example (FIG. 4A) if neither S=s1 nor Q=q1.

Figure 5:
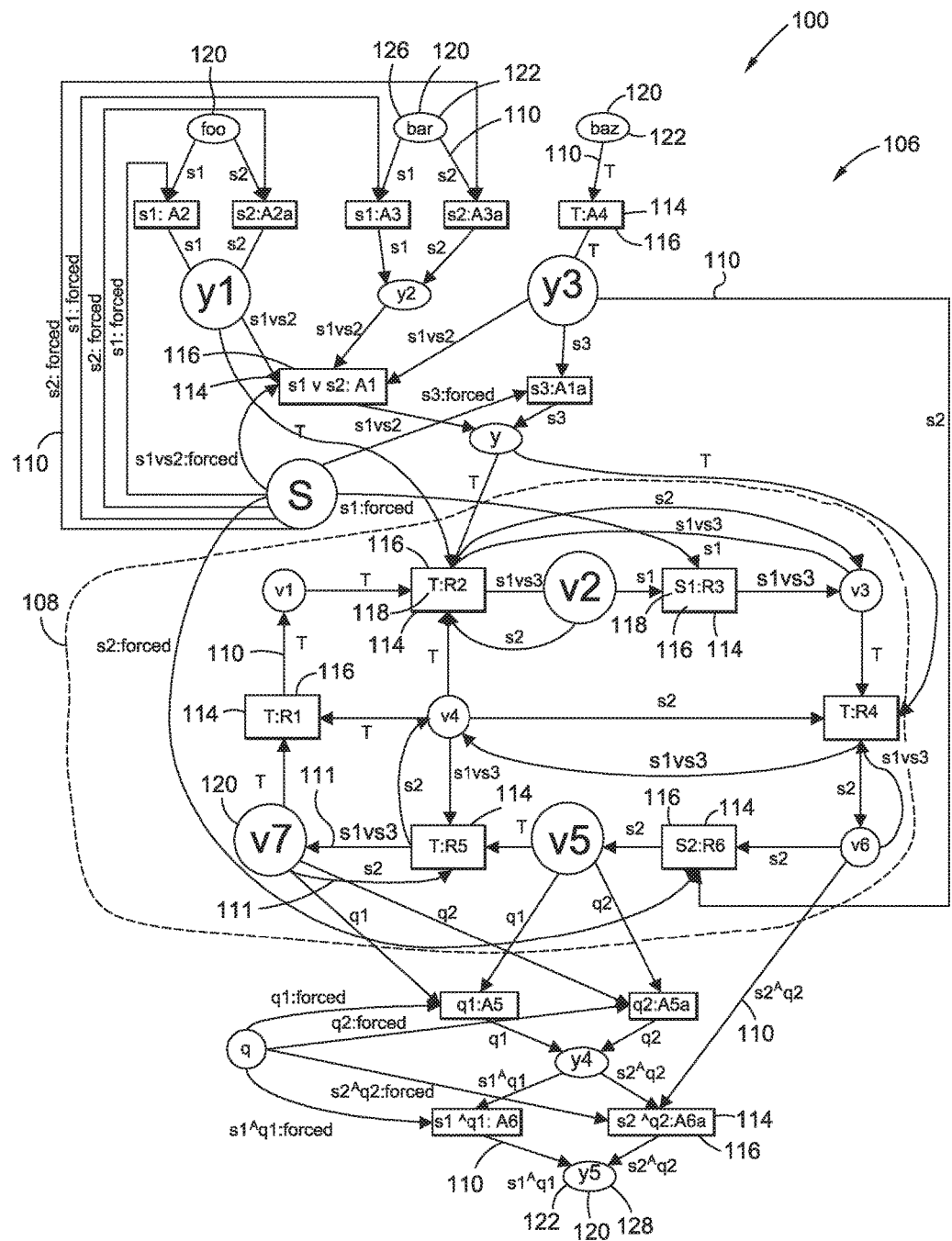
FIG. 5 is a diagrammatic illustration of a constraint network having a region with overlapping strong components and wherein each one of the equality constraints is preceded by a condition on a state variable.

FIG. 5 is a diagram of a data-dependent constraint network 100 having a region with overlapping strong components 108 encircled by a dashed line. The constraint network in FIG. 5 also includes arcs 110 having alternative directions 111 between a relation node 114 and a variable node 120. In the constraint network 100 as disclosed herein, each one of the equality constraints 116 is shown as a rectangle with the name of the equality constraint 116 preceded by a boolean condition 118 on a state variable 124. For example, in FIG. 5, the upper left-hand equality constraint, A2, is active when the state variable S=s1. The equality constraint, A2a, is active when the state variable S=s2. The notation, T, as in T: R2, indicates that the equality constraint, R2, is unconditionally active and is in the True state.

Figure 6A:
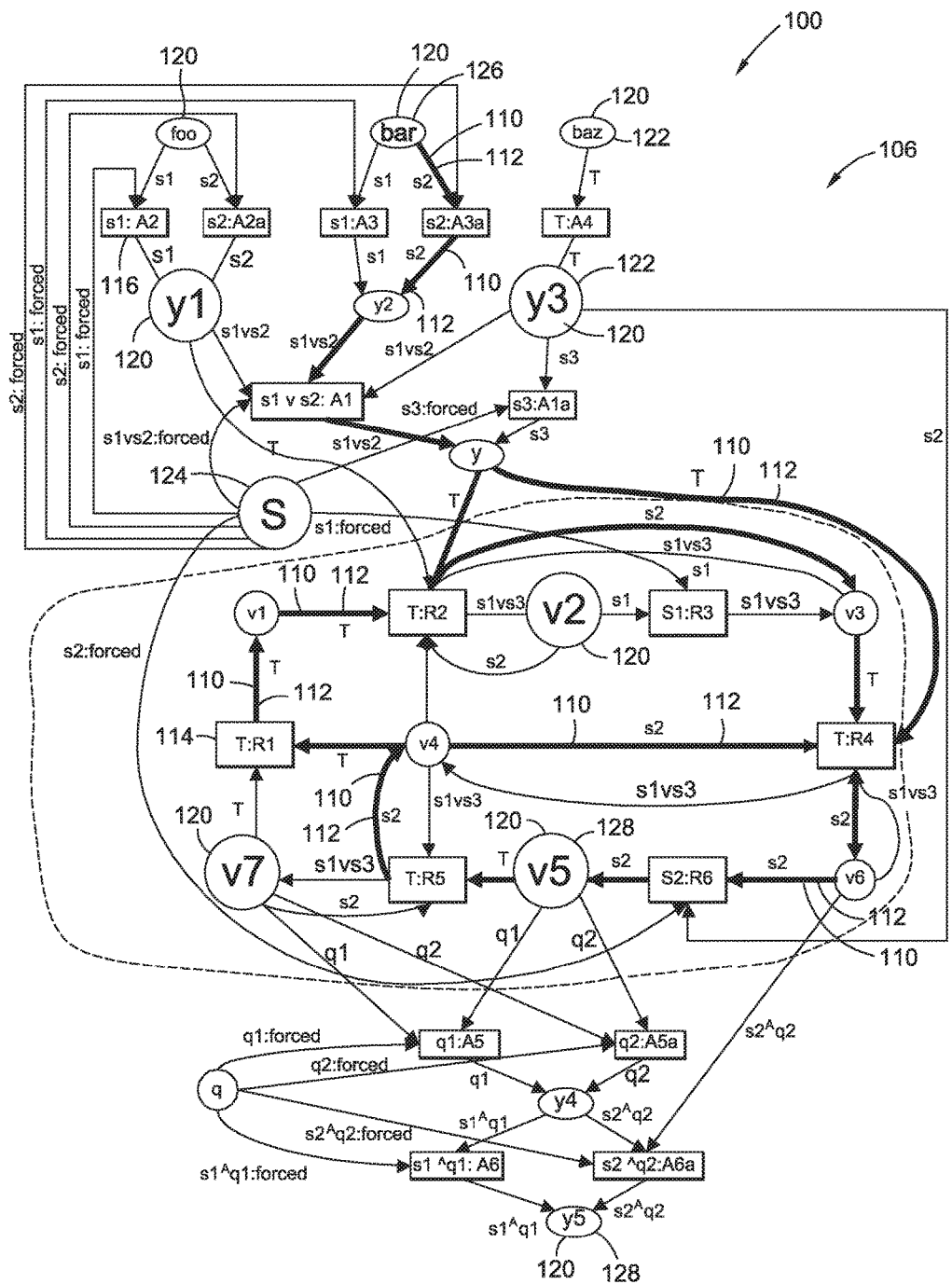
FIG. 6A is a diagrammatic illustration of the constraint network of FIG. 5 wherein the highlighted arcs graphically illustrate the steps of a computational plan from input variable node bar to output variable node v5.
Figure 6B:
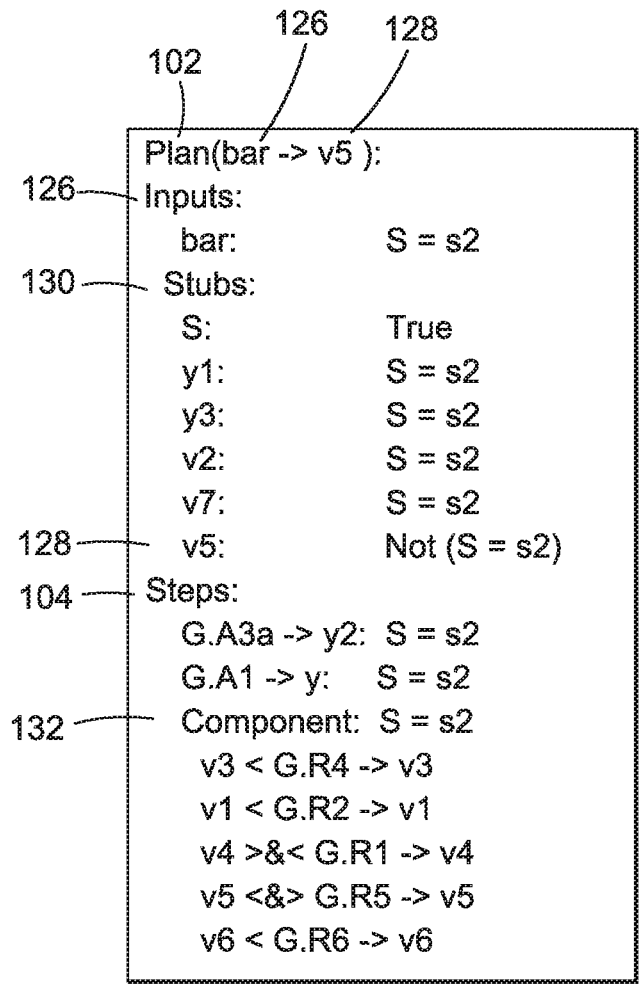
FIG. 6B is a listing of the values for the input, the output, and the steps of the computational plan from input variable node bar to output variable node v5 of the constraint network of FIG. 6A.

FIG. 6A is a diagram of the constraint network 100 of FIG. 5 wherein several of the arcs 110 and strong components 132 are bolded to indicate that such arcs 110 and strong components 132 are included in the steps of the plan 102 from input variable node "bar" to output variable node v5. FIG. 6B shows a chart that lists the values for the input 126, the output 128, and the specific steps of the plan 102 from input "bar" to output v5 of the constraint network 100 of FIG. 6A. Also shown are the stubs 130 to the plan 102 which are variables 122 that are located immediately upstream of the steps of the plan 102 but which are not computed by the plan. In the chart of FIG. 6B, S, y1, y3, v2, v7, and v5 are stubs 130 to the plan from "bar" to v5.

Referring to FIG. 7, in the present disclosure, a world 138 is defined as a complete specification of the value of all of the state variables 124 in a constraint network 100. As an example, if Q is a boolean variable 134 and S is a categorical variable 136 with the possible values in {s1, s2, 53} and if Q and S are the only state variables 124 in the constraint network 100, then there are six possible worlds:

1. Q And S=s1
2. Q And S=s2
3. Q And S=s3
4. Not(Q) and S=s1
5. Not(Q) and S=s2
6. Not(Q) And S=s3

In FIG. 7, shown is a table listing the world sets 140 involving the boolean state variable Q and the categorical state variable S with values in {s1, s2, s3}. As indicated above, a world set 140 is defined by a well-formed formula (WFF) 142 involving state variables 124. World sets 140 may comprise arbitrary logical forms involving the operators And, Or, Not, and the predicates involving the state variables 124. A constraint management system may include routines for converting logic sentences to either conjunctive normal form or disjunctive normal form, while simultaneously using the finite domain properties for the state variables to simplify negations, and unions. An example of performing a simplification may be disclosed in U.S. Pat. No. 9,026,410 filed Mar. 16, 2012 and entitled SYSTEM AND METHOD FOR RAPID MANAGEMENT OF LOGIC FORMULAS.

Figure 8:
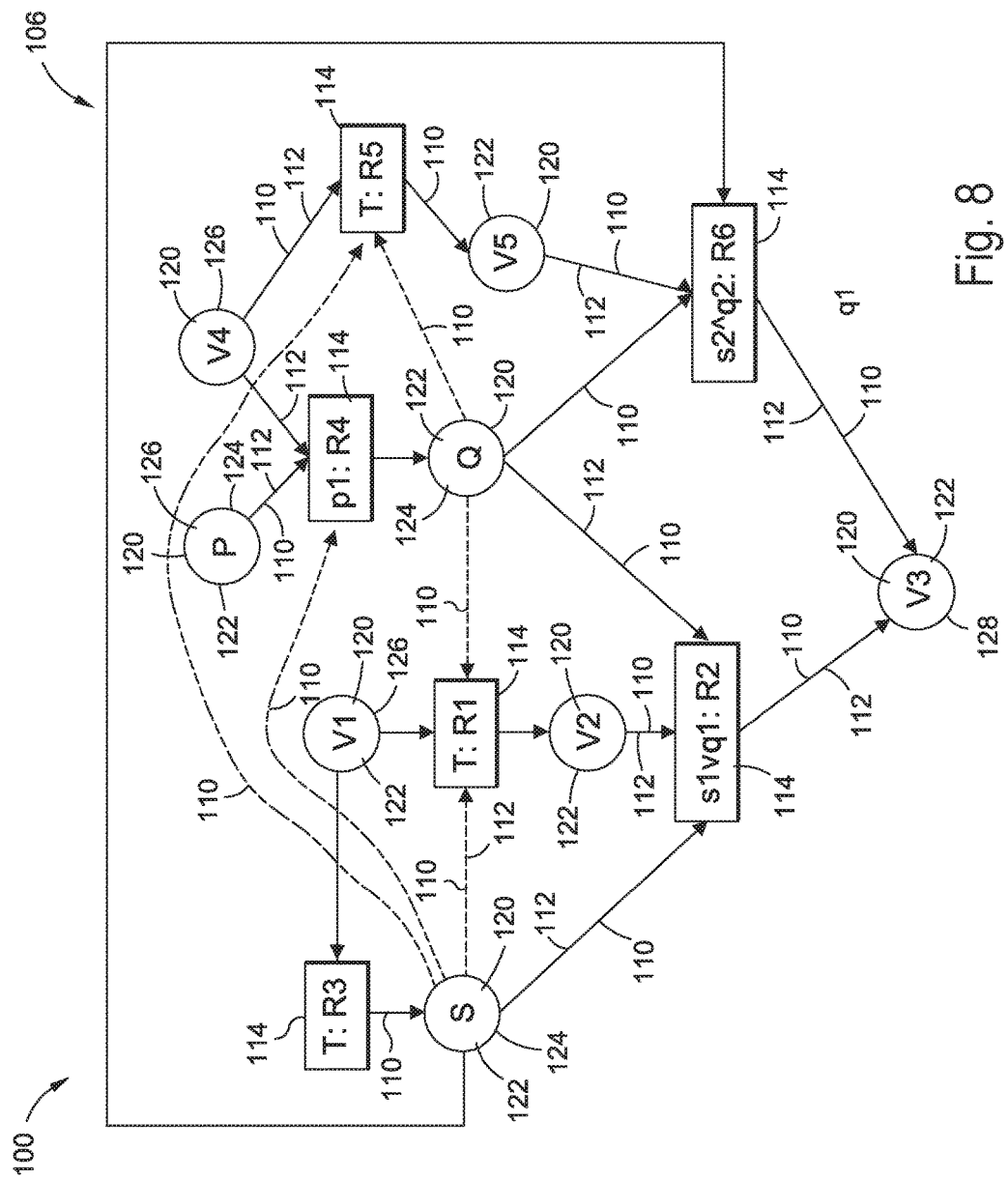
FIG. 8 is a diagrammatic illustration of a constraint network having ghost arcs illustrated in dashed font and wherein such ghost arcs may be added between a relation node and a state variable if the state variable is contained in a world set that is associated with the search branch getting to the relation node.

FIG. 8 is a diagram of a bipartite graph 106 defined by a data-dependent constraint network 100 for which a computational plan 102 (FIG. 6B) may be determined. The method of determining the plan 102 may include selecting or specifying variable nodes 120 as inputs 126 representing starting points for the plan 102, selecting or specifying variable nodes 120 as outputs 128 to be computed by the plan 102, and defining the world set 140 (FIG. 7) in which one wants the plan 102 to be valid. If input 126 variables are not specified, then all the input 126 variables in the constraint network 100 that influence the value of the output 128 variable(s) are computed by the method to use as the input 126 variables. The method of determining the plan 102 starts in a state where the specified input 126 variables are already in the independent state.

The method herein includes moving or traversing through the constraint network 100 from the inputs 126 to the outputs 128 during a backward chaining search of the bipartite graph 106. During the search process, a relevant or appropriate world set 140 is maintained along each branch of the search. The search may start with a variable 122 (e.g., an output variable node 120) and may proceed up through the variable's incoming arcs 110, each for a different world set 140, to the relation node 114 that is connected to the variable's incoming arcs 110. The process then moves upstream of those relations through their incoming arcs 110 to the variables 122 attached to the relation's incoming arcs 110. The process is recursive at the new variables 122 located upstream of the relations, as described in greater detail below.

The method may further include specifying a world set 140 in which the computational plan 102 is desired. If world set 140 is not specified, the method automatically computes the maximal world set 140 in which the output 128 nodes are in a determined state. The result computed or determined by the method is a computational plan 102 containing an input list 220, an output list 218, a stub queue 234, and a plan queue 236. In the present disclosure, input list is used interchangeably with input queue, and output list is used interchangeably with output queue. The elements of the input list 220 comprise an association between an input 126 variable and an input 126 variable world set 140 wherein the input 126 variable world set 140 is the maximal world set 140 in which the input 126 variable is independent and wherein one or more of output 128 variables are dependent on that input 126 variable in that world set 140. The elements of the output list 218 comprise an association between a variable node 120 and the maximal world set 140 in which the variable node 120 is determined. A plan queue 236 comprises an ordered list of plan steps having elements comprising an association between a plan step and the world set 140 in which the plan step is to be executed. A plan step comprises either (1) an arc 110 associated with a computational method to compute a value of a single one of the variable nodes 120 or, (2) a component 132 associated with a computational method to simultaneously compute the value of a plurality of the variable nodes 120 in the component 132. The elements of a stub queue 234 comprise an association between a stub variable node 120 and a world set 140. A stub 130 variable is any variable 122 that is needed in one or more plan steps but is independent of any of the specified input 126 variables, and the world set 140 associated with that stub 130 variable is the world set 140 in which the stub 130 variable is needed to evaluate the one or more plan steps.

In the method disclosed herein, if inputs 126 are specified as arguments to the method, the method updates the input list 220 by adding the input 126 to the input list 220 along with any specified world set or True world set. The method updates the output list by adding the output variable node 128 and the specified world set 140 to the output list if the output variable node 128 is in a determined state for the entirety of the specified world set 140, and then updates the conditional plan 102 using a backward chaining search along a search path by recursively performing the following operations: finding the plan for a variable node 120 in a given world set 140; finding the plan for a component 132 in a given world set 140; finding the plan for a relation node 114 in a given world set 140; and finding the plan for arcs 110 in a given world set 140. During the backward chaining search, the presently-disclosed method uses the following operations to update the conditional plan 102—adding plan step; adding plan stub; adding plan input; and adding plan output. The world sets 140 that are applied during such operations evolve during the backward chaining search according to the nature of the arc 110 and relation 114 conditions, as described below. When the above-noted process is completed for all of the output 128 variables, the method includes a "FinalizePlan" 214 routine to complete the plan 102, and return the completed conditional plan 102, as illustrated in FIGS. 9A-20B and described in greater detail below.

The recursive operations comprising the backward chaining search start with finding a plan 102 for a variable node 120 which, in turn, follows the inflow arcs 110 backwards along a search path. In the present disclosure, an inflow arc 110 is interchangeably referred to as an incoming arc 110. It should be noted that the enabling world sets 140 for the inflow arcs 110 associated with a given variable node 120 are, by necessity, disjoint. The world set 140 that is used for the next element along an inflow arc 110 will be the intersection of the arc's enabling world set and the incoming world set. Each inflow arc 110 leads to either finding a plan for a component 132 (e.g., using the "FindPlanForComponent" 222 routine—FIG. 14A) if the arc 110 is part of a component 132, or finding a plan for a relation (e.g., using the "FindPlanForRnode" 224 routine—FIG. 15A) if the arc 110 is not part of a component 132. These methods in turn call on the routine "FindPlanForArcs" 228 (FIG. 16A), on all the arcs 110 of the component 132 predecessors or relation inflow arcs 110, depending on the case, and removing state variable dependence as needed.

As the search path is traversed through a relation node 114, component 132, variable node 120, or along an arc 110, the method maintains the appropriate world set 140 along the path as the intersection of the evolving world set 140 with each enabling world set 140 of the elements in the path. The method may initially note or determine whether any search path starting with a predecessor arc 110 of a plan step ends at a specified input 126 variable node 120 and, if so, update the stub queue 234 with a stub variable and an associated stub world set 140. The stub variable comprises the variable associated with any other predecessor arc 110 whose search paths do not terminate at any of the specified input 126 variables. The stub world set comprises the union of the world sets 140 of those search paths.

The method or process for finding (e.g., determining) a computational plan 102 may be described by way of example with reference to FIG. 8. In a process for determining a computational plan 102 from variable node v4 to v3, the plan 102 may be initialized with an input 126 list with the variable v4 in the False world set. The world set may be later amended as search paths are determined from v3 back to v4 in different world sets. The process may start at variable node v3 in the True world, and may include searching along v3's incoming arcs, R2→v3 and R6→v3. Without loss of generality, it is assumed that the first search R6→v3 has an associated world set of S=s2^Q=q2. The search may continue to the incoming arcs to R6 (v5→R6, Q→R6, S→R6) with return of "success" if one of the input nodes is found along any path. For example, the process may include searching v5→R6 with associated world set True. Conjoining True with the current world set, S=s2^Q=q2, results in S=s2^Q=q2^T, which simplifies to S=s2^Q=q2.

Referring still to FIG. 8, the process may continue with a search of the upstream arcs of v5, of which there is only one, R5→v5, and eventually finishing at node v4 in world set S=s2^Q=q2, such that v4 is added to the plan input list 220 disjoining the world set 140 previously associated with v4 with the world set 140 that was used to get to v4 along the current search branch. At this stage, the world set 140 is (S=s2^Q=q2)vFalse, which simplifies to S=s2^Q=q2. Continuing the process will result in arriving at v4 in world sets P=p1^S=s2, and other world sets 140. The final result is that v4 is an input to the plan to v3 in the world set (P=p1^Q=q2) V(P=p1^S=s2), and wherein there is no plan in the negation of this world set.

In the present disclosure, the system and method advantageously provides a means for handling a scenario wherein a state variable 124 is encountered in the search path and the world set 140 of the search branch 112 to that state variable 124 includes the same state variable. Such a scenario is illustrated in FIG. 8 when going up the Q→R6 arc 110 and a plan is still needed for Q. In this scenario, Q must be removed from the world set 140 before proceeding further, because the execution of a plan to determine a state variable 124 such as Q cannot depend on the value of that state variable 124 in any of the predecessors to computing the state variable 124. The new world set 140 would therefore become S=s2 only. The process would include going up the incoming arcs of Q to R4, conjoining the enabling state of R4, which is P=p1, with S=s2, which returns P=p1^S=s2. Going up the incoming arcs arrives at v4 again in the state P=p1^S=s2. A different search branch arrives at v4 in state S=s1^P=p1. The Q dependence is removed when going through the node Q.

A further advantage provided by the system and method disclosed herein is the addition of a search branch 112 from a relation to a given state variable 124 even if the relation does not depend on the state variable 124. Such a search branch 112 is added if that state variable 124 is contained in the world set 140 associated with the search branch 112 getting to that relation. Added search branches 112 are defined as ghost arcs 110 and are shown in dashed font in FIG. 8. The requirement to add such search branches 112 is a result of the requirement that a state variable 124 must be a predecessor of the plan 102 going through the relation if the execution of the relation will be conditioned by a world set 140 containing the state variables 124.

In the present disclosure, provided is a method for creating, determining, or finding a computational plan 102 (FIG. 6B) for computing the values of a user specified set of output variables 122 (FIG. 8) from a user specified set of input variables 122 of a data-dependent constraint network 100 (FIG. 8) represented by a bipartite graph 106. The presence of one or more equality constraints in the constraint network 100 may depend upon the values of one or more variables 122 in the constraint network 100. A significant advantage of the disclosed method is the avoidance of intermixing of planning and computation as required by traditional conditional planning methods. The avoidance of intermixing of the planning and the computation results in a significant reduction in the amount of time required to perform the computational steps during trade studies that explore different regions of a design space.

The presently-disclosed system and method imposes conditions on the nature of the data-dependent constraint network 100 (FIG. 8) that are required for operation of the system and method. The data-dependent condition on each relation in the constraint network 100 is specified by a well-formed formula (WFF) which, as indicated above, is a logical sentence formed using AND, OR, and NOT operators connecting base predicates over finite domains. In the present disclosure, the value of any variable 122 involved in a condition on an equality constraint 116 (FIG. 8) must be over a known finite range. For example, the value of an engine in a hypersonic vehicle study may vary over the engine types: "rocket", "ramjet", "scramjet", and other engine types. Variables 122 with continuous values such as aerodynamic drag cannot be used directly as conditioning values for a relation. Rather, in the present disclosure, such variables 122 may be quantized into a finite set for conditioning purposes. For example, the quantized variable "dragLevel" may be defined with a constraint such as dragLevel=Case ({drag<x1, "negligibleDrag"}, {drag<=x2, "lowDrag"}, {Else, "highDrag"}) and then different equality relations may be conditioned for computing flight behavior dependent on the value of dragLevel.

Referring now to FIGS. 9A-20B, shown are routines and the corresponding pseudo code that may be implemented in a method for determining a computational plan 102 (FIG. 6B) for a data-dependent constraint network 100 (FIG. 8) represented by a bipartite graph similar to the bipartite graph 106 illustrated in FIG. 8. The routines shown in FIGS. 9A-20A may include one or more functions to facilitate the determination of the computational plan 102. Such routines may be written into programming instructions for the method and/or the routines may be included in the underlying programming language. The following comprises a brief description of functions, objects, and object attributes that may be included in the routines.

rnode: a relation node in the bipartite graph.
vnode: a variable node in the bipartite graph.
arc: an arc connecting a given vnode to a given rnode.
graph: either the top level bipartite graph or a strong component within that graph.
ArcRnode(arc): the rnode connected to the given arc.
ArcVnode(arc): the vnode connected to the given arc.
RnodeArcs (rnode): the set of arcs connected to the given rnode.
VnodeArcs (vnode): the set of arcs connected to the given vnode.
Union(ws[1], ws[2], . . . ): the disjunction or union of all the worlds specified in the input list of world sets, ws[1], ws[2], . . . .
Intersection(ws[1], ws[2], . . . ): the conjunction or intersection of all the worlds specified in the input list of world sets, ws[1], ws[2], . . . .
ComponentVnodes(component): The vnodes that are in the strong component.
ComponentPredecessorArcs (component): The predecessor arcs of the strong component defined as arcs that point into relations in the components enabling world set.
EnablingWorldSet(object): The world set in which the object is enabled. This is defined for vnodes, rnodes, components, and arcs.
WorldSetStateVariables (worldSet): The state variables that are specific to the specified world set.

In the present disclosure, the system and method for determining a computational plan 102 (FIG. 6B) includes maintaining a set of mappings (not shown) that allow for world set attributes of the nodes. For example, such world set attributes may include a variable node's status such as: the world set in which the variable node is independent, the world set in which the variable node is undetermined, the world set in which the variable node is determined by different equality constraints, and other attributes. The domain of a world set mapping is a partition of the nodes enabling world set comprising the union of all worlds in which the variable node has an existence. For example, given a relation node with enabling world set "rnodeWS", the world set mapping for the outgoing arcs attribute (e.g., an outgoing arc of a relation node points to the variable that the relation node is defining in the given world set) may be defined as follows:

$ws_1 \rightarrow arc_1$
$ws_2 \rightarrow arc_2$
. . .
$ws_i \cap ws_j = \emptyset$
$ws_i \neq \emptyset$
$\cup_i ws_i = rnodeWS$
$arc_i \neq arc_j$ In the present disclosure, the constraint network 100 maintains the above-described world set attribute maps, and includes procedures for re-partitioning an attribute map with respect to a specified world set, as represented by the following function:

output Map<-RepartitionMap(inputMap, worldSet)

wherein outputMap is generally the same as the inputMap (not shown) except that outputMap is restricted to worldSet. In the present disclosure, restructuring may be required to ensure that the outputMap is a partition of worldSet in the sense that, when intersecting worldSet with the elements in the original inputMap, some of the intersections may be empty and therefore may not be present in the resultant map.

In the present disclosure, the constraint management system or constraint network 100 (the terms being used interchangeably herein) may include the following lookup functions:

WorldSetValue(attributeMap, worldSet)

which may return the attribute specified by the given world set if and only if worldSet is subsumed by (i.e., equals or is a proper subset of) only one of the world sets in the attributeMap, otherwise, the lookup function WorldSetValue 230 (FIG. 15A) returns empty.

For the pseudo code illustrated in FIGS. 9B-20B, the following world set attribute maps may be managed by the constraint network 100:

InflowMap(vnode): The mapping from a world set to the arc directed toward the given vnode in that world set.

OutflowArcs (rnode): The mapping from a world set to an outflow arc from the relation in that world set. An outflow arc in a given world set is nothing more than an arc whose direction is pointing away from the rnode in the given world set.

StatusMap(vnode): The mapping from a world set to the status attribute of the vnode in the given world set.

ArcGraphs(arc): An arc can be in multiple strong components as well as in no strong component in different world states. This world set attribute records the mapping from a world set to the strong component the arc is in for the given world set as well as a map from a world set to the top level constraint graph for the world set for which the arc is not in any strong component.

ArcDirectionMap(arc): A mapping from a world set to the direction of the arc—either towards the vnode, towards the rnode, or undirected.

The pseudo code illustrated in FIGS. 9B-20B may also include the following functions for defining a specific data structure for a plan which may be defined as an object having the following attributes:

inputQueue(plan): the set of input variables to the plan.
outputQueue(plan): The set of output variables to the plan.
stepStack(plan): The ordered set of step objects in the plan. Each step object is a pair <worldSet, step> where the step is to be executed if we are in one of the worlds in worldSet, and step is either an arc connecting an upstream rnode to its immediate downstream vnode in the given worldSet or a strong component in that worldSet.
stubQueue(plan): The set of stub variables in the plan. Stub variables are variables immediately upstream of some step (i.e., arc or strong component) in the plan, but which is not downstream of any of the plan inputs. The values of the stub variables are required when executing the plan steps.

Figure 9A:
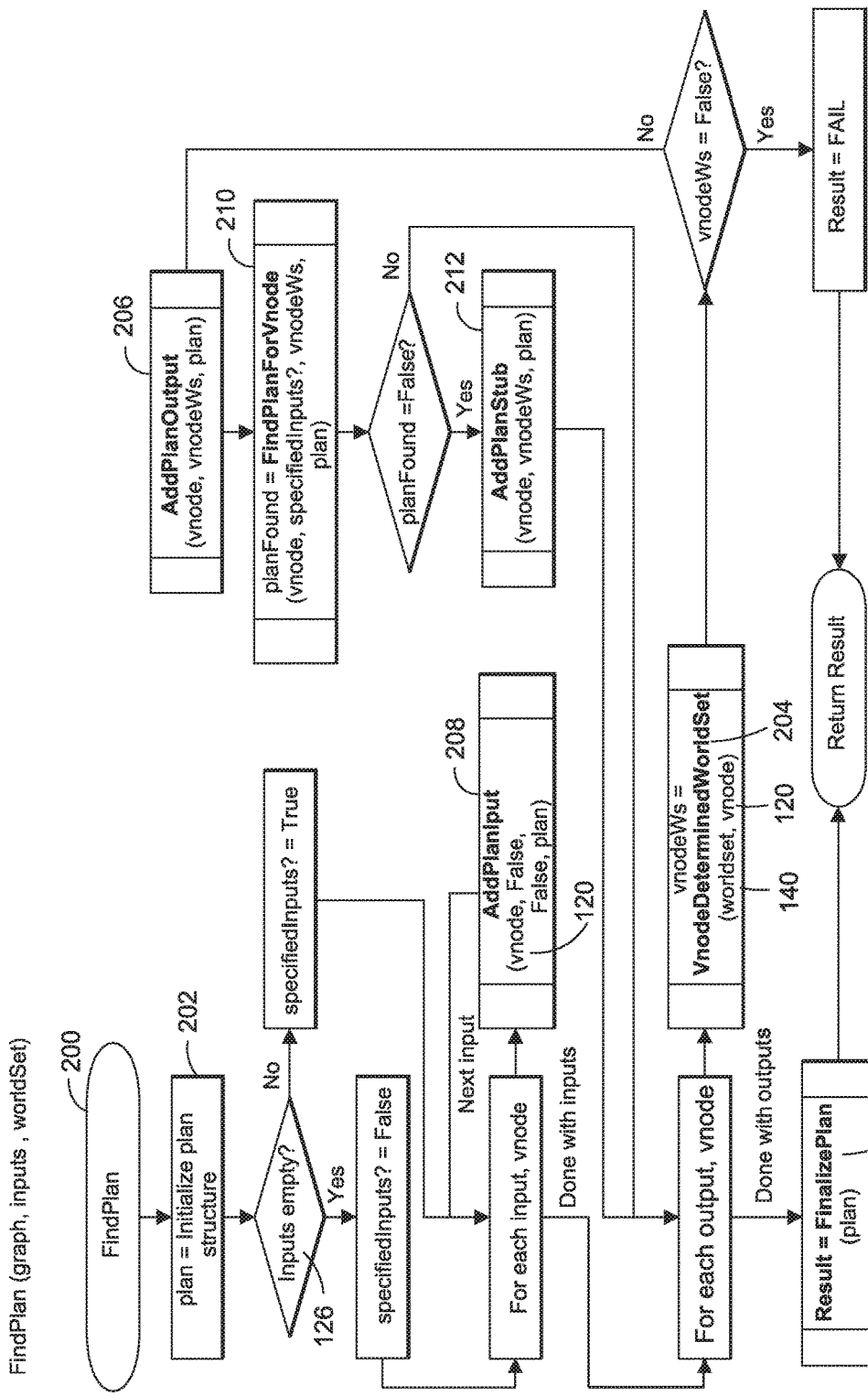
FIG. 9A is a flow diagram illustrating one or more operations that may be included in a high-level method of determining a computational plan for a data-dependent constraint network.

Referring to FIGS. 9A-9B, shown in FIG. 9A is a flow diagram having one or more operations that may be included in a method for finding (e.g., determining) a computational plan 102 (FIG. 6B) for a data-dependent constraint network 100 (FIG. 8). FIG. 9B is a pseudo-code listing of a high-level routine "FindPlan (graph, inputs, outputs, worldSet)" for finding (e.g., determining) a computational plan 102 for a data-dependent constraint network 100 in the manner illustrated in FIG. 9A. As indicated above, the constraint network 100 is represented by a bipartite graph 106 (FIG. 8) containing variable nodes 120 (FIG. 8) and relation nodes 114 (FIG. 8) interconnected by arcs 110 (FIG. 8). The "FindPlan" routine 200 returns either the plan 102 from "inputs" (e.g., input variable nodes) to "outputs" (e.g., output variable nodes), or the "FindPlan" routine 200 returns "Fail" if one or more of the outputs is not determined in the constraint network 100. The arguments in the routine 200 include:

graph: a structure representing the bipartite graph defined by the data-dependent constraint network.
outputs: a list of variables that the plan computes.
inputs: a list of variables that comprise starting points for the plan.
worldSet: the world set in which the plan is determined to be valid.

The routine "FindPlan" 200 may include initializing the plan structure 202 as described below. In the "FindPlan" 200 routine, if no inputs 126 are specified in the arguments list, then the computational plan 102 will contain as inputs 126 all independent variables 122 that are located upstream of the outputs 128. If inputs 126 are specified, then the inputs 126 for the computational plan 102 will be restricted to the inputs in the specified arguments list. For each input 126, the routine "AddPlanInput" 208 may be implemented to add variable nodes 120 to an input queue 220 of the plan 102 as described below. For each output 128, a routine "VnodeDeterminedWorldSet" 204 may be implemented to determine a world set 140 in which a status of the variable nodes 120 is determined. A routine "AddPlanOutput" 206 may also be implemented for each output 128 to update the output queue for that output 128. In addition, for each output 128, a routine "FindPlanForVnode" 210 may be implemented to find a plan 102 for a given variable node 120. The routine "AddPlanStub" 212 may also be implemented to update the stub queue for each stub variable found during the backward chaining search process as described below. The routine "FinalizePlan" 214 may finalize the plan 102 by reversing the order of plan steps (not shown) determined in "FindPlan".

Figure 10A:
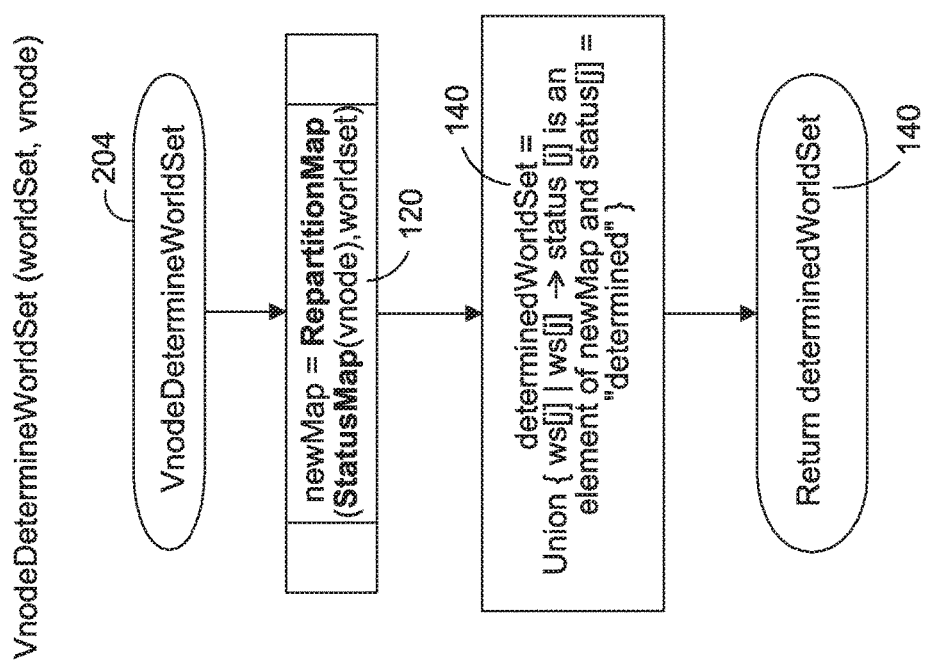
FIG. 10A is a flow diagram illustrating one or more operations that may be included in a method of determining a world set in which a status of the variable nodes is determined.

Referring to FIGS. 10A-10B, shown in FIG. 10A is a flow diagram having one or more operations that may be included in the routine "VnodeDeterminedWorldSet(worldSet, vnode)" 204. The routine 204 may be configured to determine a world set 140 in which a status of the variable nodes 120 is determined (either dependent or independent.) FIG. 10B is a pseudo-code listing of the routine "VnodeDeterminedWorldSet" 204 illustrated in the flow diagram of FIG. 10A. The routine returns the world set 140 in which the status of the vnode 120 (i.e., variable node) is determined. The routine 204 incorporates the following arguments:

worldSet: input world set used to partition the vnode status' map.

vnode: the variable node for which the determined world set is needed.

Without loss of generality, the status attribute map of vnode is assumed to be:

ws[1]→status[1],
ws[2]→status[2],
. . .

wherein ws[j] are world sets that form a disjoint partition of the enabling state of vnode. More specifically, Union (ws[j], j=1, . . . , n)=vnode enabling world set, which is typically True, and ws[i]≠Φ,
ws[i]∧ws[j]=Φ, and
status[i]≠status[j].

In the routine "VnodeDeterminedWorldSet" 204, the status[j] range over values that allow the constraint network 100 (FIG. 8) to determine if the node has an arc 110 (FIG. 8) pointing to it in the ws[j]: is independent in the ws[j], is dependent in the ws[j], etc. Arcs 110 have a direction attribute map in the sense that an arc 110 can be directed toward their rnode 114 (FIG. 8), directed toward their vnode 120 (FIG. 8), or undirected simultaneously but in different world sets 140. In the present disclosure, a vnode 120 may have status "determined" in a world set 140 if and only if it is either (a) "independent" in that world set 140 or a super-set thereof or, (b) it has an arc 110 whose direction is toward the vnode 120 in the given world set 140 and the immediately upstream vnodes 120 of the rnode 114 (i.e., upstream with respect to a given world set 140) attached to that arc 110 are determined in that world set 140.

Figure 11A:
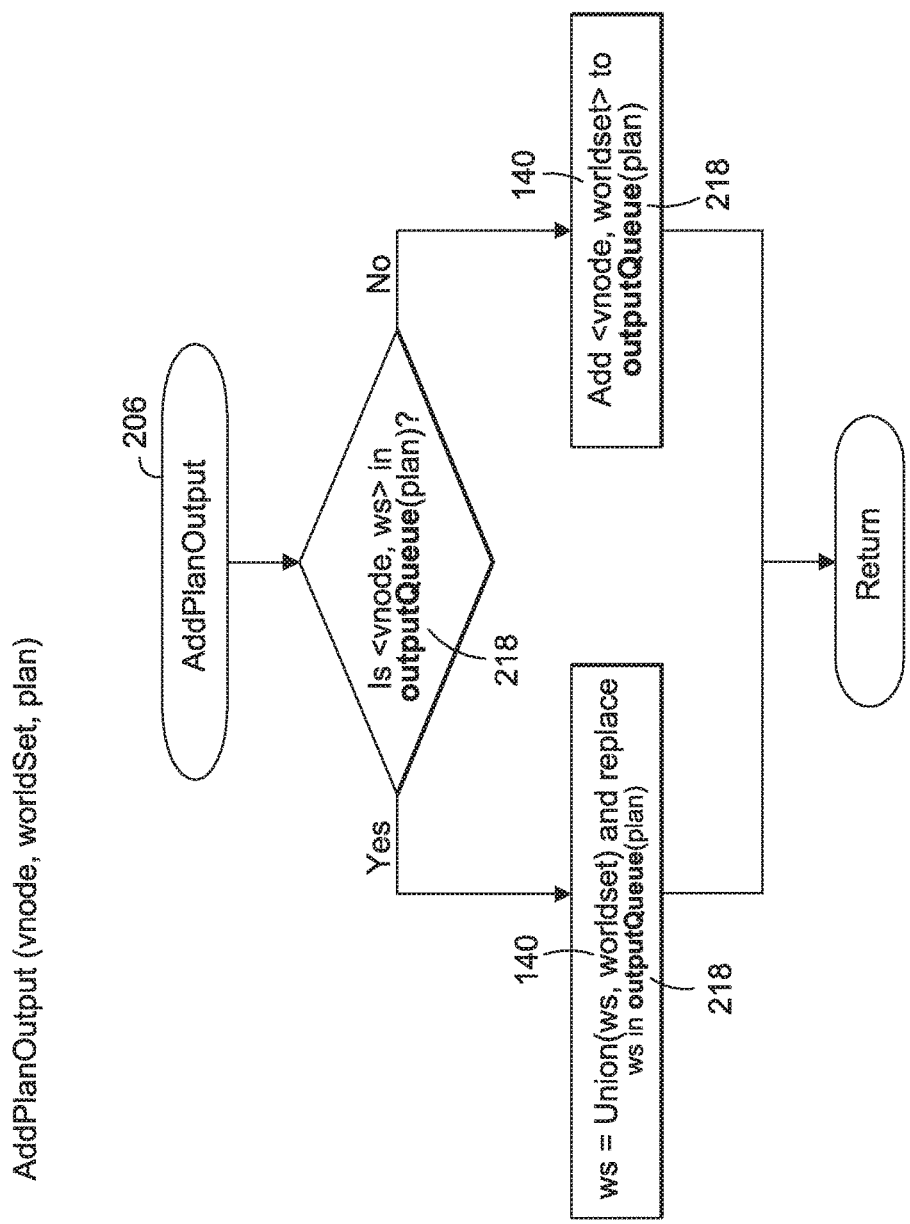
FIG. 11A is a flow diagram illustrating one or more operations that may be included in a method of updating the output queue for the plan.

Referring to FIGS. 11A-11B, shown in FIG. 11A is a flow diagram having one or more operations that may be included in the routine "AddPlanOutput (vnode, worldSet, plan)". The routine 206 is configured to update the output queue 218 for the plan 102. The plan structure may include a stub queue (not shown), a plan queue (not shown), and an output queue 218. FIG. 11B is a pseudo-code listing of the routine "AddPlanOutput" 206 illustrated in the flow diagram of FIG. 11A. "AddPlanOutput" 206 may include the function "outputQueue" 218 and may incorporate the following arguments:

vnode: the output variable being added to the plan.

worldSet: the world set in which vnode is an output variable.

plan: the plan being modified, the structure of which is described below.

As indicated above, the plan structure maintains a stub queue, a plan queue, and an output queue. Each queue comprises a set of ordered entries with each entry includes a world set 140 and an element associated with the world set 140. The elements for the stub queue and output queue 218 are variables 122 (FIG. 8). The elements for the plan queue are either arcs 110 (FIG. 8) or strong components 132 (FIG. 8) representing steps in the plan. For example:

```
output queue =
{ <vnode[1], ws[1]>,
  <vnode[2], ws[2]>,
  ...}
```

Figure 12A:
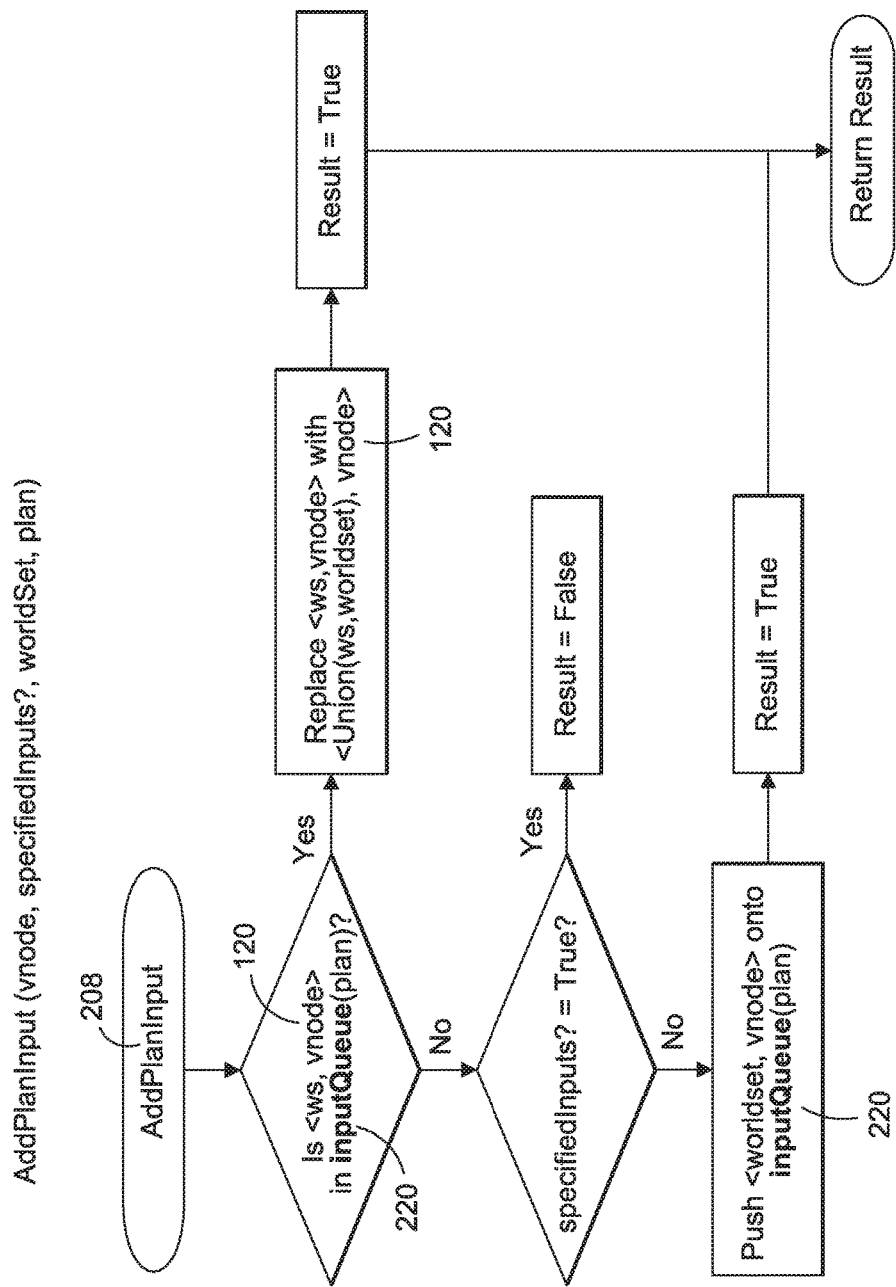
FIG. 12A is a flow diagram illustrating one or more operations that may be included in a method of adding variable nodes to an input queue of the plan.

Referring to FIGS. 12A-12B, shown in FIG. 12A is a flow diagram having one or more operations that may be included in the routine "AddPlanInput (vnode, specifiedInputs?, worldSet, plan)". The routine 208 is configured to add variable nodes 120 and the associated world sets to the input queue 220 of the plan 102. FIG. 12B is a pseudo-code listing of the routine "AddPlanInput" 208 illustrated in the flow diagram of FIG. 12A. If the vnode 120 is not present in the input queue, the vnode and the associated world set are added to the input queue, or if the vnode 120 is already present, then its associated world set 140 is updated. If specifiedInputs? Is False or if the vnode is already present, the routine 208 returns True, otherwise, the routine returns False.

Figure 13A:
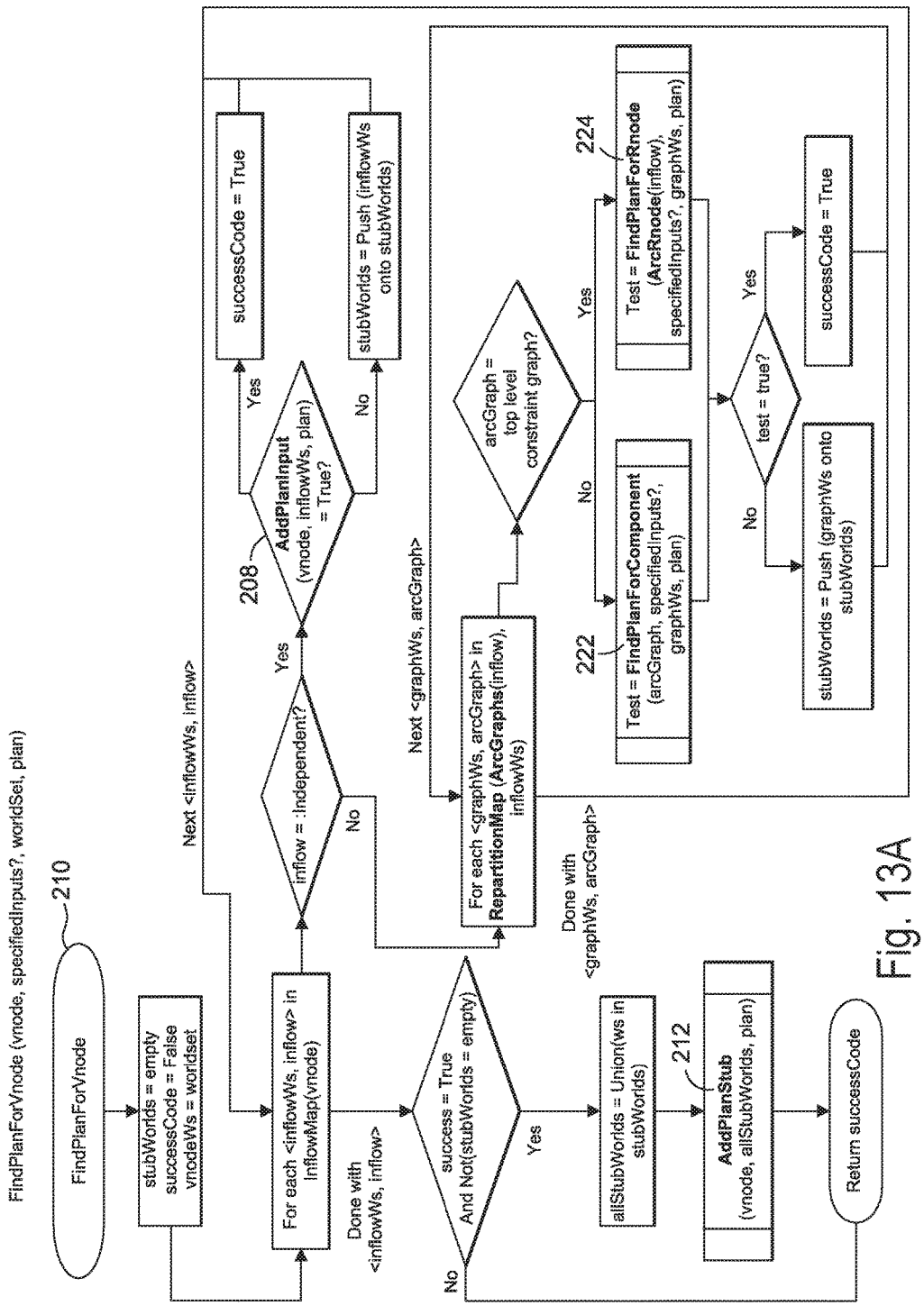
FIG. 13A is a flow diagram illustrating one or more operations that may be included in a method of finding a plan for a variable node in a world set.

Referring to FIGS. 13A-13B, shown in FIG. 13A is a flow diagram having one or more operations that may be included in the routine "FindPlanForVnode (vnode, specifiedInputs?, worldSet, plan)". FIG. 13B is a pseudo-code listing of the routine "FindPlanForVnode" 210 illustrated in the flow diagram of FIG. 13A. The routine 210 may incorporate the following arguments:

vnode: the variable node for which we seek a plan.

specifiedInputs?: If true, then the list of inputs is restricted to user-specified inputs. If false, then any independent variable may be an input to the plan if the variable is located upstream of an output variable.

worldSet: the world set for which the plan is relevant.

plan: the plan structure being modified by this element of the planning process.

The "FindPlanForVnode" 210 routine is mutually recursive with the routines "FindPlanForRnode" 224, "FindPlanForArcs" 228, and "FindPlanForComponent" 222 illustrated in FIGS. 14A-16D and described below. As indicated above, the constraint management system or constraint network 100 is configured to maintain an inflow world set attribute map for each vnode 120. The inflow world set attribute map is a mapping from world sets 140 to arcs 110 where an arc 110 is directed toward a vnode 120 in that world set 140 and/or a world set 140 to a code for: Independent to indicate that the vnode 120 is independent in that world set 140. In the method disclosed herein, the process loops over all of the inflows of the vnode 120, collecting the boolean plan success for each inflow. If any of the inflows return success, then the union of the world sets 140 of failed inflows is where the vnode 120 is added as a stub 130, and the process returns success from such vnode 120. Otherwise, the process returns failure from such vnode 120. If adding plan 102 input 126 ("AddPlanInput" 208) is successful (i.e., does not return nil), then the process returns success from that independent inflow. If an inflow is split into pieces due to the presence of strong components 132, then the pieces are treated as though they are separate inflows.

Figure 14A:
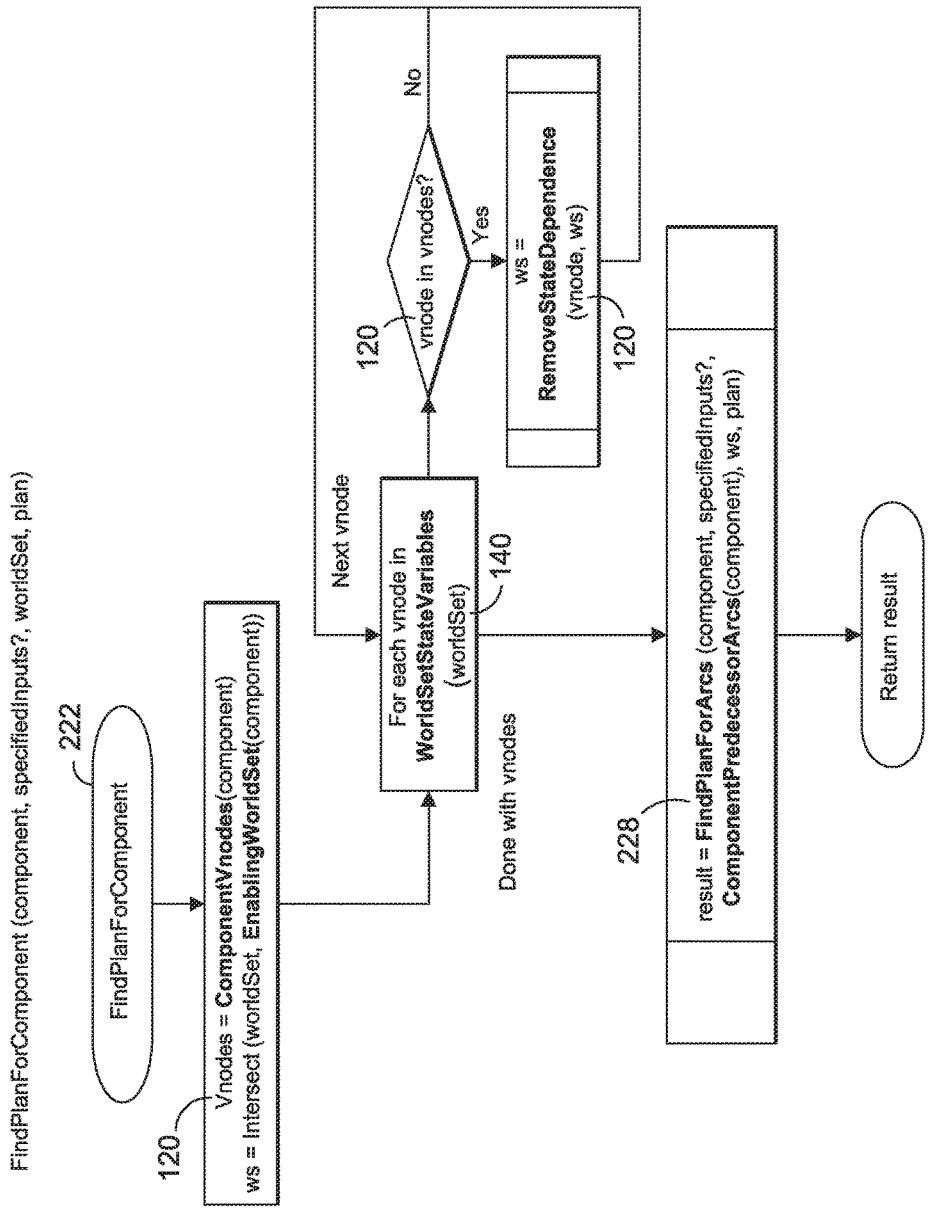
FIG. 14A is a flow diagram illustrating one or more operations that may be included in a method of determining a plan for a strong component in a world set.

Referring to FIGS. 14A-14B, shown in FIG. 14A is a flow diagram having one or more operations that may be included in the routine "FindPlanForComponent (component, specifiedInputs?, worldSet, plan)". The routine 222 is configured to return True or False, depending upon whether the routine succeeds in finding a plan 102 for a strong component. FIG. 14B is a pseudo-code listing of the routine "FindPlanForComponent" 222 illustrated in the flow diagram of FIG. 14A. The routine may incorporate the following arguments:

component: the strong component for which a plan is desired.

specifiedInputs?: If true, then the list of inputs is restricted to user-specified inputs. If false, then any independent variable may be an input to the plan if the variable is located upstream of an output variable.

worldSet: the world set for which the plan is sought.

plan: the plan structure that exists so far in the search.

Referring to FIGS. 15A-15B, shown in FIG. 15A is a flow diagram having one or more operations that may be included in the routine "FindPlanForRnode (mode, specifiedInputs?, worldSet, plan)". The routine 224 is configured to return True or False, depending upon whether one finds a plan for the rnode 114 in the specified world set 140 or not. FIG. 15B is a pseudo-code listing of the routine "FindPlanForRnode" 224 illustrated in the flow diagram of FIG. 15A. The routine 224 may incorporate the following arguments:

rnode: the equality constraint (i.e., the relation node) for which one is seeking a plan.

specifiedInputs?: If true, then the list of inputs is restricted to user-specified inputs. If false, then any independent variable may be an input to the plan if the variable is located upstream of an output variable.

worldSet: the world set for which one wants a plan for rnode.

plan: the plan structure being modified by the routine and which contains the results of the search so far conducted.

Figure 16A:
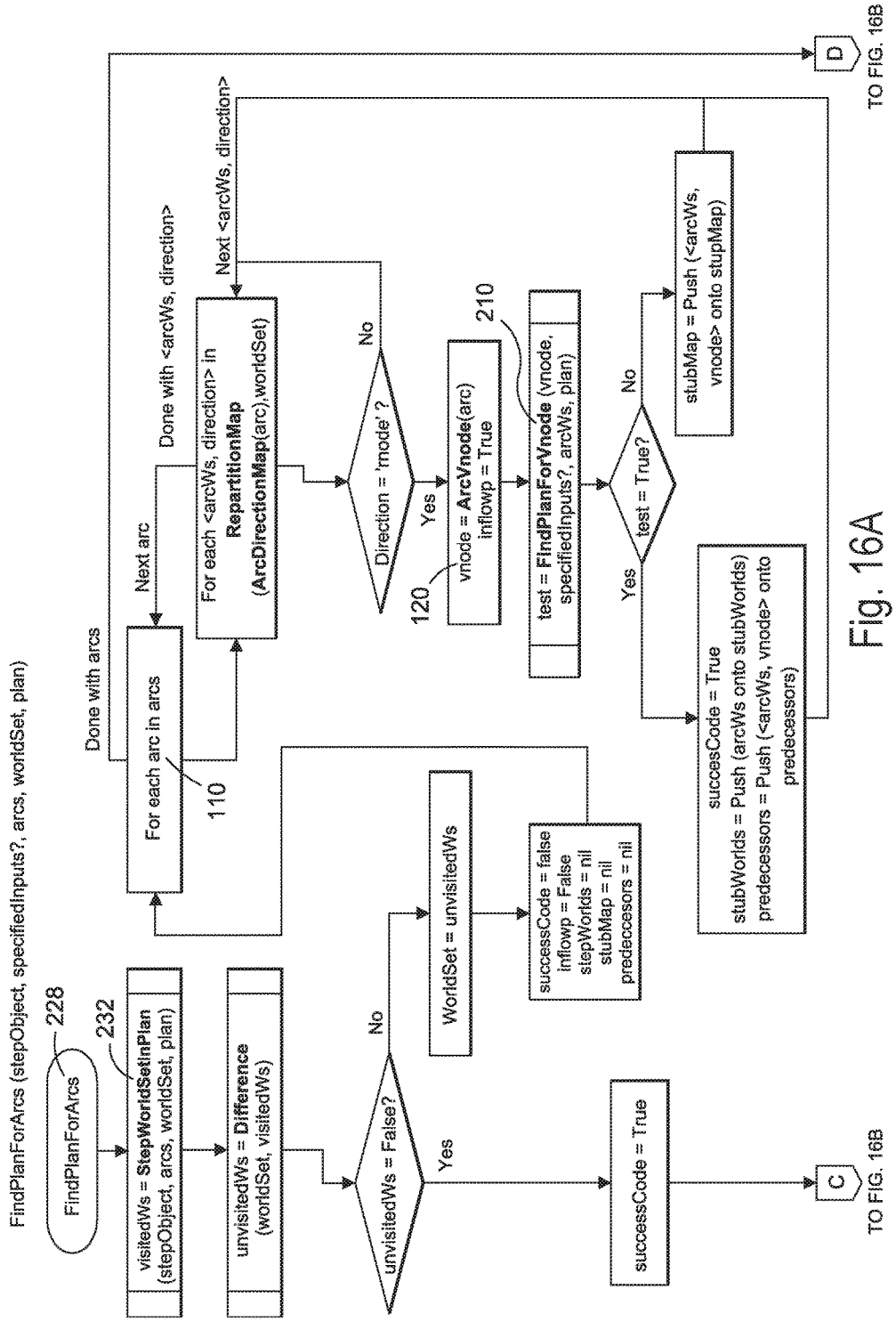

Referring to FIGS. 16A-16D, shown in FIGS. 16A-16B is a flow diagram having one or more operations that may be included in the routine "FindPlanForArcs 110 (stepObject, specifiedInputs?, arcs, worldSet, plan)". The routine 228 is configured to find a plan for the input argument, stepObject, where the step is either an arc 110 or a strong component 132. The routine 228 will return True or False depending upon whether the routine finds the plan. FIG. 16C-16D is a pseudo-code listing of the routine "FindPlanForArcs" 228 illustrated in the flow diagram of FIG. 16A-16B. The routine may incorporate the following arguments:

stepObject: the step for which one is seeking a plan and is either an arc or a strong component.

specifiedInputs?: If true, then the list of inputs is restricted to user-specified inputs. If false, then any independent variable may be an input to the plan 102 if the variable is located upstream of an output variable.

arcs: the set of arcs located upstream of the strong component or rnode connected to the stepObject.

worldSet: the world set in which the plan is desired.

plan: The plan structure being modified by the routine and which contains the results of the search so far.

Figure 17A:
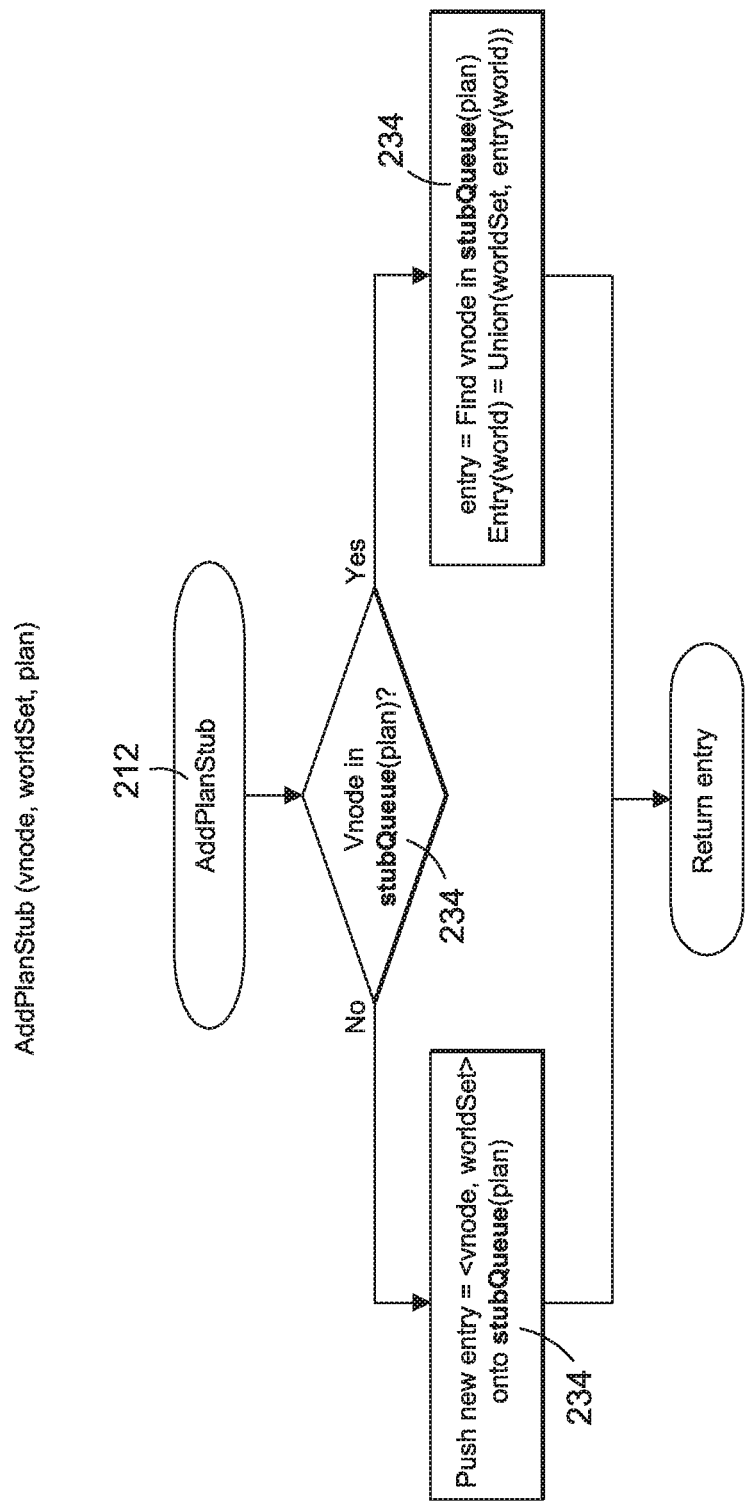
FIG. 17A is a flow diagram illustrating one or more operations that may be included in a method of modifying the plan structure by adding a variable and associated world set to the stub queue.

Referring to FIGS. 17A-17B, shown in FIG. 17A is a flow diagram having one or more operations that may be included in the routine "AddPlanStub (vnode, worldSet, plan)". The routine 212 is configured to return True or False, depending upon whether one finds a plan 102 for the rnode 114 in the specified world set 140 or not. FIG. 17B is a pseudo-code listing of the routine "AddPlanStub" 212 illustrated in the flow diagram of FIG. 17A. The routine 212 modifies the plan structure by adding the variable node 120 (i.e., vnode) to the set of stubbed variables 122 of the plan 102 in the world set 140 (i.e., worldSet). The "AddPlanStub" 212 plan 102 maintains a queue of stub 130 entries wherein each entry is an association of a variable node 120 and a world set 140 in the sense that the variable node 120 is a stub 130 of the plan 102 in the associated world set 140. The routine 212 either modifies a pre-existing entry of the vnode 120 in the stub queue 234 of the plan 102 by forming the union of the associated world set 140 with that entry with the input 126 world set 140, worldSet, or the routine 212 adds a new entry for the pair <vnode, worldSet>.

Figure 18A:
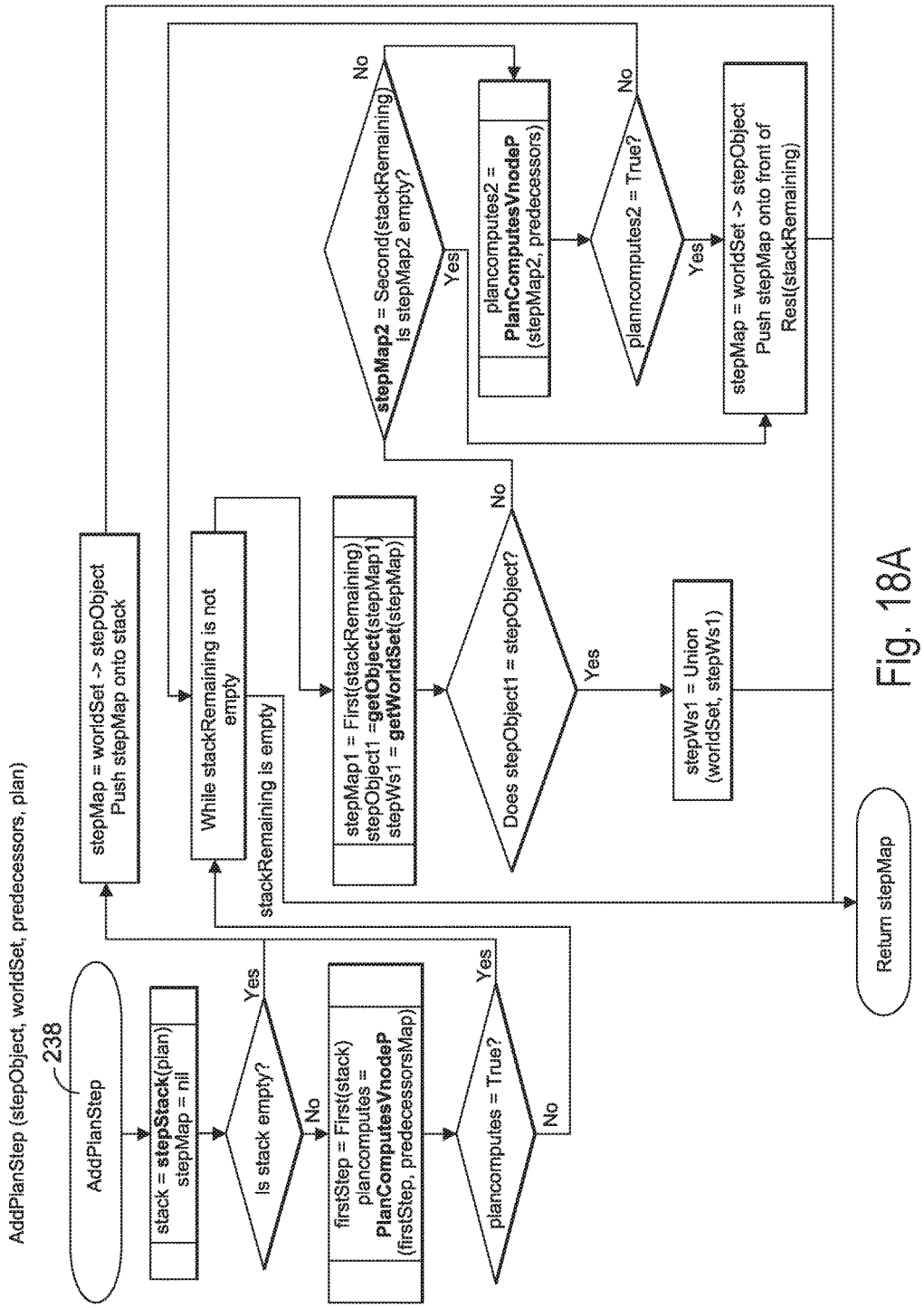
FIG. 18A is a flow diagram illustrating one or more operations that may be included in a method of modifying the plan structure by adding a computational step and associated world set to the plan queue.

Referring to FIGS. 18A-18B, shown in FIG. 18A is a flow diagram having one or more operations that may be included in the routine "AddPlanStep (stepObject, worldSet, predecessors, plan)". The routine 238 is configured to return True or False, depending upon whether one finds a plan for the rnode 114 in the specified world set 140 or not. FIG. 18B is a pseudo-code listing of the routine "AddPlanStep" 238 illustrated in the flow diagram of FIG. 18A. The routine 238 maintains a stack, "stepStack(plan)" of maps, "world-set→step", where each step (i.e., an arc or a strong component) is to be executed when the plan is invoked if the associated world set 140 is true in the current data environment. During the backward chaining search of the constraint network, the stack is maintained in reverse order and is re-ordered at the end of the search process using the routine Finalize(plan) 214 as described below. The routine "AddPlanStep" 238 places the step object as early as possible in the stack but after all its predecessors 240. The routine 238 destructively modifies the plan step stack so that the step object is applicable in the given world set 140 and returns the new or modified entry. The routine 238 may incorporate the following arguments:

stepObject: either an arc or a strong component representing a step in the plan that potentially will be executed when the plan is invoked.

worldSet: the world set that must be true in the invoked plan's data environment for the associated step to be executed.

predecessors: the variable nodes that are located immediately upstream of the relation node and wherein each variable node is conditioned by a world set upon which the value of the object depends in that world set.

In the pseudo code of FIG. 18B, the function Rest(list) returns the same list structure, but starts at the second element in the list. The function First(list) returns the first element in the list. The function getObject(ws→object) returns the object in the map element ws→object. The function getWorldSet(ws→object) returns the world set in the map element.

Figure 19A:
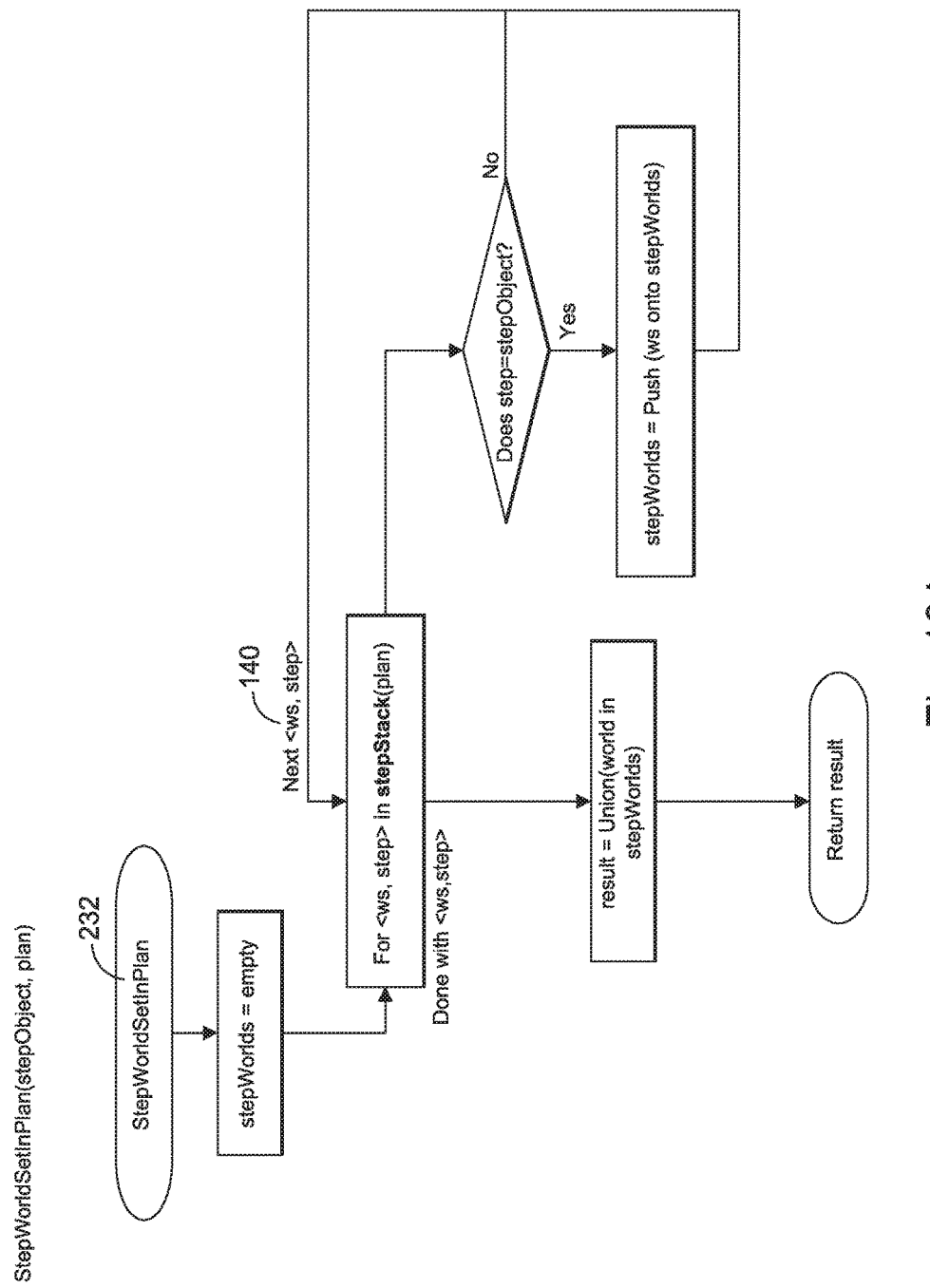
FIG. 19A is a flow diagram illustrating one or more operations that may be included in a method of determining a union of all of the world sets that are associated with an input step object of the plan.

Referring to FIGS. 19A-19B, shown in FIG. 19B is a flow diagram having one or more operations that may be included in the routine "StepWorldSetInPlan (stepObject, plan)". The "StepWorldSetInPlan" 232 routine is configured to return the union of all world sets 140 that are associated with the input 126 step object in the plan. FIG. 19B is a pseudo-code listing of the routine "StepWorldSetInPlan" 232 illustrated in the flow diagram of FIG. 19A. The routine 232 may incorporate the following arguments:

stepObject: the given object for which an associated world set is being requested.

plan: the plan having plan steps that are being investigated for a match to the given step object.

The system and method of determining a plan 102 for a constraint network 100 may also include a function "RemoveStateDependence(vnode, worldSet)" (not shown) for removing the dependence of worldSet on the state variable 124 vnode 120 as described above with regard to FIG. 8. Advantageously, the function "RemoveStateDependence" avoids infinite looping while also ensuring that the plan 102 includes steps to compute the values of state variables 124 when such state variables 124 are needed in the computational path. The function "RemoveStateDependence" may incorporate the following arguments:

vnode: the state variable for which one needs to remove dependence.

worldSet: the world set for which one need to remove possible dependence on the values of the state variable, vnode.

The "RemoveStateDependence" 226 function replaces literals and negations of literals involving the specified state variable in the well-formed-formula (WFF) representation of the world set with True, and then simplifies the result. For example, removing dependence on S in the WFF, "S=s1 And Q=q2" yields "True And Q=q2", which simplifies to "Q=q2". Removing dependence on S in the WFF, "S=s1 Or Q=q2", yields "True Or Q=q2", which simplifies to "True".

Implementation of the "RemoveStateDependence" 226 function is dependent on the data structure that is used to represent the world set 140. In one example, Lisp list structures (i.e., Allegro Common Lisp, commercially available from Franz, Inc., of Oakland, Calif.) may be used to represent the well formed formula that specifies the world set 140. In another example, multi-dimensional bit arrays (not shown) may be used to represent a world set wherein each dimension of the bit array may be associated with a given state variable and wherein the size of that dimension equals the number of specific values that the state variable could take.

In this regard, the WFFs associated with each computational step may be obtained by combinations of union, intersection, and/or difference operators to the WFFs associated with the equations that need to be solved. Such WFFs can become highly complex, depending upon which variables in the constraint network 100 are independent, and require rapid manipulation and combination of such propositional WFFs. The WFFs obtained through combinations of other WFFs require simplification for efficient computation during trade studies. In this regard, leaving combinations of WFFs in an un-simplified state may result in exploding memory size as the WFFs are further combined in relatively large networks involving thousands of equations. Furthermore, when a WFF simplifies to a universally false WFF, the computational plan generation procedure can prune unneeded branches of a constraint network 100 and thereby produce compact and efficient computational plans 102.

Such WFF simplification process may be extremely computationally intensive when applied to logic formulas having a large quantity of predicates over finite but large domains. Classical algorithms for determining the conjunctive normal forms of a WFF or the disjunctive normal forms of a WFF are inadequate to provide the system designer with computational results in a relatively short period of time (e.g., several minutes). The simplification of WFFs is preferably performed as rapidly as possible in order to reduce computational time and increase the amount of time available to a system designer to consider and investigate different design trades. A reduction in the amount of time for simplifying well-formed formulas may additionally provide a system designer with the capability to investigate larger and more complex design spaces.

For example, in the conceptual design of a hypersonic vehicle, a constraint management planning algorithm is required to simplify many WFFs containing numerous references to a large quantity of predicates during the planning of one of many desired trade studies. An example WFF may have only 10 to 15 predicates with each predicate having two to 20 possible values. Such WFFs may syntactically refer to the same predicates 5 to 10 times with a depth on a similar scale (e.g., And(Or(And Or(P1=–p11, P2=p21 . . . ) . . . Or(And(P1=p13, Or(Not(P1=p13) . . . )))) etc. Unfortunately, the simplification of such WFFs to a conjunctive normal form or a disjunctive normal form using classical algorithms requires 10 to 30 minutes of computer time in one implementation. The relatively long period of computer time for simplifying WFFs using classical algorithms directly detracts from the time available to a designer for considering and investigating larger and more complex design trades.

Advantageously, the simplification of well-formed formulas (WFFs) may support computational planning in a data-dependent constraint network as disclosed herein and illustrated in FIGS. 9A-20B. The process of simplifying WFFs may include converting an input WFF (not shown) into an initial bit array (not shown), simplifying the initial bit array into a simplified bit array (not shown) by removing predicates that are not necessary to represent the input WFF, and then converting the simplified bit array into a return WFF (not shown).

A bit array may be defined as an array having bit elements (not shown) that have a value of either "1" or "0". In addition, a bit array may include any number of dimensions. Each dimension can have a different size. For boolean predicates (not shown), the size of the corresponding bit array dimension is 2. For equality predicates (not shown), the size of the bit array dimension equals the length of the domain. A logic bit array may be defined as a bit array including a mapping of each dimension of the bit array to a list of the predicates (e.g., boolean and/or equality) included in the bit array.

An input WFF (not shown) may include atomic true or atomic false WFFs, atomic boolean predicate WFFs, atomic equality predicate WFFs, negation WFFs involving the negation operator (NOT), and compound WFFs involving the conjunction and disjunction operators AND or OR. The simplification of an input WFF may include determining the predicates in the input WFF, determining the domain elements associated with each one of the predicates, determining the bit array dimensions of the initial bit array, and recursively processing the input WFF by calling an internal program (not shown) and returning an initial bit array having the bit array dimensions, the predicates, and the domain elements associated with the input WFF.

For cases where the input WFF is an atomic WFF comprising a single boolean predicate, the single boolean predicate may be converted to an equality predicate. For cases where the input WFF is a compound WFF comprising zero or more of the atomic WFFs or a plurality of compound WFFs associated with either a disjunction operator (OR) or a conjunction operator (AND), or, exactly one atomic WFF or a compound WFF associated with a negation operator, each operand of the compound WFF may be recursively processed until atomic WFFs are encountered. The recursively processed WFFs may be combined according to whether the operator of the compound WFF is a negation operator (NOT), a conjunction operator (AND), or a disjunction operator (OR). An initial bit array is then returned for each one of the atomic WFFs.

For non-negated compound WFF cases where the operator is a conjunction operator (e.g., AND) or a disjunction operator (e.g., OR), the quantity of operands in the combined initial bit arrays may be determined. For a conjunction operator, the bit elements of the individual initial bit arrays may be combined in a manner such that the bit elements are equal to the conjunction (the "AND") of the individual initial bit arrays. For a disjunction operator, the bit elements of the individual initial bit arrays may be combined in a manner such that the bit elements are equal to the disjunction (the "OR") of the individual initial bit arrays. An initial bit array may include a plurality of bit array dimensions associated with the predicates.

An initial bit array may be simplified by removing predicates that are not necessary to represent the input WFF. In this regarding, the simplification of an initial bit array may generally comprise collapsing the initial bit array by removing semantically redundant bit array dimensions such as by comparing the bit elements of the sub-arrays for each one of the bit array dimensions to determine if a bit array dimension is collapsible. If the bit elements of the sub-arrays are equal, then the dimension associated with the sub-array can be removed.

A simplified bit array may be converted into a return WFF in disjunctive normal form (DNF) or in conjunctive normal form (CNF) by systematically processing the simplified bit array given a set of predicates and their respective domain elements, and constructing a return WFF. The conversion of a simplified bit array may comprise determining a total quantity of the bit elements in the simplified bit array having a value of 1, and converting the simplified bit array to a return WFF in disjunctive normal form (DNF) if less than one-half of the total quantity of the bit elements has a value of 1. The simplified bit array may be converted to a return WFF in conjunctive normal form (CNF) 142 if at least one-half of the total quantity of the bit elements has a value of 1.

Advantageously, the simplification of well-formed formulas in a data-dependent constraint management system or constraint network may result in a significant reduction in the amount of time required to simplify the results of the union, intersection, and difference operations of well-formed formulas which may significantly reduce the amount of time required for processing specific trade studies. The reduction in processing time provides the technical effect of allowing a designer to explore larger and more complex design spaces in an integrated manner using the computational planning method disclosed herein for data-dependent constraint networks 100.

Figure 20A:
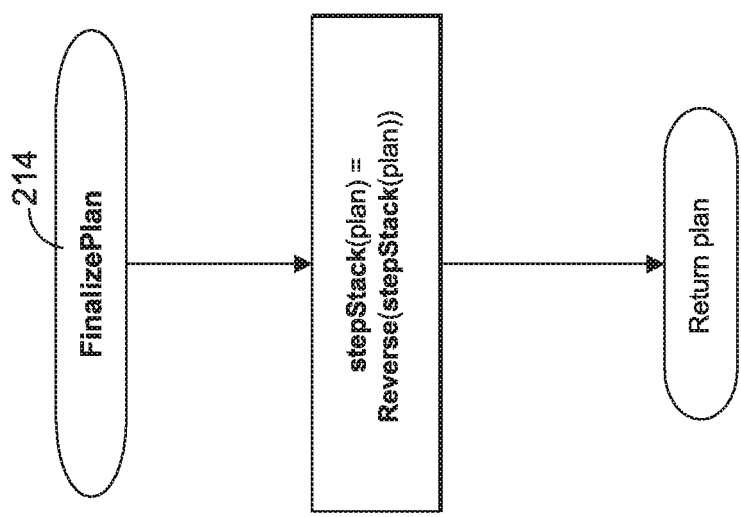
FIG. 20A is a flow diagram illustrating one or more operations that may be included in a method of finalizing the plan by reversing an order of plan steps of the plan.
Figure 20B:
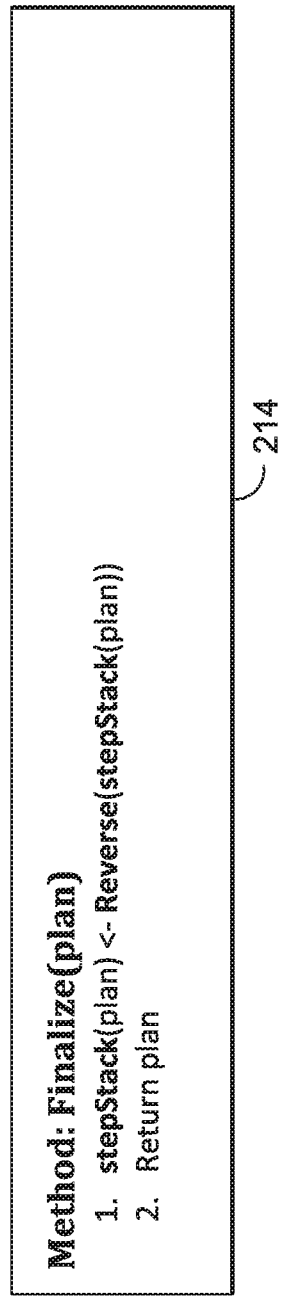
FIG. 20B is a pseudo code listing of a routine for implementing the method of finalizing the plan by reversing an order of plan steps of the plan as illustrated in the flow diagram of FIG. 20A.

Referring to FIGS. 20A-20B, shown in FIG. 20B is a flow diagram having one or more operations that may be included in the routine "Finalize(plan)". The routine 214 is configured to reverse the order for the plan steps that were pushed onto the plan step stack as described above. FIG. 20B illustrates a pseudo-code listing of the routine "Finalize" 204 illustrated in the flow diagram of FIG. 20A.

Figure 21:
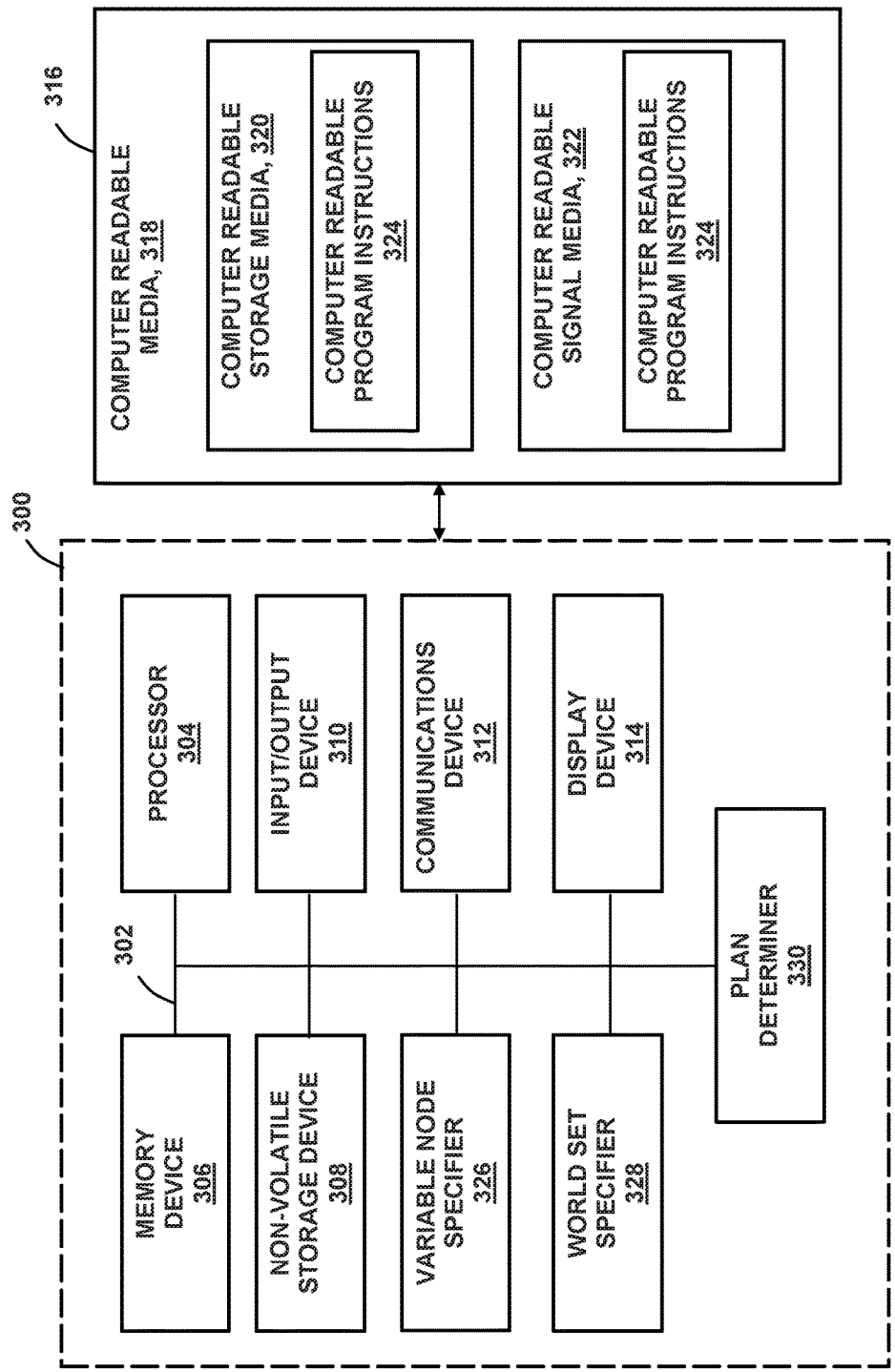
FIG. 21 is a block diagram of an embodiment of a processor-based system for implementing one or more operations of a method for determining a computational plan for a data-dependent constraint network.

Referring to FIG. 21, shown is a block diagram of a system for implementing the above-described computational planning method, in whole or in part, in a computer-implemented process such as on a processor-based system 300 or other suitable computer system. The processor-based system 300 may implement one or more of the above-described computational planning steps for a data-dependent constraint network 100 (FIG. 8). The processor-based system 300 may perform computer readable program instructions 324 which may be provided to or loaded onto the processor-based system 300 in order to implement one or more of the above-described operations or steps. In a non-limiting example, the processor-based system 300 and/or the computer readable program instructions 324 may facilitate the definition of the computational plan 102 for a data-dependent constraint network 100.

The block diagram of FIG. 21 illustrates the processor-based system 300 in an advantageous embodiment that may facilitate the determining of a computational plan 102 (FIG. 8) in a bipartite graph 106 (FIG. 8) representing the constraint network 100. The processor-based system 300 may determine a world set 140 (FIG. 7) in which a status of the variable nodes 120 (FIG. 8) is determined, and determine the computational plan 102 from one or more input 126 variable nodes 120 (FIG. 8) to one or more output 128 variable nodes 120 (FIG. 8) during a backward chaining search of the bipartite graph 106. In the embodiment illustrated in FIG. 21, the processor-based system 300 may include a data communication path 302 (e.g., data link) communicatively coupled to one or more component blocks to facilitate transfer of data between such component blocks. The communication path 302 may comprise one or more data buses or any other suitable communication path 302 that facilitates the transfer of data between the component blocks and devices of the processor-based system 300.

Referring to FIG. 21, in a non-limiting embodiment, the component blocks may include one or more of a processor 304, a memory device 306, a non-volatile storage device 308, a communications device 312, an input/output device 310, and a display device 314. The system may further include a variable node specifier 326, a world set specifier 328, and a plan determiner 330. As indicated above, the variable node specifier 326 may be configured to facilitate the specifying of one or more variable nodes 120 as inputs 126 representing a starting point for the plan 102, and one or more variable nodes 120 as outputs 128 to be computed by the plan 102. The world set specifier 328 may be configured to facilitate the specifying of a world set 140 in which the computational plan 102 is desired. If inputs 126 (e.g., input variable nodes 120) are not specified, the plan determiner 330 may be configured to determine the plan 102 from all of the inputs 126 in the constraint network 100 influencing a value of the outputs 128. If a world set 140 is not specified, the plan determiner 330 may be configured to determine a world set 140 in which a status of the variable nodes 120 is in a determined state.

The plan determiner 330 may be configured to determine the plan 102 from the input(s) 126 to the output(s) 128 during a search of the bipartite graph 106. Upon determining the plan 102, the plan determiner 330 may be configured to provide the plan as an input list 220 or queue, an output list 218 or queue, a stub queue 234, and a plan queue 236 as described above. If the input variables 126 are specified as arguments, the plan determiner 330 may be configured to update the world set 140 associated with a specified input variable 126 by unioning the evolving world set derived on a search path with the world set 140 associated with that input variable. During the backward chaining search of the bipartite graph, the plan determiner 330 may be configured to start with an output 128 variable node 120 and update the output list 218 by adding the output 128 variable node 120 and a specified world set 140 to the output list 218 if the output 128 variable node 120 is in a determined state for the entirety of the specified world set 140.

During the backward chaining search, the plan determiner 330 may additionally be configured to update the plan 102 while following each one of the incoming arcs 110 backwards along a search path by recursively performing the following operations for a given world set: finding the plan for a variable node 120, finding the plan for a component 132, finding the plan for a relation node, and finding the plan for an arc, the world sets 140 that enable the incoming arcs 110 associated with a given variable node 120 being disjoint. In addition, the plan determiner 330 may be configured to maintain, while updating the plan 102, an appropriate world set 140 along the search path as an intersection of an evolving world set 140 with enabling world sets 140 of additional elements in the search path, wherein the additional elements comprise variable nodes 120, components 132, relation nodes 114, and arcs 110. Furthermore, the plan determiner 330 may be configured to find, for each incoming arc 110, a plan for a component 132 if the incoming arc 110 is part of a component 132 or, a plan for a relation node 114 if the incoming arc 110 is not part of a component 132.

In FIG. 21, the plan determiner 330 may additionally be configured to find a plan for all arcs 110 of component 132 predecessors, find a plan for all incoming arcs 110 of the relation nodes 114, and remove a dependence of the world set 140 on a state variable 124, wherein the state variable 124 may comprise a boolean variable or, a categorical variable having discrete values over a finite domain. During the backward chaining search, the plan determiner 330 may be configured to update the plan queue 236 by adding the arcs 110 or components 132 and associated world sets 140 in a reverse order of the search path upon reaching a specified input variable node 120, or upon reaching an independent input variable node 120 if a specified input variable node 120 is not provided. Furthermore, the plan determiner 330 may be configured to initially note or determine whether any search path starting with a predecessor arc 110 of a plan step ends at a specified input 126 variable node 120 and, if so, update the stub queue 234 with a stub variable and an associated stub world set 140. The stub variable comprises the variable associated with any other predecessor arc 110 whose search paths do not terminate at any of the specified input 126 variables. The stub world set comprises the union of the world sets 140 of those search paths. Upon determining the plan 102, the plan determiner 330 may be configured to finalize the plan 102 by reversing an order of plan steps.

Referring still to FIG. 21, the results of any one of the above-described steps of specifying inputs 126 and outputs 128 for the computational plan 102, specifying a world set 140 in which a status of the variable nodes 120 is determined, and performing the backward chaining search of the bipartite graph 106, may be transmitted to the input/output device 310. The input/output device 310 may be communicatively coupled to the display device 314 which may be configured to display the results of the computational planning. The display device 314 may be configured to display the progress and/or results of an implementation of the computational planning. In addition, the display device 314 may be configured to display the results of a trade study implemented in a data-dependent constraint management system (FIG. 8) using the computational planning process.

In an embodiment, the processor-based system 300 may include one or more of the processors 304 for executing instructions of computer readable program instructions 324 that may be installed into the memory device 306. Alternatively, the processor 304 may comprise a multi-processor core having two or more integrated processors cores. Even further, the processor 304 may comprise a main processor and one or more secondary processors integrated on a chip. The processor 304 may also comprise a many-processor system having a plurality of similarly configured processors.

Referring still to FIG. 21, the processor-based system 300 may further include one or more memory devices 306 which may comprise one or more of volatile or non-volatile storage devices 308. However, the memory device 306 may comprise any hardware device, without limitation. For example, the memory device 306 may comprise a random access memory or a cache of an interface and/or integrated memory controller hub which may be included in the communication path. The memory device 306 may be configured to permanently and/or temporarily store any one of a variety of different types of data, computer readable code or program instructions, or any other type of information. The non-volatile storage device 308 may be provided in a variety of configurations including, but not limited to, a flash memory device, a hard drive, an optical disk, a hard disk, a magnetic tape or any other suitable embodiment for long-term storage. In addition, the non-volatile storage device 308 may comprise a removable device such as a removable hard drive.

The processor-based system 300 may additionally include one or more of the input/output devices 310 to facilitate the transfer of data between components 132 that may be connected to the processor-based system 300. The input/output device 310 may be directly and/or indirectly coupled to the processor-based system 300. The input/output device 310 may facilitate user-input by means of a peripheral device such as a keyboard, a mouse, a joystick, a touch screen and any other suitable device for inputting data to the processor-based system 300. The input/output device 310 may further include an output device for transferring data representative of the output of the processor-based system 300. For example the input/output device 310 may comprise a display device 314 such as a computer monitor or computer screen for displaying results of data processed by the processor-based system 300. The input/output device 310 may optionally include a printer or fax machine for printing a hardcopy of information processed by the processor-based system 300.

Referring still to FIG. 21, the processor-based system 300 may include one or more communications devices 312 to facilitate communication of the processor-based system 300 within a computer network and/or with other processor-based systems. Communication of the processor-based system 300 with a computer network or with other processor-based systems may be by wireless means and/or by hardwire connection. For example, the communications device 312 may comprise a network interface controller to enable wireless or cable communication between the processor-based system 300 and a computer network. The communications device 312 may also comprise a modem and/or a network adapter or any one of a variety of alternative device for transmitting and receiving data.

One or more of the operations of the methodology described above for computational planning in a data-dependent constraint network 100 may be performed by the processor 304 and/or by one or more of the variable node specifier 326, the world set specifier 328, and the plan determiner 330 using the computer readable program instructions 324. The computer readable program instructions 324 may comprise program code which may include computer usable program code and computer readable program code. The computer readable program instructions 324 may be read and executed by the processor 304. The computer readable program instructions 324 may enable the processor 304 to perform one or more operations of the above-described embodiments associated with computational planning in a constraint network 100.

Referring still to FIG. 21, the computer readable program instructions 324 may include operating instructions for the processor-based system 300 and may further include applications and programs. The computer readable program instructions 324 may be contained and/or loaded onto one or more of memory devices 306 and/or non-volatile storage devices 308 for execution by the formula processor 304, the formula converter, the bit array simplifier, the bit array converter, and/or the bit array constructor. As indicated above, one or more of the memory devices 306 and/or non-volatile storage devices 308 may be communicatively coupled to one or more of the remaining component blocks illustrated in FIG. 21 through the communication path.

The computer readable program instructions 324 may be contained on tangible or non-tangible, transitory or non-transitory computer readable media 318 and which may be loaded onto or transferred to the processor-based system 300 for execution by the processor. The computer readable program instructions 324 and the computer readable media 318 comprise a computer program product 316. In an embodiment, the computer readable media 318 may comprise computer readable storage media 320 and/or computer readable signal media 322.

The computer readable storage media 320 may comprise a variety of different embodiments including, but not limited to, optical disks and magnetic disks that may be loaded into a drive, a flash memory device or other storage device or hardware for transfer of data onto a storage device such as a hard drive. The computer readable storage media 320 may be non-removably installed on the processor-based system 300. The computer readable storage media 320 may comprise any suitable storage media and may include, without limitation, a semiconductor system or a propagation medium. In this regard, the computer readable storage media 320 may comprise electronic media, magnetic media, optical media, electromagnetic media, and infrared media. For example, the computer readable storage media 320 may comprise magnetic tape, a computer diskette, random access memory and read-only memory. Non-limiting examples of embodiments of optical disks may include compact disks-read only memory, compact disks-read/write, and digital video disks.

The computer readable signal media 322 may contain the computer readable program instructions 324 and may be embodied in a variety of data signal configurations including, but not limited to, an electromagnetic signal and an optical signal. Such data signals may be transmitted by any suitable communications link including by wireless or hardwire means. For example, the hardwire means may comprise an optical fiber cable, a coaxial cable, a signal wire and any other suitable means for transmitting the data by wireless or by physical means.

Referring still to FIG. 21, the computer readable signal media 322 may facilitate the downloading of the computer readable program instructions 324 to the non-volatile storage or other suitable storage or memory device 306 for use within processor-based system 300. For example, the computer readable program instructions 324 contained within the computer readable storage media 320 may be downloaded to the processor-based system 300 over a computer network from a server or client computer of another system.

Any one of a variety of different embodiments of the processor-based system 300 may be implemented using any hardware device or system capable of executing the computer readable program instructions 324. For example, the processor 304 may comprise a hardware unit configured for performing one or more particular functions wherein the computer readable program instructions 324 for performing the functions may be pre-loaded into the memory device 306.

In an embodiment, the processor 304 may comprise an application specific integrated circuit (ASIC), a programmable logic device, or any other hardware device configured to perform one or more specific functions or operations. For example, a programmable logic device may be temporarily or permanently programmed to perform one or more of the operations related to the computational planning in a constraint network 100. The programmable logic device may comprise a programmable logic array, programmable array logic, a field programmable logic array, and a field programmable gate array and any other suitable logic device, without limitation. In an embodiment, the computer readable program instructions 324 may be operated by the one or more processors and/or by other devices including one or more hardware units in communication with the processor 304. Certain portions of the computer readable program instructions 324 may be run by the processor 304 and other portions of the computer readable program instructions 324 may be run by the hardware units.

Advantageously, the system and method disclosed herein for creating a conditional computational plan 102 for a data-dependent constraint network 100 avoids the intermixing of planning and computation as is required by traditional conditional planning algorithms. In this regard, the computational planning system and method disclosed herein provide the technical effect of facilitating the performance of trade studies over a significantly broader range of trade spaces during front-end trade studies or during conceptual design of complex engineering systems relative to a limited range of trade spaces provided by traditional conditional planning methods. A further technical effect provided by the computational planning method disclosed herein is a significant increase in the efficiency with which trade studies may be conducted across a heterogeneous trade space wherein a system configuration or vehicle configuration (e.g., a configuration of an air vehicle or a launch vehicle) may change significantly across the trade space and, therefore, the equations describing vehicle cost, vehicle performance, and other parameters, may have significantly different parametric forms. In addition to significantly increasing the rapidity with which a designer may explore a broad range of trade spaces, the computational planning system and method disclosed herein provides the technical effect of facilitating a significant increase in the completeness with which a given trade space may be explored within a given time period.

III. Detailed Description: Rapid and Robust Uncertainty Management During Multidisciplinary Analysis This section presents an uncertainty estimation approach that exploits a data-dependent constraint management system (CMS), and is particularly effective when the CMS is used to automate the "reverse computation" used when an analyst specifies cost, schedule, or performance targets using approaches such as cost as independent variable. This section describes the use of local linearization, gradient-based techniques in order to rapidly assess the consequence of user-specified input uncertainties on output uncertainties. The disclosed techniques exploit the relation-by-relation propagation of gradients in a CMS, using the chain rule, to limit the computational overhead for uncertainty propagation to a few percent. Perhaps more significantly, the analyst need only specify input standard deviations to utilize the disclosed techniques.

When the analyst specifies values for what would normally be output variables, the constraint engine efficiently propagates these values to user selected "upstream" variables using symbolic algebra and automatically derived numerical methods. Current CMS based uncertainty propagation methods, however, are not appropriate, as output variables made independent will have correlated errors. This section describes a set of techniques to efficiently manage uncertainty propagation, when the analyst is able to specify a set of variables, S, that have uncorrelated errors, along with potentially different sets of variables, I and V, for which (s)he wishes to specify values (of value-independent variables) and standard deviations (of standard-deviation-settable variables), respectively. The first set of techniques solves the gradient propagation problem by determining which variables need gradient updating when either values of variables in I or standard deviations of variables in V are changed. The second set of techniques determines the variables that need uncertainty updating, while making sure correlations are preserved. The final set of techniques automatically calculates the upper and lower bounds for user-specifiable standard deviations of the variables in V. These bounds result from the correlations between those dependent variables that are currently independent, and are automatically updated as the values and gradients of the variables in the model change. Other techniques and variations are described.

Note that data-dependent constraint management systems for early design space exploration are appropriate for several reasons. For example, they support rapid, flexible exploration of large regions of the trade space. Together with multidisciplinary analysis, CMS allow for focusing on interesting parts of trade space. Coupled with symbolic algebraic and robust numerical solvers, CMS removes the coding burden typically required to solve large system of nonlinear equations. Moreover, coupled with such solvers, CMS allows for "reverse" computation.

Figure 22:
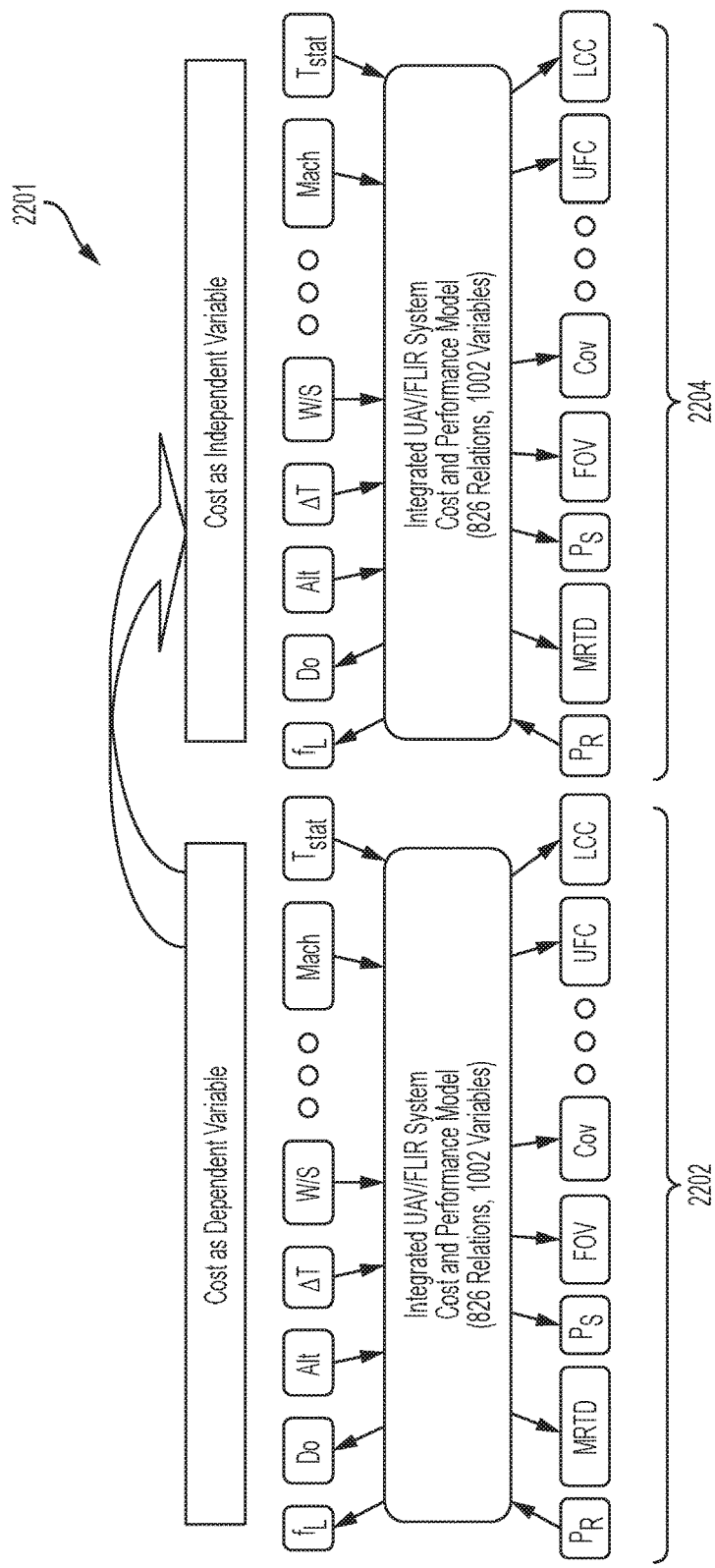
FIG. 22 depicts a schematic diagram illustrating reverse computation according to some embodiments.

FIG. 22 depicts a schematic diagram 2201 illustrating reverse computation according to some embodiments. Left hand side 2202 schematically depicts an integrated CMS-based model for the design of an UAV (and its infrared sensors to be for surveillance missions) in which cost is a dependent variable. Right hand side 2204 schematically depicts the same CMS modified such that unit-fly-away cost (UFC) is an independent variable, that is, making a dependent variable "independent," e.g., cost as an independent variable (CAIV) trades. In order for UFC to be independent, the CMS gives the user a choice of which currently independent upstream variables may need to be "relaxed" in order not to have an over-constrained system. In this case, the user chose the wing-loading parameter, W/S.

A review and elaboration of constraint networks as they relate to managing uncertainty is presented immediately below.

Figure 23:
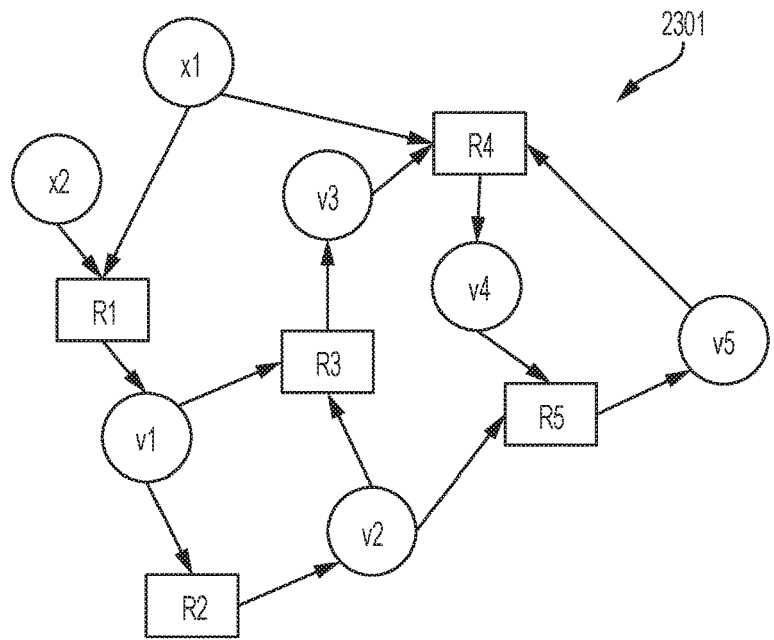
FIG. 23 depicts a constraint network according to various embodiments.

FIG. 23 depicts a constraint network according to various embodiments. In general, a constraint network is composed of equality constraints among the various design variables. Such a network may be represented as a bipartite graph, that is, a graph that includes nodes and arcs. The nodes may be of two types: relation nodes (i.e., the equality constraints) and variable nodes. An arc may exist between a variable node and a relation node if, and only if, the variable is in the constraint. For a consistent CMS, a relation node has exactly one outgoing arc, pointing to the variable it is being used to define. Also for a consistent CMS, each variable is either "independent," with value specified by the user, and hence has only outgoing arcs, or "dependent," with value defined by a constraint, and hence has exactly one incoming arc. A dependent variable node has exactly one incoming arc, emanating from the constraint being used to specify its value. Additionally, each variable has an "environmentally dependent" (e.g., in trade studies) value and standard deviation (square root of variance.) An internal computational cycle in such a bipartite graph is referred to as a "strong component".

In particular, the constraint network of FIG. 23 includes five constraints, R1-R5, which define variables v1-v5, respectively. The user specifies that x1 and x2 are independent. The relations depicted in graph 2301 are as follows.

$v1\hat{\ }x1=\exp(x2)$ R1:

$v2+v1=20$ R2:

$v1*v2=\ln(v3)$ R3:

$v4+v5=x1*v3$ R4:

$v5=v2*v4\hat{\ }2$ R5:

In computer implementations, a constraint network may be stored as a directed graph, for example. Each outgoing relation arc may cache its computational method for its output variable. This may be symbolically derived from the algebraic equation, or numerically computed if the symbolic algebra engine fails to solve the relation for the given variable. Further, each arc may cache the derivative of the constraint with respect to the variable on the arc. For example, for a generically-represented constraint of $R:L_{HS}(x_1, \ldots, x_n)=R_{HS}(x_1, \ldots, x_n)$, the cached derivative, $$\frac{\partial R}{\partial x_j},$$

for $\text{Arc}_{x_j\text{-}R}$, where $R:L_{HS}(x_1, \ldots, x_n)-R_{HS}(x_1, \ldots, x_n)=0$, may be represented as, by way of non-limiting example, $$\frac{\partial R}{\partial x_j} = \frac{\partial L_{HS}(x_1, \ldots, x_n)}{\partial x_j} - \frac{\partial R_{HS}(x_1, \ldots, x_n)}{\partial x_j}.$$

Figure 24:
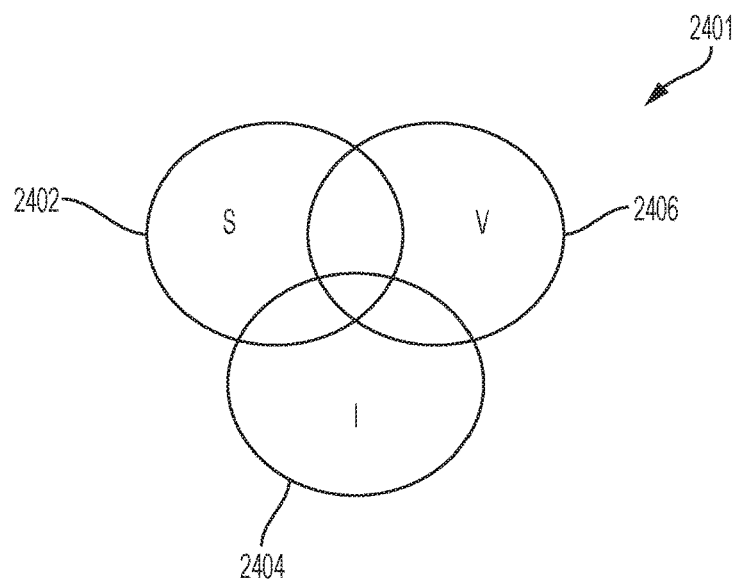
FIG. 24 depicts Euler circles representing variable types that may be present in a constraint network according to various embodiments.

FIG. 24 depicts Euler circles 2401 representing variable types that may be present in a constraint network according to various embodiments. In particular, circle 2402 represents the stochastically uncorrelated variables S. Circle 2404 represents the variables I with user-specifiable values. Circle 2406 represents the variables V with user-specifiable standard deviations. Note that some variables may be included in all three circles, some may be included in only two circles, and some may be included in exactly one circle. The depiction of FIG. 24 is used presently in reference to FIG. 25 to define various "flow states" that may be implemented on a constraint network according to various embodiments.

Figure 25:
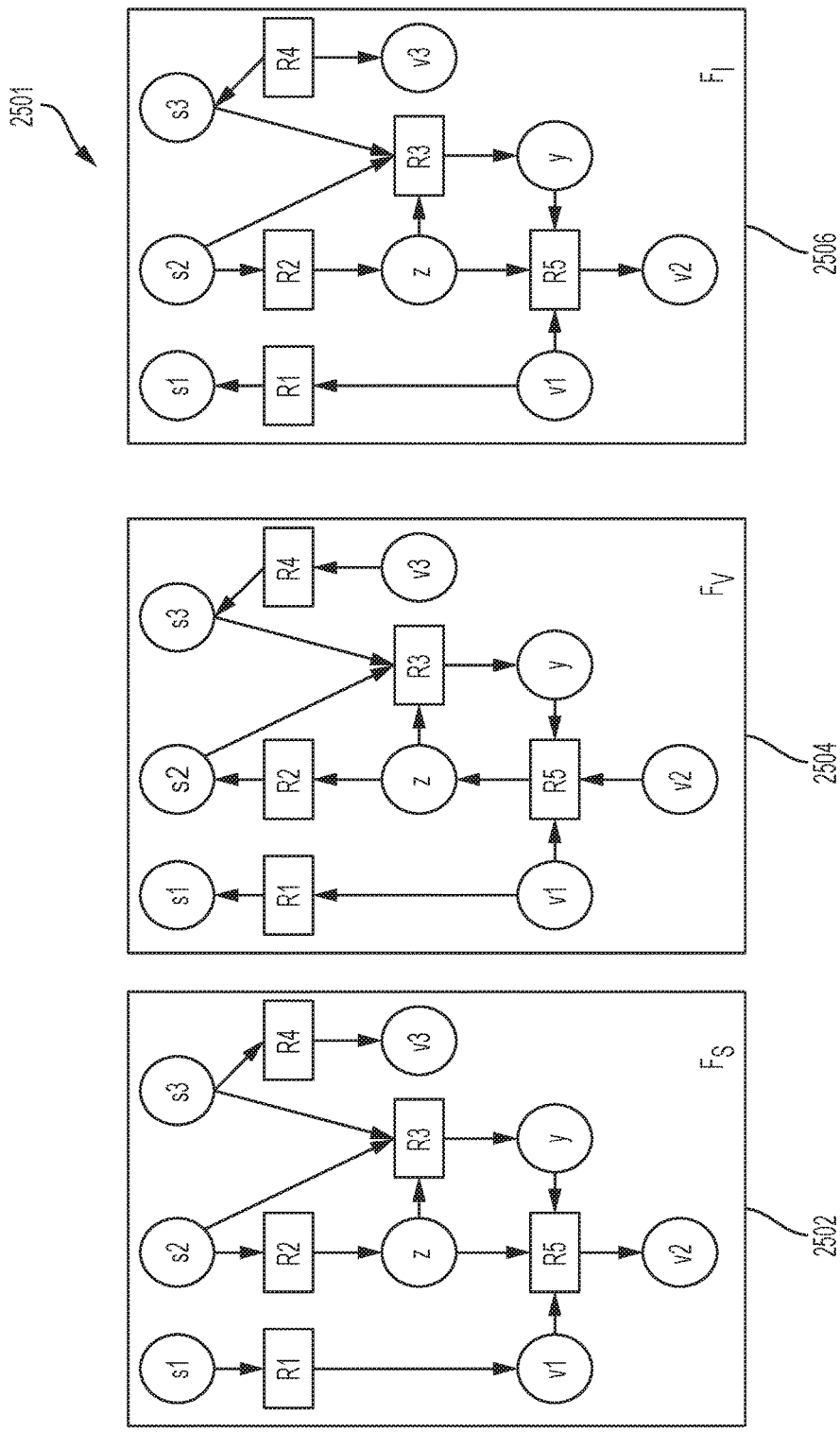
FIG. 25 depicts three flow states according to various embodiments.

FIG. 25 depicts three flow states 2501 according to various embodiments. In general, for a set of variables X of a constraint network, the "flow state with respect to X", denoted "Fx", is the state of a constraint network when all variables in set X are considered independent. Such variables only have outgoing arcs in flow state Fx.

For the set of variables $S=\{s_1, s_2, s_3\}$, the corresponding flow state $F_S$ is depicted at 2502. For the set of variables $V=\{v_1, v_2, v_3\}$, the corresponding flow state $F_V$ is depicted at 2504. For the set of variables $I=\{v_1, s_2, v_3\}$, the corresponding flow state $F_I$ is depicted at 2506.

Note that when $V \neq S$, e.g., as depicted in FIG. 24, the variables in V may be correlated. Thus, care must be taken when specifying their values. The disclosed techniques, e.g., as presented in reference to FIGS. 26 and 27 below, account for this consideration.

Figure 26:
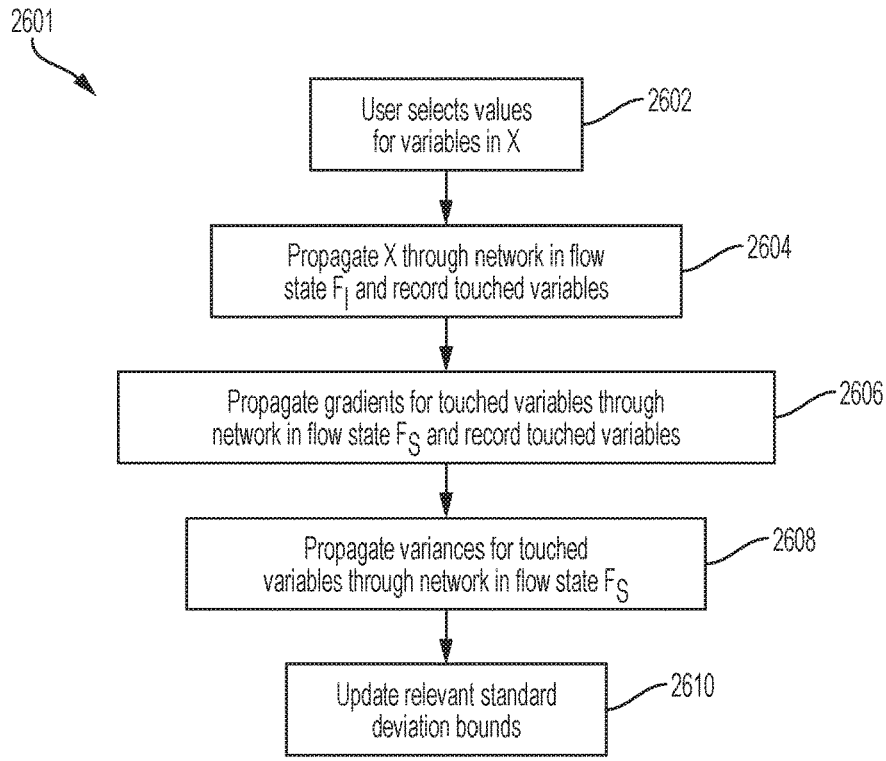
FIG. 26 is a flowchart for a process of rapid and robust uncertainty management during multidisciplinary analysis according to some embodiments.

FIG. 26 is a flowchart 2601 for a process of rapid and robust uncertainty management during multidisciplinary analysis according to some embodiments. The technique of FIG. 26 permits a user to select values for variables in set X, which is a subset of I (i.e., $X \subset I$), and obtain bounds for standard deviations that, when implemented, ensure that the user-selected variable values are met. The process of FIG. 26 is described in reference to the figures in this section and may be implemented on computer hardware as shown and described in reference to FIG. 36 below, for example.

At block 2602, a user selects a set of variables, denoted X, and selects individual values for them. Note that the variables in X are selected from I (i.e., $X \subset I$) but may also be included in any, or any combination, of the sets S and V (see FIG. 24, above) when I intersects S and/or V. The selections may be made using, for example, a graphical user interface. An example use case is that the user selects the variables and their values with the intention of performing a reverse computation (e.g., as shown and depicted above in reference to FIG. 22) to determine a required range of values for one or more other variables to achieve the selected values for the selected variables in X.

At block 2604, process 2601 places the constraint network into a flow state with respect to I, i.e., $F_I$. This flow state configuration is explained above in reference to FIG. 25. Next, the process propagates the selected values for the variables in X through the network while in $F_I$. This propagation is similar to the process described in Section II, above. In particular, a plan step is executed in the sequence of consequences of X in flow state $F_I$ if and only if its conditioning world set evaluates to True in the current data environment.

The process then records the variables in V that are touched during the propagation process. As used herein, a variable is "touched" during a propagation if, during that propagation process, at least one of the propagated entities (whether a value or an uncertainty such as a standard deviation) alters or impacts a value for the variable. The touched variables in V may be recorded by storing their identities in persistent or volatile electronic memory, for example.

At block 2606, process 2601 places the constraint network into a flow state with respect to S, i.e., $F_S$. This flow state configuration is explained above in reference to FIG. 25. Next, the process propagates gradients with respect to the variables in S of the variables recorded at block 2604 through the constraint network. Note that variable value changes may require updates of the gradients of the encountered variables due to possible nonlinearities in the relations. With $T_V$ denoting the set of touched variables during value propagation above, the process may determine the sets $T_{VS}=T_V \cap S$ and $T_{V \setminus S}=T_V \cap (V \setminus S)$. Initialize the set of touched-variance-variable, $T_{VV}$, to $T_{VS} \cap V$ and $T^+_V$ to $T_V$. Next, initialize the gradients of each $s_j$ in $T_{VS}$ that has a value or a variance to $$\frac{\partial s_j}{\partial s_j} = 1,$$

leaving the other elements of the gradient blank for efficiency. Further, for each $v \backslash s_j$ in $T_{V \setminus S}$, determine a corresponding $s \backslash v_j$ in $S \backslash V$ that is upstream of $v \backslash s_j$ in flow state $F_S$ and add $s \backslash v_j$ to $T^+_V$. Additionally, set the gradient of $s \backslash v_j$ $$\frac{\partial s \backslash v_j}{\partial s \backslash v_j} = 1.$$

The process of propagating gradients through the constraint network in state $F_S$ is further shown and described in reference to FIGS. 28 and 29, below. Gradients are propagated to the set of all consequences of $T^+_V$ in flow state $F_S$. The process of this block then records the variables in V that were touched by the propagated gradients. The touched variables in V may be recorded by storing their identities in persistent or volatile electronic memory, for example.

At block 2608, process 2601 configures the constraint network into a flow state with respect to S, i.e., $F_S$. This flow state configuration is explained above in reference to FIG. 25. Next, the process propagates variances (squares of standard deviations) for the variables recorded at block 2606 through the network while it is so configured. The process of propagating variances through the constraint network is further shown and described in reference to FIG. 30, below.

At block 2610, process 2601 updates the relevant uncertainty (e.g., standard deviation) bounds. The process of updating the relevant uncertainty bounds is shown and described below in reference to FIG. 31 below.

In sum, certain steps of process 2601 may be characterized as follows, for example:
(1) Propagate Values: In flow state $F_I$, propagate variable values to descendants.
(2) Propagate Gradients: In flow state $F_S$, propagate variable gradients with respect to the stochastically uncorrelated variables that have an influence on the impacted descendants from previous step.
(3) Propagate Variances: Update variances of impacted variables from previous step using variance update formula.
(4) Update Standard deviation Bounds: Update standard deviation bounds on user-settable standard deviations to ensure that calculated variances of all stochastically uncorrelated variables are nonnegative.

Figure 27:
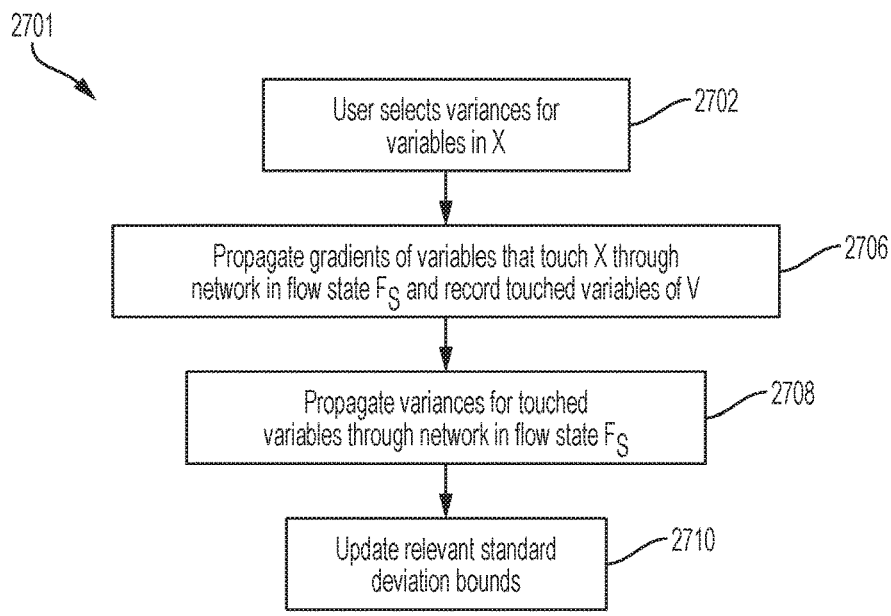
FIG. 27 is a flowchart for a process of rapid and robust uncertainty management during multidisciplinary analysis according to some embodiments.

FIG. 27 is a flowchart 2701 for a process of rapid and robust uncertainty management during multidisciplinary analysis according to some embodiments. The technique of FIG. 27 permits a user to select standard deviations for variables in set X, which is a subset of V (i.e., $X \subset V$), and obtain bounds for standard deviations that, when implemented, ensure that the user-selected standard deviations are met. The process of FIG. 27 is described in reference to the figures in this section and may be implemented on computer hardware as shown and described in reference to FIG. 36 below, for example.

At block 2702, a user selects a set of variables, denoted X, and selects individual uncertainties (e.g., standard deviations) for them. Note that the variables in X are selected from V (i.e., $X \subset V$) but may also be included in any, or any combination, of the sets S and I (see FIG. 24, above), when V intersects S and/or I. The selections may be made using, for example, a graphical user interface. An example use case is that the user selects the variables and their standard deviations with the intention of performing a reverse computation (e.g., as shown and depicted above in reference to FIG. 22) to determine a required range of values for one or more other variables to achieve the selected standard deviations on the selected variables in X.

At block 2706, process 2701 places the constraint network into a flow state with respect to S, i.e., $F_S$. This flow state configuration is explained above in reference to FIG. 25. Next, the process propagates gradients of the variables that touch X through the constraint network in flow state $F_S$. The process of propagating gradients through the constraint network in state $F_S$ is further shown and described in reference to FIGS. 28 and 29, below. The following steps may be used to determine the set of variables whose variances are being propagated that require gradient updating.
1. A variable s in S∩X with a null gradient requires gradient updating to $$\frac{\partial s}{\partial s} = 1,$$

a. Variance of s is specified, or
   b. s is in SW and has one or more descendants in V\S with specified variances.
2. A variable s in S∩X with a non-null gradient requires gradient updating to nil if:
   a. s in S∩V and variance of s is unspecified, or
   b. s is in SW and all its descendants in V\S have unspecified variances.
3. For any variable v\s in X∩V\S, let s\v be its associated variable in S\V. The variable s\v needs:
   a. Gradient updating to $$\frac{\partial s\backslash v}{\partial s\backslash v} = 1,$$

if s\v has a null gradient and variance of v\s is specified,
   b. Gradient-updating to nil, if s\v has non-null gradient and variance of v\s is unspecified.

Thus, at block 2706, process 2701 propagates the gradients of the variables in S whose gradients were modified by the above steps to their descendants in $F_S$. The process of this block then records the variables in V that were touched by the propagated gradients. The touched variables in V may be recorded by storing their identities in persistent or volatile electronic memory, for example.

At block 2708, process 2701 configures the constraint network into a flow state with respect to S, i.e., $F_S$. This flow state configuration is explained above in reference to FIG. 25. Next, the process propagates variances for the variables recorded at block 2706 through the network while it is so configured. The process of propagating variances through the constraint network is further shown and described in reference to FIG. 30, below.

At block 2710, process 2701 updates the relevant uncertainty (e.g., standard deviation) bounds. The process of updating the relevant uncertainty bounds is shown and described below in reference to FIG. 31 below.

In sum, certain steps from process 2701 may be characterized as follows, for example:
(1) Propagate Gradients: In flow state $F_S$, determine the required gradient updates depending on sets V and S; propagate variable gradients with respect to such stochastically uncorrelated variables. Add the touched variables to those needing variance updating.
(2) Propagate Variances: Update variances of impacted variables using chain rule on ordered descendant plan of modified variance variables.
(3) Update Standard deviation Bounds: Update standard deviation bounds on user-settable standard deviations to ensure that calculated variances of all stochastically uncorrelated variables are nonnegative.

Figure 28:
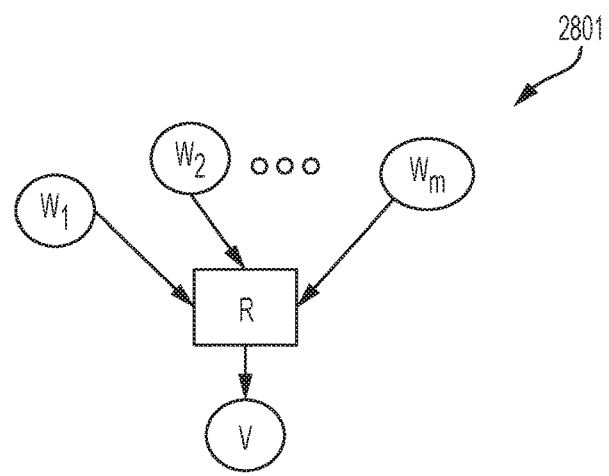
FIG. 28 schematically depicts a partial constraint network that is used to illustrate a technique for propagating gradients for a single relation that is not in a strong component according to some embodiments.
Figure 29:
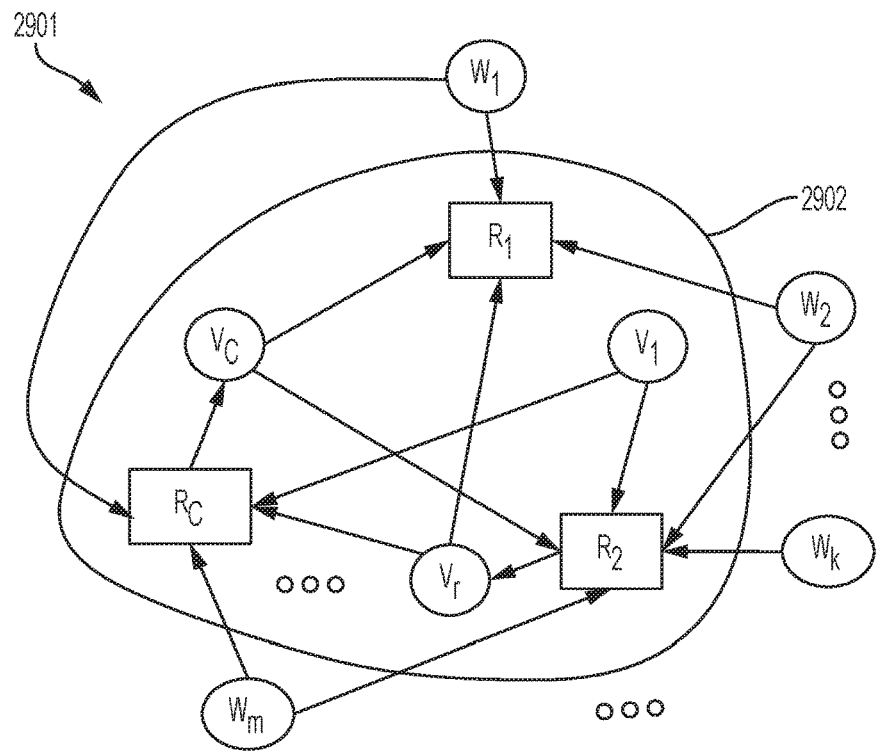
FIG. 29 schematically illustrates a partial constraint network that is used to illustrate a technique for propagating gradients when strong component variables are involved, according to some embodiments.
Figure 30:
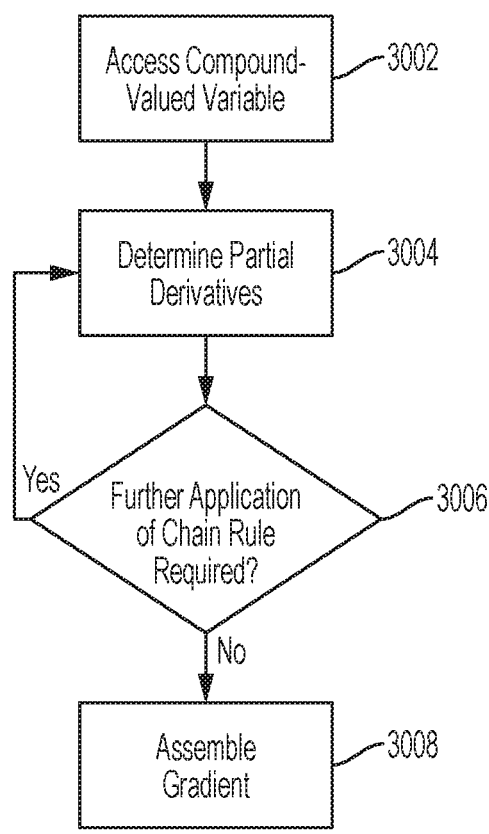
FIG. 30 is a flowchart depicting a technique for determining gradients of compound-valued variables according to some embodiments.

FIGS. 28 and 29 depicts techniques for gradient propagation according to some embodiments. These techniques may be used for blocks 2606 and 2706 of FIGS. 26 and 27, respectively. The gradient propagation may proceed according to whether it involves only non-strong component variables (FIG. 28) or strong component variables (FIG. 30). The gradient propagation may be also performed on systems that include compound-valued variables, using gradients of compound-valued variables that may be determined as shown and described in reference to FIG. 30, below.

In general, gradients with respect to the stochastically uncorrelated variables may be propagated using the chain rule in flow state $F_S$. Note also that the gradient of any stochastically uncorrelated variable $s_j$ with respect to variables in S may be represented as, by way of non-limiting example, $\langle \delta_{j1}, \ldots, \delta_{jN} \rangle$. In other words, $$\frac{\partial s_j}{\partial s_k} = \delta_{jk} = \begin{cases} 1 & j = k \\ 0 & j \neq k \end{cases}, j, k = 1, \ldots, N.$$

The processes of both FIGS. 28 and 29 may use various techniques to obtain the necessary partial derivatives. Symbolic algebra may be used to define the derivatives when possible, and numerical differencing may be used if symbolic processing fails. An implementation may cache the value of the gradient of each variable in the network with respect to each of the variables in S. In some implementations, each directed arc from a variable $w_i$ to a relation R may cache $$\frac{\partial R}{\partial w_i}.$$

Alternately, or in addition, the partial derivatives may be computed using on-demand processing. These approaches may be combined according to some embodiments.

In the following discussions of propagating gradients with respect to FIGS. 28 and 29, all values may have previously been propagated through the network. It is convenient during value propagation to also propagate gradients with respect to the variables in S through the network. Gradient propagation through the relations in the network take different forms depending upon whether a relation is in a strong component (fundamental cycle) or not.

FIG. 28 schematically depicts a partial constraint network 2801 that is used to illustrate a technique for propagating gradients for a single relation that is not in a strong component according to some embodiments. In particular, FIG. 28 depicts a (possibly implicit) constraint R defining a variable v, with $w_1, \ldots, w_m$ being the immediate upstream variables of v: $R(v, w_1, \ldots, w_m) = 0$.

The first order variation in R may be represented as, by way of non-limiting example:

$$\delta R = \frac{\partial R}{\partial v}\delta v + \sum_i \frac{\partial R}{\partial w_i}\delta w_i, \delta R = 0 \Rightarrow \frac{\partial v}{\partial w_i} = -\frac{\partial R/\partial w_i}{\partial R/\partial v}.$$

Thus, the gradient of v may then be computed using the chain rule, by way of non-limiting example, as follows.

$$\frac{\partial v}{\partial s_j} = \sum_{i | w_i \in D(s_j, F_S)} \left(-\frac{\partial R/\partial w_i}{\partial R/\partial v}\right)\frac{\partial w_i}{\partial s_j},$$

∀j ∋ v∈D($s_j$,$F_S$). In the previous equation, the term D($s_j$,$F_S$) represents the set of descendants of $s_j$ when the network is in flow state $F_S$.

FIG. 29 schematically illustrates a partial constraint network 2901 that is used to illustrate a technique for propagating gradients when strong component variables are involved, according to some embodiments. In particular, the variables $v_1$, $v_2$, . . . , $v_C$, are in strong component 2902 defined jointly by the relations $R_1$, $R_2$, . . . , $R_C$. (Note that component 2902 includes a cycle defined by $v_C$, $R_2$, $v_r$, and $R_C$.) The variables $w_1$, . . . , $w_m$ are the immediate upstream variables of this component. That is, they are variables contained in the relations $R_1$, $R_2$, . . . , $R_C$, that are not in the component. The first order variation in these relations may be represented as, by way of non-limiting example:

$$\delta R_i = \sum_{k=1}^{C} \frac{\partial R_i}{\partial v_k}\delta v_k + \sum_{l=1}^{m} \frac{\partial R_i}{\partial w_l}\delta w_l,$$

i=1, . . . , C. In matrix form, this may be expressed as $$\delta R = \frac{dR}{dv}\delta v + \frac{dR}{dw}\delta w = 0.$$

This implies $$\frac{\partial v}{\partial w} = \begin{pmatrix} \frac{\partial v_1}{\partial w_1} & \cdots & \frac{\partial v_1}{\partial w_m} \\ \vdots & \ddots & \vdots \\ \frac{\partial v_C}{\partial w_1} & \cdots & \frac{\partial v_C}{\partial w_m} \end{pmatrix} = -\left(\frac{dR}{dv}\right)^{-1}\frac{dR}{dw}.$$

The chain rule may be applied to obtain, by way of non-limiting example:

$$\frac{\partial v_k}{\partial s_j} = \sum_{i|w_i \in D(s_j,F_S)} \left(\frac{\partial v}{\partial w}\right)_{k,i} \frac{\partial w_i}{\partial s_j},$$

∀$_j$ ∋ $v_r$∈D($s_j$,$F_S$), for some r.

FIG. 30 is a flowchart depicting a technique for determining gradients of compound-valued variables according to some embodiments. A "compound-valued variable" is a structure that includes at least two values. Embodiments may include compound-valued variables in their constraint network. An explanation of compound-valued variables and their operators is presented next, after which the steps of FIG. 30 are described in detail.

In general, restriction to scalar-valued variables limits the utility of constraint management systems for performing architectural trades involving numerous alternative component choices for each subsystem. A cumbersome workaround is to code "non-existent" elements in a chosen configuration as having "zero" weight, "zero" power consumed, "zero" cost, etc. This workaround often leads to singular equations when solving coupled subsystems of equations managing results of multi-objective subsystem optimizations, represented as Pareto-frontiers of optimal configurations, in an integrated fashion. As described presently, some embodiments utilize compound-valued variables to accommodate alternative choices. That is, some embodiments support automated multi-disciplinary trade studies involving discrete choices for subsystem components. Further, some embodiments enable integration of subsystem multi-objective optimizations into system level reasoning and analysis.

Examples of compound-valued variables include sequences, sets, vectors, matrices, maps, arrays, and combinations of the preceding, e.g., sets of vectors, matrices of maps, arrays of vectors of maps, etc. A description of selected compound-valued variables follows.

A sequence-valued variable represents a sequence of a plurality of values and may be represented as Sequence:= (Value1, Value2 [, . . . ]]). The distinction between a set-valued variable and a sequence-valued one is that a sequence-valued variable may contain duplicates and is treated as ordered. The elements of a sequence-valued variable can be any type. An example sequence-valued variable is (3.4, 2+4.2i, {s1, s2}, #<1, 2, 3>, 3.4, . . . ).

A set-valued variable represents a set of values and may be represented as Set:={Value1, Value2 [, . . . ]]}. The distinction between a set-valued variable and a sequence-valued one is that a set-valued variable does not contain duplicates and is treated as unordered. An example set-valued variable is {2.4, 5, {12, 2.4}, . . . }. The elements of a set-valued variable can be any type.

A vector-valued variable, which may be represented as Vector:=#(value1, value2 [, . . . ]), is an ordered object of fixed dimension. The distinction between a vector-valued variable and a sequence-valued one is that a vector-valued variable has fixed dimensionality. The elements of a vector-valued variable can be any type.

A matrix-valued variable, which may be represented as Matrix:=#((value11, value12 [, . . . ]) ([value21],[,value22], [, . . . ])), has exactly two dimensions, each of which are fixed and may not change after the model is loaded. The elements of a matrix-valued variable can be any type.

Map-valued variables, which may be represented as Map:={key→Value [, key→Value [, . . . ]]}, associate a "pointer", which is typically an index, or single-quoted variable name, with a value. For example, {S1→100, S2→200, S3→300} is a map-valued variable that associates the index S1 with the value 100, and so on. The elements of a map-valued variable can be any type.

Array valued variables, which may be represented as Array:=#nA{[{{ . . . {] values, . . . [} . . . }}]} where n is the arbitrary but fixed number of dimensions of the array. An example of a 2×3×2 array-valued variable is as follows: #3A{{{1, 2}, {3, 4}, {5, 6}}, {{7, 8}, {9, 10}, {11, 12}}, {{13, 14}, {15, 16}, {17, 18}}}. The elements of an array-valued variable can be any type.

As indicated above, compound-valued variables may be recursively constructed from any plurality of compound-valued variables. That is, the elements of compound-valued variables can themselves be compound-valued. The nesting can be to any arbitrary depth. That is, a compound-valued variable may have any number of levels, for example, two-level compound-valued variables include vectors of sets (of scalars), maps of matrices (of scalars), etc.; three-level compound-valued variables include maps of vectors of arrays (of scalars), matrices of vectors of maps (of scalars), etc.

Embodiments that utilize compound-valued variables may enable the use of a single variable to encode choices in a configuration. For example, a set-valued variable "SensorSuite" may be used to encode multiple sensor configurations. For example, SensorSuite={Radar_1, IR_2, Vision_1, Sonar_1} in one configuration and SensorSuite={IR_1, Vision_1} in another configuration. The "elements" of a set-valued variable, i.e., the "value" of the variable may be input by the user, computed by the constraint network, or may be determined by a subsystem optimization study within the CMS based the trade study environment itself. This optimized value may vary automatically with parametric variations in system requirements.

Operators for compound-valued variables are described presently. In general, categories of such operators may include set operators, utility operators, constructors and coercion operators, and iterative operators. Examples from each such category are described presently.

Set operators for compound-valued variables include Union, Intersection, Difference (i.e., set subtraction) and Append. All the usual set operations apply to compound valued variables. The distinction is that for vectors, matrices, arrays, and map values, for example, the values may be first coerced into sequences before applying the set operations. Also, in some embodiments, the result of these operators is a sequence, regardless of the input types. For example, the Append set operator appends the individual expression values, which are all first coerced into sequences. The Append operation preserves all duplicates and the ordering of the arguments. Thus, for example, Append({1, 2, 3},{2, 3, 4},{3, 4, 5})=(1, 2, 3, 2, 3, 4, 3, 4, 5), where parentheses denote an ordered sequence. In contrast, the Union set operator takes the union of the individual expression values, which are all first coerced into sequences. The Union operation will remove duplicates due to subsequent arguments after the first argument, but not duplicates appearing in the first argument. Thus, for example, Union({1, 2, 3}, {2, 3, 4})={1, 2, 3, 4}, rather than {1, 2, 3, 2, 3, 4}.

Utility operators for compound-valued variables include Length, Size, and Keys. Length returns the length of a sequence, for example. Size returns the size of a set, for example. Keys returns the key values (i.e., domain) of a map, for example.

Constructors and coercion operators for compound-valued variables include ToSequence, ToMap, ToMatrix, ToVector, and ToSet. These operators are used to coerce compound values to specific compound-value types. They typically work by first coercing their argument to sequences and then constructing the specific type from the elements of the sequence created. ToSequence coerces its argument into a sequence. If the argument is not a compound value (e.g., it is a number, categorical value, date, etc.), then the ToSequence operator returns Unknown. For example, ToSequence({1, 2, 3})=(1, 2, 3). ToMap coerces its argument into a Map data structure if, and only if, the argument is a sequence of key value associations of the form {key1→value1, key2→value2, . . . }. ToMatrix takes two required arguments: the first is the rank (the number of dimensions) of the matrix, and the second argument is an expression that will be used to generate the contents of the array. This expression must be hierarchically decomposable into a nested set of sequences, to a depth equal to the rank asked for. ToVector coerces its argument into a vector of length equal to the number of elements in the sequence representation of expression. ToSet coerces its argument into a set, removing duplicates.

Iterative operators, also referred to as iterative constructors, include Collect, CollectIf, SelectIf, TradeTable, and TradeSpace. The Collect operator "collects" the values of its collection arguments into a sequence as its iterator argument(s) vary over allowed values. For example, Collect(s[i], i<=N) for a vector s of length at least equal to the value of N in the relevant data environment returns a sequence (s[1], s[2], . . . , s[N]), with the s[i]'s evaluated in the current data environment. The conditional operator CollectIf "collects" the value of its collection arguments for those values of its iterator argument(s) for which a predicate argument is true. For example, FeasibleSensors=CollectIf (Cost$(j)<=CostLimit, j, j in Sensors), where Sensors is an index set whose elements are sensor names (e.g., Sensors={InfraRed1, InfraRed2, Radar17, . . . } and Cost$ is a function that can compute the cost of each sensor, returns a variable whose value is the set of sensors that meet the given cost criterion. SelectIf is similar to CollectIf, except that it selects a single term to return as its output. The TradeTable operator creates a whole trade table, returning its value as a Table data type, which internally is a sequence of Map values, one Map value for each row of the table. The indices of these Map values are quoted variable names used as headers of the trade table. In general, a "trade space" is a set of independent variables and dependent variables, together with a specification on how to generate samples to fill interesting regions of the trade space. The TradeSpace operator provides a convenient way to search a very large region of a trade space without resorting to complete factorial enumeration that TradeTable does or requiring a complete manual listing of the cases to be run that a scenario table calls for.

Turning now to the specific steps of FIG. 30, at block 3002, the technique accesses a compound-valued variable. The accessing may include accessing an electronically-stored representation of the compound-valued variable in computer persistent or volatile memory. The compound-valued variable is part of a trade study, as described herein.

At block 3004, the technique determines partial derivatives of the compound-valued variable. This may occur similar to determining compound-wise derivatives of scalar-valued variables, except that additional procedures are required for determining partial derivatives of certain compound-valued variable operators. Thus, the technique may proceed at block 3004 by applying symbolic differentiation operators as depicted in the Table below.

TABLE

| Derivative Applied to Operator | How to Compute |
| --- | --- |
| D(Append(<arg1>, <arg2>, . . . )/Dx | Append(D(<arg1>)/Dx, D(<arg2>)/Dx . . . ) |
| D(Collect(<expression>, <iterators>)/Dx | Collect(D(<expression>)/ Dx, iterators) |
| D(To<datatype>(expression))/Dx | To<datatype>(D(expression)/Dx) |

As shown above in the Table, partial derivatives may be determined for operators for compound-valued variables. For example, D(ToSet(expression)/Dx=ToSet(D(expression)/Dx). The remaining operators are handled similarly, as depicted in the Table.

At block 3006, the technique determines whether block 3004 requires applying the chain rule. The chain rule states that the derivative of a function with arguments is the product of the derivative of the function and the derivative of its arguments. Note that because compound-valued variables may themselves have compound-valued arguments, the chain rule may apply. The chain rule is further elaborated upon in reference to FIGS. 28 and 29, above. If the chain rule applies, then the technique returns to block 3004 to determine the derivative of any arguments of any function handled at the prior application of block 3004. Otherwise, if the chain rule has been recursively exhausted or otherwise does not apply, control passes to block 3008.

At block 3008, the technique assembles the gradient from the partial derivatives computed by the prior blocks. The assembly may be accomplished as an algebraic sum, for example. Alternately, or in addition, the assembly may include storage of the partial derivatives in electronic volatile or persistent memory in a manner that permits retrieval for processing as disclosed herein.

Embodiments that include compound-valued variables may be processed as described herein in order to estimate uncertainty. The processing is essentially the same as for embodiments that lack compound-valued variables (see, e.g., FIGS. 28 and 29 and accompanying discussion), except that the gradient propagation involves extra steps, such as computing derivatives of compound-valued variables, as shown and described in reference to FIG. 30. That is, propagating uncertainties in the context of compound-valued variables is handled differently than in scalar-valued-only embodiments.

Reverse calculation of upstream scalar-valued variables from downstream scalar-valued variables is permitted even when there are intermediate compound-valued variables. Such reverse calculation may be accomplished by automatically creating virtual arcs that connect upstream scalar variables to downstream scalar relations when the computational path goes though compound-valued-relations. Virtual arcs may be used so as to cause the graph algorithms to recognize the existence of a strong component in the graph, enabling iterative solution of upstream values from downstream requirements. The scalar iterative graph algorithms work the same for embodiments that include compound-valued variables and embodiments that only include scalar variables, as long as the iterator variables are restricted to be scalar and the error relations are restricted to be scalar relations.

Embodiments that include compound-valued variables may also include a set of extensions to the underlying constraint management algorithms to treat compound-valued variables as atomic entities along with normal scalar-valued parameters. Such embodiments allow for embedding the results of a multi-objective subsystem optimization study (e.g., the Pareto frontier of a trade-off subspace) into the constraint network itself for further system level analysis. Additional relations may be used for further trade studies among these optimal elements using such set valued variables. This capability is not possible in scalar-only versions of a constraint-management-system-based trade study tool.

Figure 31:
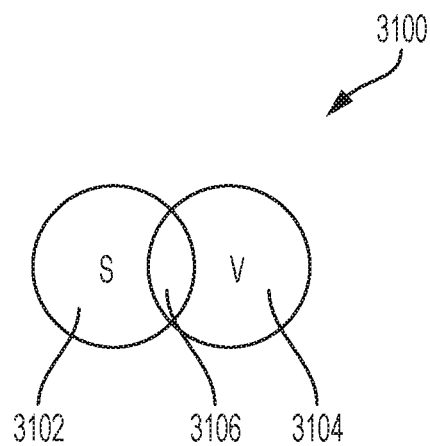
FIG. 31 depicts Euler circles used to illustrate variance propagation according to some embodiments.

As presented below, FIG. 31 is used to depict techniques for variance propagation according to some embodiments. These techniques may be used for blocks 2608 and 2708 of FIGS. 26 and 27, respectively.

FIG. 31 depicts Euler circles 3100 used to illustrate variance propagation according to some embodiments. There may be two different cases for variance propagation: the case when V=S, and the case when V≠S. The first case is described immediately below, followed by a description of the second case in reference to Euler circles 3100.

The first case, S=V, means that the set of variables with user-specifiable standard deviations is the same as the set of variables that are stochastically uncorrelated. Euler circles representing this situation and corresponding to those of FIG. 31 would be coextensive with each-other. Some embodiments use local linearization to compute the variance of any variable downstream of one or more of the variables in S. Let z be a vector of m variables downstream of the vector variable, s, of n variables, where elements of s form the set S. Using a Taylor series expansion of the possibly nonlinear function relating s to v in flow state $F_S$, the following obtains:

$$z = f(s) \approx f(\mu_s) + \frac{\partial f}{\partial s}(s - \mu_s) + \ldots$$

$$\frac{\partial f}{\partial s} = \begin{pmatrix} \frac{\partial f_1}{\partial s_1} & \cdots & \frac{\partial f_1}{\partial s_N} \\ \vdots & \ddots & \vdots \\ \frac{\partial f_m}{\partial s_1} & \cdots & \frac{\partial f_m}{\partial s_N} \end{pmatrix}$$

Thus, it follows that $\mu_z = E(z) \approx f(\mu_s) + \ldots$ and $$\sum_z = E((z - \mu_z)(z - \mu_z)') \approx \frac{\partial f}{\partial s} \sum_s \left(\frac{\partial f}{\partial s}\right)'.$$

Because the S variables are uncorrelated, $\Sigma s$ is diagonal. Therefore, $$\sigma_{z_i}^2 = \sum_{j=1}^n \left(\frac{\partial z_i}{\partial s_j}\right)^2 \sigma_{s_j}^2$$

and $$\mathrm{cov}(z_i, z_k) \equiv \sigma_{z_i, z_k} = \sum_{j=1}^n \left(\frac{\partial z_i}{\partial s_j}\right)\left(\frac{\partial z_k}{\partial s_j}\right) \sigma_{s_j}^2$$

$$\left(\text{note that } \frac{\partial z_i}{\partial s_j} \equiv \frac{\partial f_i}{\partial s_j}\right).$$

Thus, for the first case, when S=V, all the variances $\sigma_{s_j}^2$ are user-specified for each variable in S, so the process can calculate the variances for all downstream variables z from their S-gradients.

The second case for propagating variances, when S≠V, is illustrated by Euler circles 3100. Specifically, region S\V 3102 includes stochastically uncorrelated variables with variances that are not user-settable (where the symbol "\" is used to denote set subtraction), region V\S 3104 includes stochastically correlated variables with variances that are user-settable, and region S∩V 3106 includes stochastically uncorrelated variables with variances that are user-settable (where the symbol "∩" denotes set intersection). This situation may be handled by back-computing variances of user-unspecified variances in S\V from user-specified variances in V as described presently.

When S≠V, both V\S 3104 and S\V 3102 may be non-empty. In fact, for the network to be in a consistent state with all arcs directed and no relations over-constrained in each of the flow states $F_S$ and $F_V$, it must be that the cardinality of S\V 3102 is the same as the cardinality of V\S 3104.

Thus, the variance propagation procedure according to some embodiments when S≠V is to first determine the values of the variances of the variables in SW 3102 so that when they are propagated though the network in flow state $F_S$, the variances of the variables in V\S 3104 will have the user-settable values given by the user. Local linearization implies the following for the variances of the variables in V\S 3104 as a function of those in SW 3102 and S∩V 3106: $\vec{\sigma}_{v_{V\setminus S}}^2 = J_{(V\setminus S),(S\setminus V)} \vec{\sigma}_{s_{S\setminus V}}^2 + J_{(V\setminus S),S\cap V} \vec{\sigma}_{v_{S\cap V}}^2$. In this formula, the Jacobian matrices have the following elements:

$$(J_{(V\setminus S),(S\setminus V)})_{i,j} = (dv_i/ds_j)^2, \forall v_i \in (V\setminus S), \forall s_j \in (S\setminus V)$$

$$(J_{(V\setminus S),(S\cap V)})_{i,j} = (dv_i/ds_j)^2, \forall v_i \in (V\setminus S), \forall s_j \in S\cap V$$

$$(\vec{\sigma}_{v_{(V\setminus S)}}^2)_i = \vec{\sigma} v_i^2, \forall v_i \in (V\setminus S)$$

$$(\vec{\sigma}_{s_{(S\setminus V)}}^2)_j = \vec{\sigma} s_j^2, \forall s_j \in (S\setminus V)$$

Solving for $\vec{\sigma}^2$ yields the following: $\sigma_{s_{(S\setminus V)}}^2 = J_{(V\setminus S),(S\setminus V)}^{-1} ( \vec{\sigma}_{v_{(V\setminus S)}}^2 - J_{(V\setminus S),S\cap V} \vec{\sigma}_{v_{S\cap V}}^2 )$. From this, note that $J_{(V\setminus S),(S\setminus V)}$ is a square matrix. For the final solution, either invert this matrix if it is invertible, or use its Moore-Penrose pseudo inverse if it is not invertible.

Figure 32:
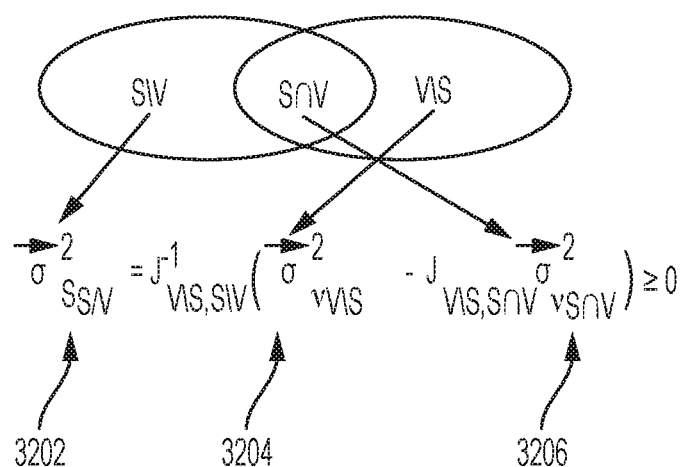
FIG. 32 depicts Euler circles that are used to explain standard deviation bounds according to some embodiments.

As presented below, FIG. 32 is used to depict a consideration for updating standard deviation bounds according to some embodiments. The techniques presented in reference to FIG. 32 may be used for blocks 2610 and 2710 of FIGS. 26 and 27, respectively.

FIG. 32 depicts Euler circles that are used to explain standard deviation bounds according to some embodiments. Note that derived variances in S\V must be non-negative. This implies certain constraints on user-specified variances for variables in V. In particular, as depicted in FIG. 32, term $\vec{\sigma}_{s_{S\setminus V}}^2$ 3202 is in S\V, term $\vec{\sigma}_{v_{V\setminus S}}^2$ 3204 is in V\S, and term $\vec{\sigma}_{v_{S\cap V}}^2$ 3206 is in S∩V. Therefore, $V_{k*} \in V\setminus S$ implies $$B_{jk*}\sigma_{v_{k*}}^2 + \sum_{v_k \in V-S, k\neq k*} B_{jk}\vec{\sigma}_{v_k}^2 - \sum_{k}\sum_{v_r \in S\wedge V} B_{jk}C_{kr}\sigma_{v_r}^2 \geq 0,$$

∀j=1, . . . , $N_{S-V}$, and $v_{k*} \in S\cap V$ implies $$\sum_{v_k \in V-S} B_{jk}\vec{\sigma}_{v_k}^2 - \sum_k \sum_{v_r \in S\wedge V, r\neq k*} B_{jk}C_{kr}\sigma_{v_r}^2 - \left(\sum_l B_{jl}C_{lk*}\right)\sigma_{v_{k*}}^2 \geq 0,$$

∀j=1, . . . , $N_{S-V}$, where $A = J_{V\setminus S, S\setminus V}$, $B = A^{-1}$, and $C = J_{V\setminus S, S\cap V}$. Thus, the variance bounds on the user-selected variances are updated to ensure that the calculated variances of all stochastically uncorrelated variables are nonnegative.

Figures 34, 35:
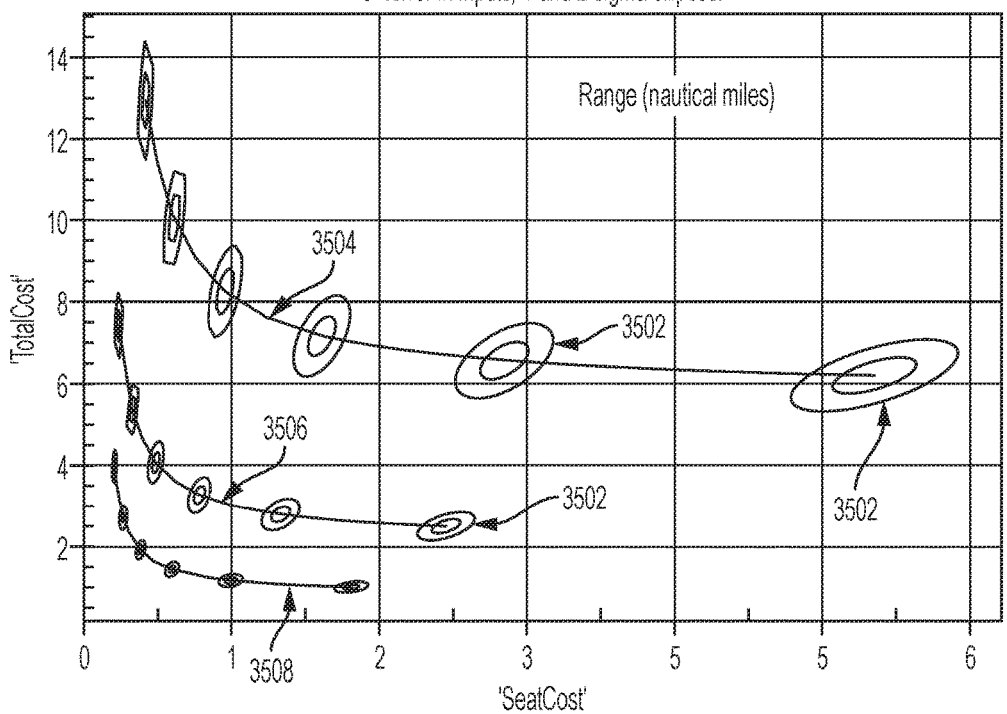
FIG. 34 depicts a correlation matrix for variables in the model of the example of FIGS. 33, 34, and 35.
FIG. 35 is a graph depicting seat cost versus total development and production cost for the model of the example of FIGS. 33, 34, and 35.

Below, FIGS. 33, 34, and 35 are presented to provide an example of using a known cost model for an airplane that takes airplane sizing into account. The model has 144 relations and 193 variables.

FIG. 33 depicts a chart 3302 of selected value and standard deviations for variables in the model of the example of FIGS. 33, 34, and 35. Each variable has a user-specifiable standard deviation, which may be set to any value within the presented standard deviation limits of the last column. For example, gross takeoff weight, $W_0$, is shown as being set to a user-specifiable value of 100.

FIG. 34 depicts a correlation matrix 3401 for variables in the model of the example of FIGS. 33, 34, and 35. Note, for example, that gross takeoff weight $W_0$ is highly correlated with total cost in the model under discussion.

FIG. 35 is a graph 3501 depicting seat cost versus total development and production cost for the model of the example of FIGS. 33, 34, and 35. Depicted on graph 3501 are curves relating the seat cost to the total development cost, corresponding to three different aircraft ranges, namely 3000 nautical miles (3504), 2000 nautical miles (3506), and 300 nautical miles (3508). An embodiment of the invention was used to generate confidence ellipses 3502, which indicate the uncertainty of the curves for the respective ranges. Note that the ellipses are slanted because the variables are correlated.

Figure 36:
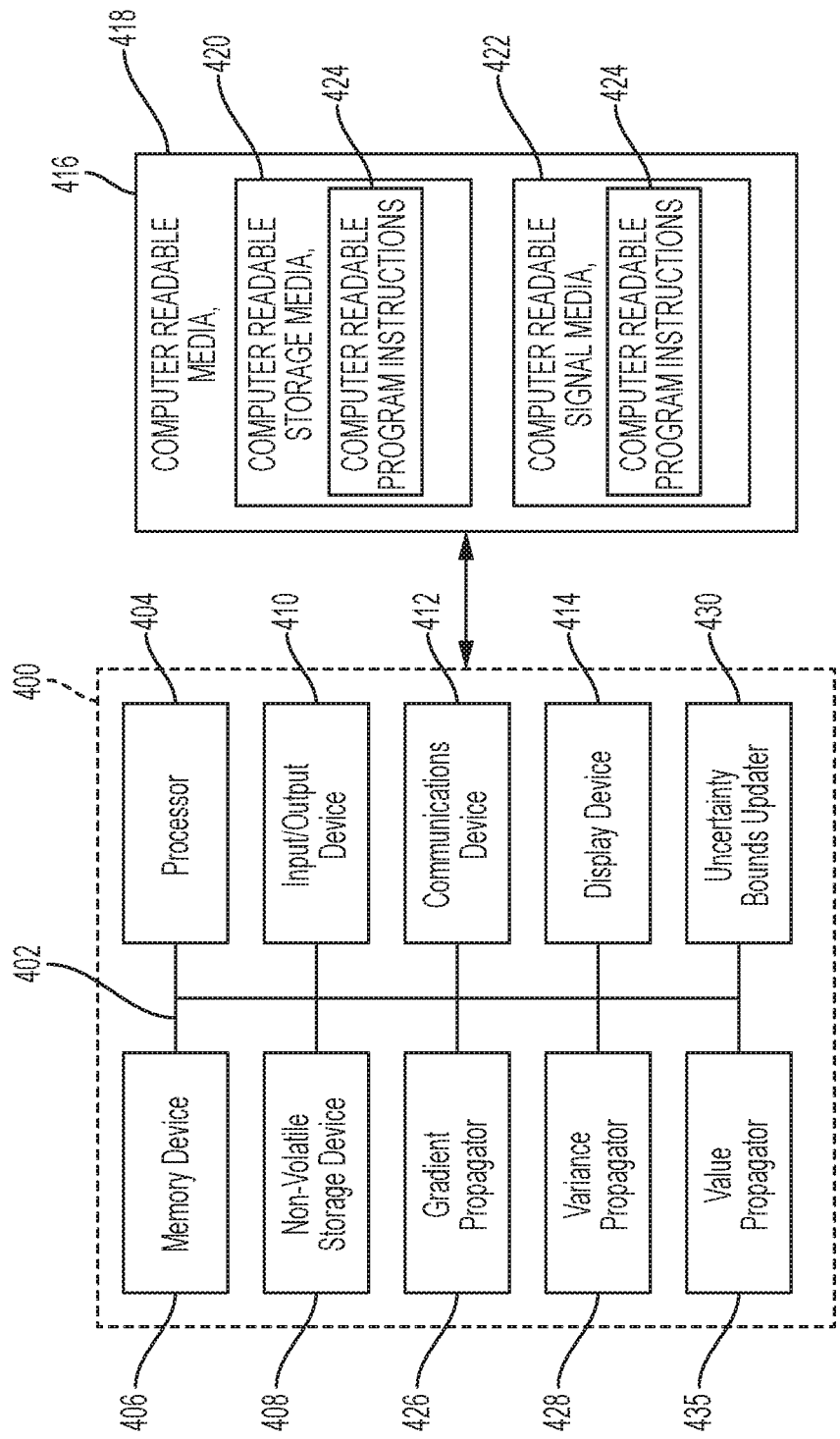
FIG. 36 depicts a block diagram of a system for implementing the above-described uncertainty management techniques, in whole or in part, in a computer-implemented process such as on a processor-based system or other suitable computer system.

FIG. 36 depicts a block diagram of a system for implementing the above-described uncertainty management techniques, in whole or in part, in a computer-implemented process such as on a processor-based system 400 or other suitable computer system. The processor-based system 400 may implement one or more of the above-described steps for the disclosed techniques (FIGS. 26 and 27). The processor-based system 400 may perform computer readable program instructions 424 which may be provided to or loaded onto the processor-based system 400 in order to implement one or more of the above-described operations or steps. In a non-limiting example, the processor-based system 400 and/or the computer readable program instructions 424 may facilitate uncertainty management as disclosed herein.

The block diagram of FIG. 36 illustrates the processor-based system 400 in an advantageous embodiment that may facilitate uncertainty management for a bipartite graph representing a constraint network. In the embodiment illustrated in FIG. 36, the processor-based system 400 may include a data communication path 402 (e.g., data link) communicatively coupled to one or more component blocks to facilitate transfer of data between such component blocks. The communication path 402 may comprise one or more data buses or any other suitable communication path 402 that facilitates the transfer of data between the component blocks and devices of the processor-based system 400.

Referring to FIG. 36, in a non-limiting embodiment, the component blocks may include one or more of a processor 404, a memory device 406, a non-volatile storage device 408, a communications device 412, an input/output device 410, and a display device 414. The system may further include gradient propagator 426, variance propagator 428, value propagator 435, and uncertainty bounds updater 430. As indicated above, gradient propagator 426 propagates gradients as shown and described above in reference to FIGS. 26, 27, 28, and 29. Variance propagator 428 propagates variances as shown and described above in reference to FIGS. 27 and 30. Value propagator 435 propagates values as shown and described above in reference to FIG. 26. Uncertainty bounds updater 430 updates uncertainty bounds as shown and described above in reference to FIG. 31.

Referring still to FIG. 36, the results of any one of the above-described steps may be transmitted to the input/output device 410. The input/output device 410 may be communicatively coupled to the display device 414 which may be configured to display the results of the computational planning. The display device 414 may be configured to display the progress and/or results of an implementation of the computational planning. In addition, the display device 414 may be configured to display the results of a trade study implemented in a data-dependent constraint management system as shown and described.

In an embodiment, the processor-based system 400 may include one or more of the processors 404 for executing instructions of computer readable program instructions 424 that may be installed into the memory device 406. Alternatively, the processor 404 may comprise a multi-processor core having two or more integrated processors cores. Even further, the processor 404 may comprise a main processor and one or more secondary processors integrated on a chip. The processor 404 may also comprise a many-processor system having a plurality of similarly configured processors.

Referring still to FIG. 36, the processor-based system 400 may further include one or more memory devices 406 which may comprise one or more of volatile or non-volatile storage devices 408. However, the memory device 406 may comprise any hardware device, without limitation. For example, the memory device 406 may comprise a random access memory or a cache of an interface and/or integrated memory controller hub which may be included in the communication path. The memory device 406 may be configured to permanently and/or temporarily store any one of a variety of different types of data, computer readable code or program instructions, or any other type of information. The non-volatile storage device 408 may be provided in a variety of configurations including, but not limited to, a flash memory device, a hard drive, an optical disk, a hard disk, a magnetic tape or any other suitable embodiment for long-term storage. In addition, the non-volatile storage device 408 may comprise a removable device such as a removable hard drive.

The processor-based system 400 may additionally include one or more of the input/output devices 410 to facilitate the transfer of data between components that may be connected to the processor-based system 400. The input/output device 410 may be directly and/or indirectly coupled to the processor-based system 400. The input/output device 410 may facilitate user-input by means of a peripheral device such as a keyboard, a mouse, a joystick, a touch screen and any other suitable device for inputting data to the processor-based system 400. The input/output device 410 may further include an output device for transferring data representative of the output of the processor-based system 400. For example the input/output device 410 may comprise a display device 414 such as a computer monitor or computer screen for displaying results of data processed by the processor-based system 400. The input/output device 410 may optionally include a printer or fax machine for printing a hardcopy of information processed by the processor-based system 400.

Referring still to FIG. 36, the processor-based system 400 may include one or more communications devices 412 to facilitate communication of the processor-based system 400 within a computer network and/or with other processor-based systems. Communication of the processor-based system 400 with a computer network or with other processor-based systems may be by wireless means and/or by hardwire connection. For example, the communications device 412 may comprise a network interface controller to enable wireless or cable communication between the processor-based system 400 and a computer network. The communications device 412 may also comprise a modem and/or a network adapter or any one of a variety of alternative device for transmitting and receiving data.

One or more of the operations of the methodology described herein for managing uncertainty may be performed by the processor 404 and/or by one or more of gradient propagator 426, variance propagator 428, value propagator 435, and uncertainty bounds updater 430, using the computer readable program instructions 424. The computer readable program instructions 424 may comprise program code which may include computer usable program code and computer readable program code. The computer readable program instructions 424 may be read and executed by the processor 404. The computer readable program instructions 424 may enable the processor 404 to perform one or more operations of the above-described embodiments associated with computational planning in a constraint network 100.

Referring still to FIG. 36, the computer readable program instructions 424 may include operating instructions for the processor-based system 400 and may further include applications and programs. The computer readable program instructions 424 may be contained and/or loaded onto one or more of memory devices 406 and/or non-volatile storage devices 408 for execution by the formula processor 404, the formula converter, the bit array simplifier, the bit array converter, and/or the bit array constructor. As indicated above, one or more of the memory devices 406 and/or non-volatile storage devices 408 may be communicatively coupled to one or more of the remaining component blocks illustrated in FIG. 36 through the communication path.

The computer readable program instructions 424 may be contained on tangible or non-tangible, transitory or non-transitory computer readable media 418 and which may be loaded onto or transferred to the processor-based system 400 for execution by the processor. The computer readable program instructions 424 and the computer readable media 418 comprise a computer program product 416. In an embodiment, the computer readable media 418 may comprise computer readable storage media 420 and/or computer readable signal media 422.

The computer readable storage media 420 may comprise a variety of different embodiments including, but not limited to, optical disks and magnetic disks that may be loaded into a drive, a flash memory device or other storage device or hardware for transfer of data onto a storage device such as a hard drive. The computer readable storage media 420 may be non-removably installed on the processor-based system 400. The computer readable storage media 420 may comprise any suitable storage media and may include, without limitation, a semiconductor system or a propagation medium. In this regard, the computer readable storage media 420 may comprise electronic media, magnetic media, optical media, electromagnetic media, and infrared media. For example, the computer readable storage media 420 may comprise magnetic tape, a computer diskette, random access memory and read-only memory. Non-limiting examples of embodiments of optical disks may include compact disks-read only memory, compact disks-read/write, and digital video disks.

The computer readable signal media 422 may contain the computer readable program instructions 424 and may be embodied in a variety of data signal configurations including, but not limited to, an electromagnetic signal and an optical signal. Such data signals may be transmitted by any suitable communications link including by wireless or hardwire means. For example, the hardwire means may comprise an optical fiber cable, a coaxial cable, a signal wire and any other suitable means for transmitting the data by wireless or by physical means.

Referring still to FIG. 36, the computer readable signal media 422 may facilitate the downloading of the computer readable program instructions 424 to the non-volatile storage or other suitable storage or memory device 406 for use within processor-based system 400. For example, the computer readable program instructions 424 contained within the computer readable storage media 420 may be downloaded to the processor-based system 400 over a computer network from a server or client computer of another system.

Any one of a variety of different embodiments of the processor-based system 400 may be implemented using any hardware device or system capable of executing the computer readable program instructions 424. For example, the processor 404 may comprise a hardware unit configured for performing one or more particular functions wherein the computer readable program instructions 424 for performing the functions may be pre-loaded into the memory device 406.

In an embodiment, the processor 404 may comprise an application specific integrated circuit (ASIC), a programmable logic device, or any other hardware device configured to perform one or more specific functions or operations. For example, a programmable logic device may be temporarily or permanently programmed to perform one or more of the operations related to the disclosed embodiments. The programmable logic device may comprise a programmable logic array, programmable array logic, a field programmable logic array, and a field programmable gate array and any other suitable logic device, without limitation. In an embodiment, the computer readable program instructions 424 may be operated by the one or more processors and/or by other devices including one or more hardware units in communication with the processor 404. Certain portions of the computer readable program instructions 424 may be run by the processor 404 and other portions of the computer readable program instructions 424 may be run by the hardware units.

Many modifications and other embodiments of the disclosure will come to mind to one skilled in the art to which this disclosure pertains having the benefit of the teachings presented in the foregoing descriptions and the associated drawings. The embodiments described herein are meant to be illustrative and are not intended to be limiting or exhaustive. Although specific terms are employed herein, they are used in a generic and descriptive sense only and not for purposes of limitation.

What is claimed is:

1. A method of conducting a trade study for an aircraft design by estimating uncertainty for a data dependent constraint network while avoiding intermixing planning and computation, the method comprising:
    accessing an electronically stored bipartite graph representing the data dependent constraint network, the bipartite graph comprising variable nodes representing a plurality of variables representing aircraft parameters, relation nodes representing a plurality of relations for the aircraft parameters, and arcs interconnecting a plurality of the variable nodes and the relation nodes, the plurality of variables comprising a set S of variables that have uncorrelated errors, a set I of variables having user specifiable values, and a set V of variables having user specifiable uncertainties, wherein at least one of the following occurs: the set S is not equal to the set V, the set V is not equal to the set I, or the set S is not equal to the set I;
    obtaining a user selection electronically, the user selection comprising at least one of: values for the variables in the set I or uncertainties for the variables in the set V;
    propagating electronically at least one gradient related to the user selection through the data dependent constraint network configured with a flow state in which nodes for the variables in the set S have only outgoing arcs;
    recording electronically variables that are touched by the propagating electronically at least one gradient related to the user selection;
    propagating electronically, through the data dependent constraint network configured in a flow state in which the nodes for the variables in the set S have only outgoing arcs, at least one uncertainty for the variables that are touched by the propagating electronically at least one gradient related to the user selection;
    outputting electronically at least one outputted uncertainty for at least one variable not in the set V, whereby setting an uncertainty for the at least one variable not in the set V to the at least one outputted uncertainty for the at least one variable not in the set V causes the user selection to be consistent for the data dependent constraint network;
    conducting the trade study based at least in part on the user selection and on the at least one outputted uncertainty for the at least one variable not in the set V; and
    designing the aircraft based on results of the trade study.

2. The method of claim 1, wherein the user selection comprises values for the variables in the set I, the method further comprising:
    propagating electronically the user selection comprising the values for the variables in the set I through the data dependent constraint network configured with a flow state in which the nodes for the variables in the set I have only outgoing arcs; and
    recording electronically variables that are touched by the propagating electronically the user selection;
    wherein the propagating electronically at least one gradient related to the user selection comprises propagating electronically at least one gradient for the variables that are touched by the propagating electronically the user selection.

3. The method of claim 1, wherein the bipartite graph further comprises arcs between relation nodes and their included variable nodes, and dependent variable nodes of the bipartite graph have at most one incoming arc per world.

4. The method of claim 1, wherein at least one of the plurality of variables is in a strong component.

5. The method of claim 1, wherein the bipartite graph lacks strong components.

6. The method of claim 1, further comprising conducting a reverse computation in which cost is treated as an independent variable.

7. The method of claim 1, further comprising outputting electronically at least one outputted uncertainty range for at least one variable in the set V, whereby any uncertainty value for the at least one variable in the set V selected from within the outputted uncertainty range for the at least one variable in V is propagatable consistently for the data dependent constraint network.

8. The method of claim 1, wherein the user selection comprises both values for the variables in the set I and uncertainties for the variables in the set V.

9. The method of claim 1, wherein each arc from a variable $w_i$ to a relation R caches a partial derivative of the relation R with respect to $w_i$.

10. A computer-implemented system for conducting a trade study for an aircraft design by estimating uncertainty for a data dependent constraint network while avoiding intermixing planning and computation, the system comprising:
    an electronically stored bipartite graph representing the data dependent constraint network, the bipartite graph comprising variable nodes representing a plurality of variables representing aircraft parameters, relation nodes representing a plurality of relations for the aircraft parameters, and arcs interconnecting a plurality of the variable nodes and the relation nodes, the plurality of variables comprising a set S of variables that have uncorrelated errors, a set I of variables for which a user may specify values, and a set V of variables for which a user may specify uncertainties, wherein at least one of the following occurs: the set S is not equal to the set V, the set V is not equal to the set I, or the set S is not equal to the set I;

an electronic user interface configured to obtain a user selection, the user selection comprising at least one of: values for the variables in the set I or the uncertainties for the variables in the set V;

a gradient propagator configured to propagate electronically at least one gradient related to the user selection through the data dependent constraint network configured with a flow state in which nodes for the variables in the set S have only outgoing arcs;

an electronic memory configured to store variables that are touched by the propagating electronically at least one gradient related to the user selection;

a variance propagator configured to propagate electronically, through the data dependent constraint network configured in a flow state in which nodes for the variables in the set S have only outgoing arcs, at least one uncertainty for the variables that are touched by the propagating electronically at least one gradient related to the user selection; and an electronic display configured to output at least one outputted uncertainty for at least one variable not in the set V, whereby setting an uncertainty for the at least one variable not in the set V to the at least one outputted uncertainty for the at least one variable not in the set V causes the user selection to be consistent for the data dependent constraint network, wherein the electronic display is further configured to output at least part of the trade study based at least in part on the user selection and on the at least one outputted uncertainty for the at least one variable not in the set V, whereby the aircraft is designed based on results of the trade study.

11. The system of claim 10, wherein the user selection comprises values for the variables in the set I, the system further comprising:

a value propagator configured to propagate electronically the user selection comprising the values for variables in the set I through the data dependent constraint network configured with a flow state in which nodes for the variables in the set I have only outgoing arcs; and an electronic memory configured to store electronically variables that are touched by the propagating electronically the user selection;

wherein the gradient propagator is further configured to propagate electronically at least one gradient for the variables that are touched by the propagating electronically the user selection.

12. The system of claim 10, wherein the bipartite graph comprises arcs between relation nodes and their included variable nodes, and dependent variable nodes of the bipartite graph have at most one incoming arc per world.

13. The system of claim 10, wherein at least one of the plurality of variables is in a strong component.

14. The system of claim 10, wherein the bipartite graph lacks strong components.

15. The system of claim 10, configured to conduct a reverse computation in which cost is treated as an independent variable.

16. The system of claim 10, further configured to output electronically at least one outputted uncertainty range for at least one variable in the set V, whereby any uncertainty value for the at least one variable in the set V is selected from within the outputted uncertainty range for the at least one variable in the set V is propagatable consistently for the data dependent constraint network.

17. The system of claim 10, wherein the user selection comprises both values for the variables in the set I and uncertainties for the variables in the set V.

18. The system of claim 10, wherein each arc from a variable $w_i$ to a relation R caches in electronic memory a partial derivative of the relation R with respect to $w_i$.

* * * * *